United States Patent
Song et al.

(10) Patent No.: US 12,536,830 B2
(45) Date of Patent: Jan. 27, 2026

(54) DISPLAY DEVICE

(71) Applicant: Samsung Display Co., Ltd., Yongin-si (KR)

(72) Inventors: Heerim Song, Yongin-si (KR); Soil Yoon, Yongin-si (KR); Cheol-Gon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/788,953

(22) Filed: Jul. 30, 2024

(65) Prior Publication Data

US 2025/0118101 A1      Apr. 10, 2025

(30) Foreign Application Priority Data

Oct. 5, 2023   (KR) .................. 10-2023-0132312

(51) Int. Cl.
   *G06V 40/13*      (2022.01)
   *G06F 3/041*      (2006.01)
   (Continued)

(52) U.S. Cl.
   CPC .......... *G06V 40/1318* (2022.01); *G06F 3/042* (2013.01); *G09G 3/3258* (2013.01);
   (Continued)

(58) Field of Classification Search
   CPC .......... G09G 3/3258; G09G 2360/145; G09G 2354/00; G09G 2310/08; G09G 2310/06; G09G 2300/0842; G09G 2300/0819; G09G 2300/043; G09G 2300/0426; G09G 2300/0413; H10K 59/65; H10K 59/131;
   (Continued)

(56) References Cited

U.S. PATENT DOCUMENTS

| 10,147,777 B2 | 12/2018 | Lim et al. |
| 11,342,392 B2 | 5/2022 | Tang et al. |
| 11,556,026 B2 | 1/2023 | Saitoh et al. |
| 2012/0001880 A1* | 1/2012 | Brown ................ G09G 3/20 345/207 |

(Continued)

FOREIGN PATENT DOCUMENTS

| KR | 10-2018-0018960 A | 2/2018 |
| KR | 10-2022-0125839 A | 9/2022 |

(Continued)

*Primary Examiner* — Hong Zhou
(74) *Attorney, Agent, or Firm* — Womble Bond Dickinson (US) LLP

(57) ABSTRACT

A display device includes a base layer having a display region and a non-display region defined therein; a circuit layer on the base layer; and an element layer on the circuit layer, the element layer comprising light emitting elements and light receiving elements corresponding in position to the display region. The circuit layer comprises: pixel drive circuits connected to the light emitting elements; sensor drive circuits connected to the light receiving elements; data lines connected to the pixel drive circuits; readout wirings connected to the sensor drive circuits; a shielding electrode overlapping with the readout wirings and the sensor drive circuits in a plan view, the shielding electrode being on the data lines; and pixel connecting electrodes connecting the pixel drive circuits to the light emitting elements, the pixel connecting electrodes being at a same layer as the shielding electrode.

27 Claims, 28 Drawing Sheets

(51) Int. Cl.
   *G06F 3/042* (2006.01)
   *G06F 3/044* (2006.01)
   *G09G 3/3258* (2016.01)

(52) U.S. Cl.
   CPC .......... *G06F 3/0412* (2013.01); *G06F 3/0443* (2019.05); *G06F 2203/04107* (2013.01); *G09G 2300/0413* (2013.01); *G09G 2300/0426* (2013.01); *G09G 2300/043* (2013.01); *G09G 2300/0819* (2013.01); *G09G 2300/0842* (2013.01); *G09G 2310/06* (2013.01); *G09G 2310/08* (2013.01); *G09G 2354/00* (2013.01); *G09G 2360/145* (2013.01)

(58) Field of Classification Search
   CPC .. H10K 59/126; H10K 59/124; H10K 59/123; G06F 2203/04107; G06F 3/0412; G06F 3/042; G06F 3/0443; G06V 40/1318
   See application file for complete search history.

(56) References Cited

U.S. PATENT DOCUMENTS

| | | | |
|---|---|---|---|
| 2012/0182277 A1* | 7/2012 | Jeong | G06F 3/0412 345/207 |
| 2017/0351364 A1* | 12/2017 | Kim | G06F 21/32 |
| 2021/0158751 A1* | 5/2021 | Cha | G09G 3/3233 |
| 2021/0273035 A1* | 9/2021 | Cho | H10K 59/126 |
| 2021/0288126 A1* | 9/2021 | Hong | H10K 59/126 |
| 2022/0285460 A1 | 9/2022 | Kim et al. | |
| 2022/0366828 A1 | 11/2022 | Park et al. | |
| 2022/0399421 A1 | 12/2022 | Hai et al. | |
| 2023/0098891 A1 | 3/2023 | Song et al. | |
| 2023/0260319 A1* | 8/2023 | Lee | G06V 40/1318 345/156 |

FOREIGN PATENT DOCUMENTS

| | | |
|---|---|---|
| KR | 10-2022-0156147 A | 11/2022 |
| KR | 10-2023-0046388 A | 4/2023 |

* cited by examiner

DISPLAY DEVICE

CROSS-REFERENCE TO RELATED APPLICATION

The present application claims priority to and the benefit of Korean Patent Application No. 10-2023-0132312, filed on Oct. 5, 2023, in the Korean Intellectual Property Office, the entire disclosure of which is incorporated herein by reference.

BACKGROUND

1. Field

Aspects of embodiments of the present disclosure described herein relate to a display device having a biometric information recognition function.

2. Description of the Related Art

A display device provides various functions that enable a user to interact with the display device. For example, the display device may display an image to provide information to the user, or may sense a user input. Recent display devices include a function for sensing biometric information of a user.

The biometric information may be recognized by using a capacitive sensing technique for sensing a change in capacitance between electrodes, a light sensing technique for sensing incident light using an optical sensor, or an ultrasonic sensing technique for sensing vibration using a piezoelectric element.

The above information disclosed in this Background section is for enhancement of understanding of the background of the present disclosure, and therefore, it may contain information that does not constitute prior art.

SUMMARY

Aspects of some embodiments of the present disclosure are directed to a display device with improved biometric information recognition performance.

According to some embodiments of the present disclosure, there is provided a display device including: a base layer having a display region and a non-display region defined therein; a circuit layer on the base layer; and an element layer on the circuit layer, the element layer including light emitting elements and light receiving elements corresponding in position to the display region. The circuit layer includes: pixel drive circuits connected to the light emitting elements; sensor drive circuits connected to the light receiving elements; data lines connected to the pixel drive circuits; readout wirings connected to the sensor drive circuits; a shielding electrode overlapping with the readout wirings and the sensor drive circuits in a plan view, the shielding electrode being on the data lines; and pixel connecting electrodes connecting the pixel drive circuits to the light emitting elements, the pixel connecting electrodes being at a same layer as the shielding electrode.

In some embodiments, each of the light emitting elements includes a pixel anode electrode, wherein the pixel anode electrode is connected to a corresponding pixel drive circuit among the pixel drive circuits through a corresponding pixel connecting electrode among the pixel connecting electrodes, and the pixel anode electrode and the corresponding pixel connecting electrode are at different layers.

In some embodiments, a first pixel anode electrode of a first light emitting element among the light emitting elements is on a first side of a first readout wiring adjacent to the first pixel anode electrode, and a first pixel drive circuit corresponding to the first light emitting element among the pixel drive circuits is on a second side of the first readout wiring, and a first pixel connecting electrode of the pixel connecting electrodes connects the first pixel anode electrode and the first pixel drive circuit, and overlaps with the first readout wiring in a plan view.

In some embodiments, two or more sequentially stacked insulating layers are between the first readout wiring and the first pixel connecting electrode.

In some embodiments, the first readout wiring includes: a first readout line portion on a first intermediate insulating layer; and a second readout line portion on a second intermediate insulating layer and covering the first readout line portion, the second readout line portion being connected with the first readout line portion, and the first pixel connecting electrode is on a third intermediate insulating layer that covers the second readout line portion, and crosses the first readout line portion in a plan view.

In some embodiments, the first readout wiring includes: a first readout line portion on a first intermediate insulating layer; and a second readout line portion on a second intermediate insulating layer that covers the first readout line portion, the second readout line portion being connected with the first readout line portion, and the first pixel connecting electrode is on a third intermediate insulating layer that covers the second readout line portion, and crosses the second readout line portion in a plan view.

In some embodiments, the light receiving elements include: first light receiving elements in a first row; and second light receiving elements in a second row, wherein each of the first light receiving elements overlaps with a corresponding first sensor drive circuit among the sensor drive circuits in a plan view, and each of the second light receiving elements does not overlap a corresponding second sensor drive circuit among the sensor drive circuits in a plan view.

In some embodiments, each of the second light receiving elements includes: a second sensor anode electrode; and a sensor connecting electrode extending from the second sensor anode electrode and overlapping with the second sensor drive circuit, and the second sensor anode electrode and the sensor connecting electrode are at the same layer.

In some embodiments, each of the first light receiving elements includes: a first sensor anode electrode; and a dummy connecting electrode extending from the first sensor anode electrode, and wherein the first sensor anode electrode overlaps with the first sensor drive circuit and is connected with the second sensor drive circuit.

In some embodiments, a sum of an area of the dummy connecting electrode and an area of the first sensor anode electrode is equal to a sum of an area of the sensor connecting electrode and an area of the second sensor anode electrode.

In some embodiments, the shielding electrode includes: a plurality of main shielding electrodes overlapping with the sensor drive circuits and the readout wirings in a plan view; a first branch shielding electrode extending from at least one of the main shielding electrodes and partially overlap with the dummy connecting electrode in a plan view; and a second branch shielding electrode extending from at least one of the main shielding electrodes and partially overlap with the sensor connecting electrode in a plan view.

In some embodiments, the main shielding electrodes are spaced apart from each other in an extension direction of each of the readout wirings, and the first pixel connecting electrode passes through a separation space between the main shielding electrodes in a direction crossing the extension direction.

In some embodiments, the data lines include: first data lines connected to a first group of the pixel drive circuits among the pixel drive circuits; and second data lines spaced apart from the first data lines in a first direction and connected to a second group of the pixel drive circuits among the pixel drive circuits, wherein the circuit layer further includes data connecting lines electrically connected with the second data lines, respectively, in the display region.

In some embodiments, the data connecting lines include: a plurality of vertical data connecting lines extending along the first data lines; and a plurality of horizontal data connecting lines extending in the first direction, wherein the plurality of horizontal data connecting lines electrically connect the plurality of vertical data connecting lines to the second data lines.

In some embodiments, portions of the readout wirings are on a first intermediate insulating layer, the first and second data lines and the vertical data connecting lines are on a second intermediate insulating layer covering the first intermediate insulating layer and the portions of the readout wirings, and the shielding electrode and the pixel connecting electrode are on a third intermediate insulating layer covering the first and second data lines, the vertical data connecting lines, and the second intermediate insulating layer.

In some embodiments, each of the light emitting elements includes a pixel anode electrode, the pixel anode electrode is connected to a corresponding pixel drive circuit among the pixel drive circuits through a corresponding pixel connecting electrode among the pixel connecting electrodes, and the pixel anode electrode is on a fourth intermediate insulating layer covering the shielding electrode and the pixel connecting electrode.

In some embodiments, the circuit layer further includes: a first drive voltage line connected to the pixel drive circuits; a second drive voltage line connected to the light emitting elements and the light receiving elements; and a reset voltage line connected to the sensor drive circuits.

In some embodiments, the shielding electrode is electrically connected with the reset voltage line.

In some embodiments, each of the sensor drive circuits includes: a reset transistor including a first electrode for receiving a reset voltage, a second electrode connected with a first sensing node, and a third electrode for receiving a reset control signal; an amplifying transistor including a first electrode for receiving a sensor drive voltage, a second electrode connected with the first sensing node, and a third electrode connected with a second sensing node; and an output transistor including a first electrode connected with the second sensing node, a second electrode connected with a corresponding readout wiring, and a third electrode for receiving an output control signal.

In some embodiments, the reset voltage line is electrically connected to the first electrode of the reset transistor and the shielding electrode and supplies the reset voltage to the first electrode of the reset transistor and the shielding electrode.

According to some embodiments of the present disclosure, there is provided a display device including a base layer having a display region and a non-display region defined therein; a circuit layer on the base layer; and an element layer on the circuit layer, the element layer including light emitting elements and light receiving elements corresponding to the display region. The light receiving elements include a first light receiving element in a first row and a second light receiving element in a second row. The circuit layer includes: pixel drive circuits connected to the light emitting elements, respectively; a first sensor drive circuit overlapping with the first light emitting element when viewed from above a plane, the first sensor drive circuit being connected to the first light receiving element; and a second sensor drive circuit connected to the second light receiving element, the second sensor drive circuit being configured so as not to overlap the second light receiving element in a plan view. The second light receiving element includes a sensor connecting electrode extending from a second sensor anode electrode toward the second sensor drive circuit and connect the second sensor anode electrode and the second sensor drive circuit, and the first light receiving element includes a dummy connecting electrode extending from a first sensor anode electrode in a direction opposite to the sensor connecting electrode.

In some embodiments, the circuit layer further includes: a readout wiring connected to the first and second sensor drive circuits; and a shielding electrode overlapping with the readout wiring in a plan view, and the sensor connecting electrode and the dummy connecting electrode are on an intermediate insulating layer covering the shielding electrode.

In some embodiments, the shielding electrode includes: a plurality of main shielding electrodes overlapping with the first and second sensor drive circuits in a plan view; a first branch shielding electrode extending from one of the main shielding electrodes and partially overlap with the dummy connecting electrode in a plan view; and a second branch shielding electrode extending from one of the main shielding electrodes and partially overlap with the sensor connecting electrode in a plan view.

In some embodiments, the circuit layer further includes pixel connecting electrodes connecting the pixel drive circuits with the light emitting elements, respectively, and the pixel connecting electrodes and the shielding electrode are at the same layer.

In some embodiments, the circuit layer further includes: a first drive voltage line connected to the pixel drive circuits; a second drive voltage line connected to the light emitting elements and the light receiving elements; and a reset voltage line connected to the first and second sensor drive circuits.

In some embodiments, the shielding electrode is electrically connected with the reset voltage line.

In some embodiments, a sum of an area of the dummy connecting electrode and an area of the first sensor anode electrode is equal to a sum of an area of the sensor connecting electrode and an area of the second sensor anode electrode.

BRIEF DESCRIPTION OF THE DRAWINGS

The above and other objects and features of the present disclosure will become apparent by describing in detail embodiments thereof with reference to the accompanying drawings.

Figure 1:
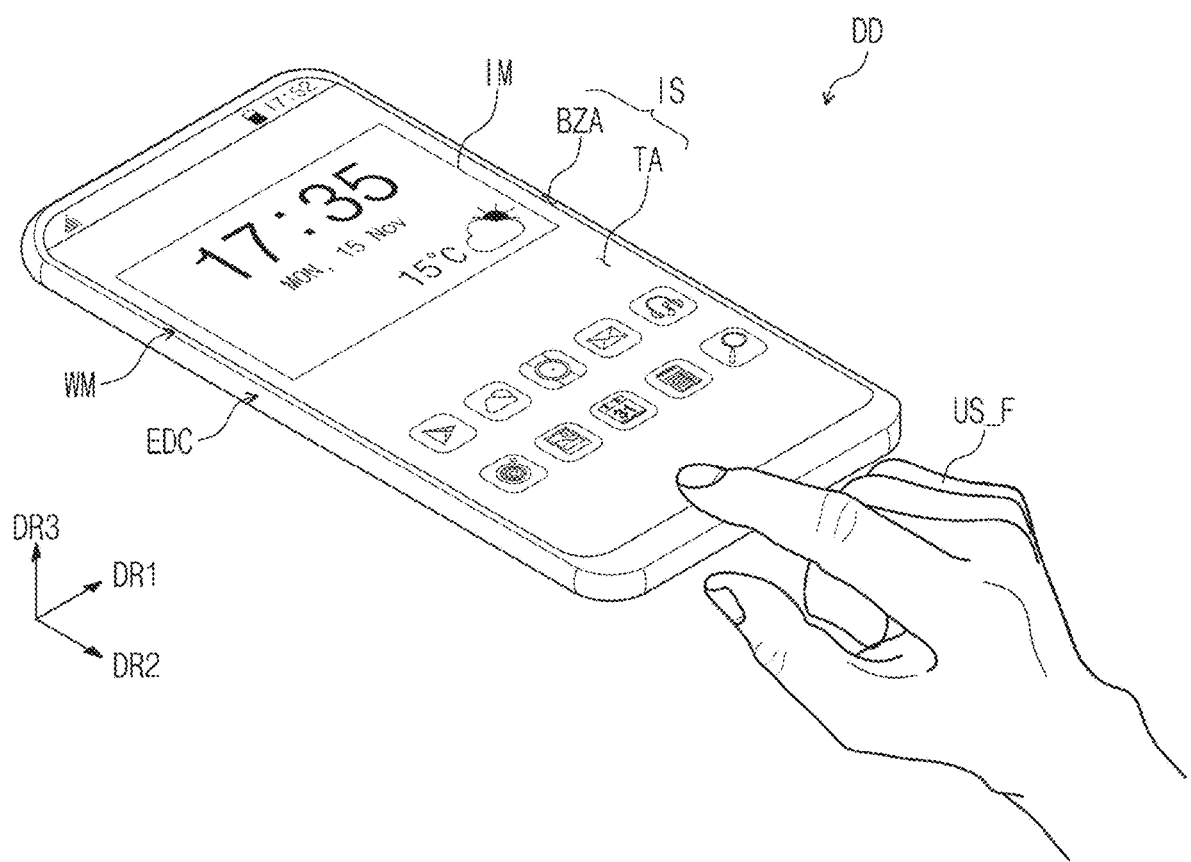
FIG. 1 is a perspective view of a display device according to some embodiments of the present disclosure.

The above and other aspects and features of the present disclosure will be more clearly understood from the following detailed description of the illustrative, non-limiting embodiments with reference to the accompanying drawings.

DETAILED DESCRIPTION

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, embodiments of the present disclosure will be described with reference to the accompanying drawings.

Figure 2A:
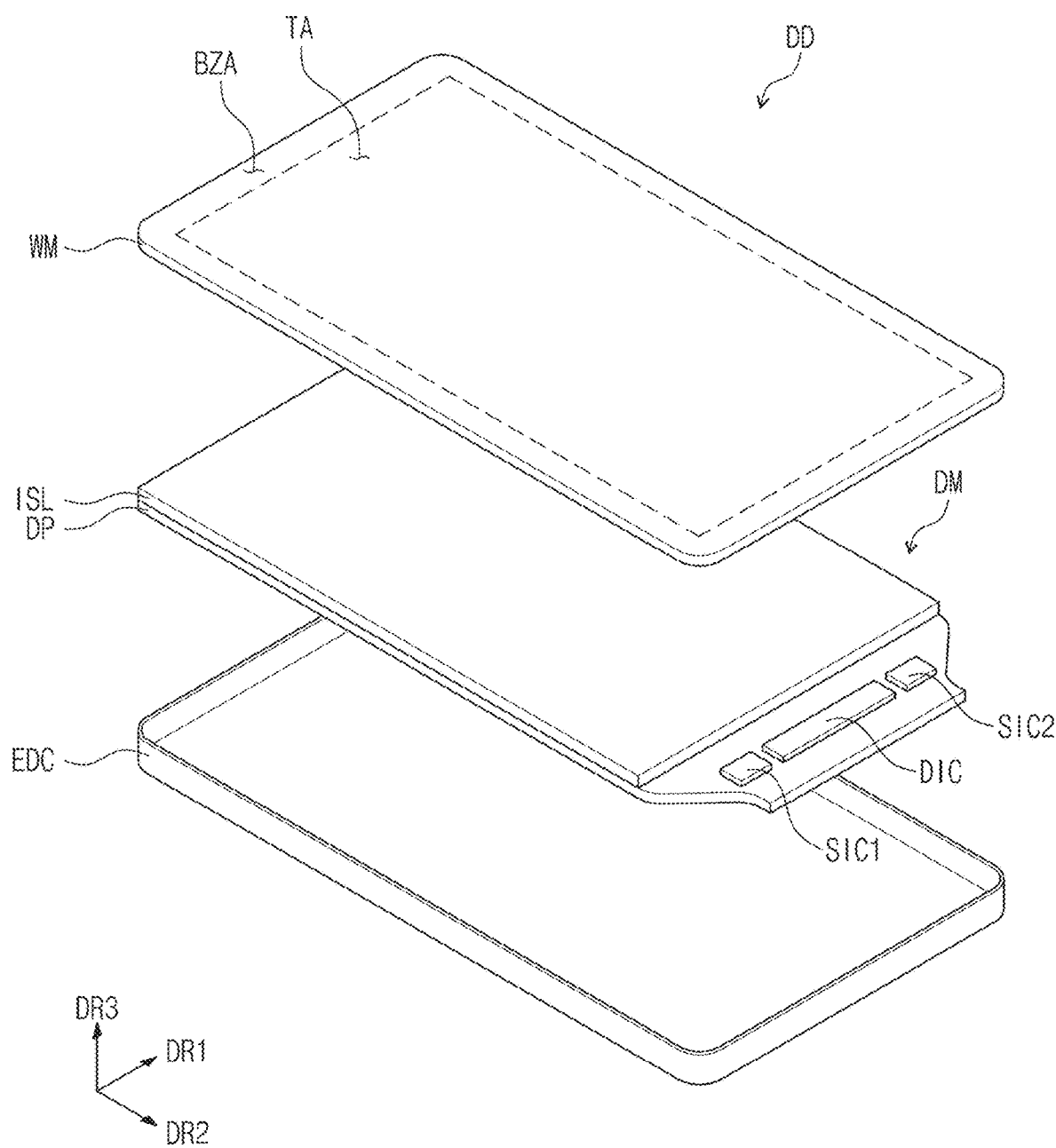
FIG. 2A is an exploded perspective view of the display device according to some embodiments of the present disclosure.
Figure 2B:
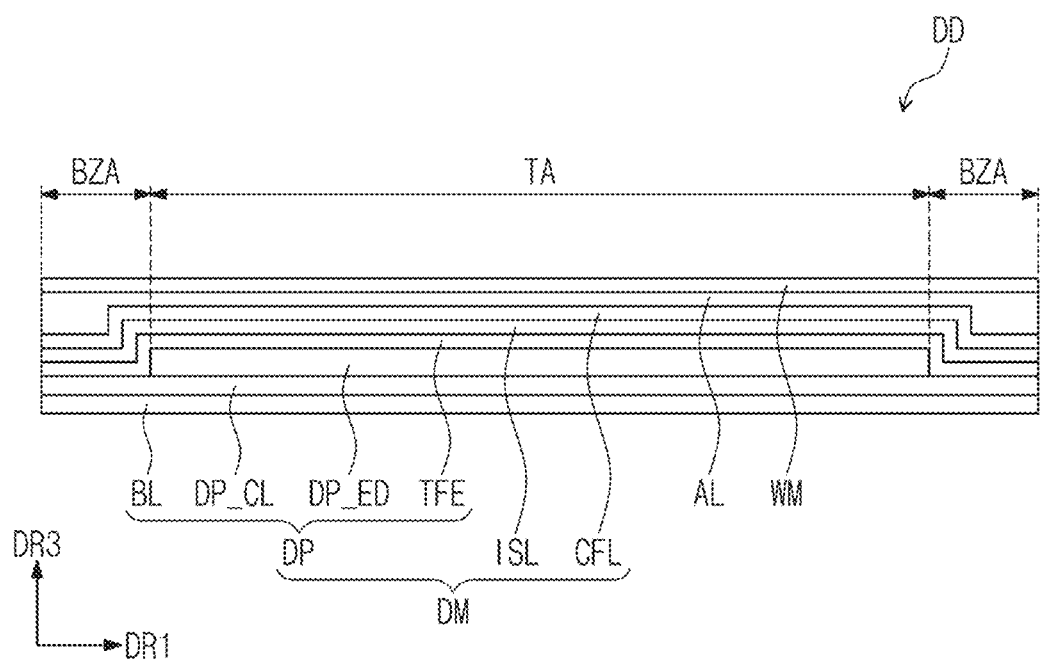
FIG. 2B is a sectional view of the display device according to some embodiments of the present disclosure.

FIG. 1 is a perspective view of a display device according to some embodiments of the present disclosure. FIG. 2A is an exploded perspective view of the display device according to some embodiments of the present disclosure. FIG. 2B is a sectional view of the display device according to some embodiments of the present disclosure.

Referring to FIGS. 1, 2A, and 2B, the display device DD according to some embodiments of the present disclosure may have a rectangular shape with short sides parallel to a first direction DR1 and long sides parallel to a second direction DR2 crossing the first direction DR1. However, without being limited thereto, the display device DD may have various shapes such as a circular shape, a polygonal shape, and the like.

The display device DD may be a device activated by an electrical signal. The display device DD may include various embodiments. For example, the display device DD may be applied to an electronic device, such as a smart watch, a tablet computer, a notebook computer, a computer, a smart television, or the like.

Hereinafter, a normal direction substantially perpendicular to a plane defined by the first direction DR1 and the second direction DR2 is defined as a third direction DR3. The expression "when viewed from above the plane" used herein may mean that it is viewed in the third direction DR3.

The upper surface of the display device DD may be defined as a display surface IS and may be parallel to the plane defined by the first direction DR1 and the second direction DR2. Images IM generated by the display device DD may be provided to a user through the display surface IS.

The display surface IS may be divided into a transmissive region TA and a bezel region BZA. The transmissive region TA may be a region on which the images IM are displayed. The user visually recognizes the images IM through the transmissive region TA. In some embodiments, the transmissive region TA is illustrated in a rounded quadrangular shape. However, this is illustrative, and the transmissive region TA may have various suitable shapes and is not limited to any one embodiment.

The bezel region BZA may be adjacent to the transmissive region TA. The bezel region BZA may have a preset color. The bezel region BZA may surround (e.g., be around) the transmissive region TA. Accordingly, the shape of the transmissive region TA may be substantially defined by the bezel region BZA. However, this is illustrative, and the bezel region BZA may be disposed adjacent to only one side of the transmissive region TA, or may be omitted.

The display device DD may sense an external input applied from the outside. The external input may include various suitable types of inputs provided from outside the display device DD. For example, the external input may include not only contact by a part of the user's body (e.g., a hand US_F of the user) or contact by a separate device (e.g., an active pen or a digitizer) but also an external input (e.g., hovering) that is applied in proximity to the display device DD or applied adjacent to the display device DD at a preset distance. In addition, the external input may have various suitable forms (e.g., be of various suitable kinds), such as force, pressure, temperature, light, and the like.

The display device DD may sense the user's biometric information applied from the outside. A biometric information sensing region capable of sensing the user's biometric information may be provided on the display surface IS of the display device DD. The biometric information sensing region may be provided in the entire area of the transmissive region TA, or may be provided in a partial area of the transmissive region TA. FIG. 1 illustrates an example in which the entire transmissive region TA serves as the biometric information sensing region.

The display device DD may include a window WM, a display module DM, and a housing EDC. In some embodiments, the window WM and the housing EDC may be combined with each other to form the exterior of the display device DD.

The front surface of the window WM defines the display surface IS of the display device DD. The window WM may include an optically clear insulating material. For example, the window WM may include glass or plastic. The window WM may have a multi-layer structure or a single-layer structure. For example, the window WM may include a plurality of plastic films coupled through an adhesive, or may include a glass substrate and a plastic film coupled through an adhesive.

The display module DM may include a display panel DP and an input sensing layer ISL. The display panel DP may display an image IM depending on an electrical signal, and the input sensing layer ISL may sense an external input applied from the outside. The external input may be provided in various suitable forms.

The display panel DP according to some embodiments of the present disclosure may be an emissive display panel, but is not particularly limited. For example, the display panel DP may be an organic light emitting display panel, an inorganic light emitting display panel, or a quantum-dot light emitting display panel. An emissive layer of the organic light emitting display panel may include an organic luminescent material, and an emissive layer of the inorganic light emitting display panel may include an inorganic luminescent material. An emissive layer of the quantum-dot light emitting display panel may include quantum dots and quantum rods. Hereinafter, in the embodiments discussed, the display panel DP will be an organic light emitting display panel.

Referring to FIG. 2B, the display panel DP includes a base layer BL, a circuit layer DP_CL, an element layer DP_ED, and an encapsulation layer TFE. The display panel DP according to the present disclosure may be a flexible display panel. However, the present disclosure is not limited thereto. For example, the display panel DP may be a foldable display panel that is folded about a folding axis, or may be a rigid display panel.

The base layer BL may include a synthetic resin layer. The synthetic resin layer may be a polyimide-based resin layer, and the material thereof is not particularly limited. In addition, the base layer BL may include a glass substrate, a metal substrate, an organic/inorganic composite substrate, or the like.

The circuit layer DP_CL may be disposed on (e.g., above) the base layer BL. The circuit layer DP_CL may be disposed between the base layer BL and the element layer DP_ED. The circuit layer DP_CL may include at least one insulating layer and a circuit element. Hereinafter, the insulating layer included in the circuit layer DP_CL is referred to as the intermediate insulating layer. The intermediate insulating layer may include at least one intermediate inorganic film and at least one intermediate organic film. The circuit element may include a pixel drive circuit, included in each of a plurality of pixels for displaying an image, and a sensor drive circuit, included in each of a plurality of sensors for recognizing external information. The external information may be biometric information. In some embodiments of the present disclosure, the sensor may be a fingerprint recognition sensor, a proximity sensor, an iris recognition sensor, a blood pressure measurement sensor, an illuminance sensor, or the like. In some examples, the sensor may be an optical sensor for optically recognizing biometric information. The circuit layer DP_CL may further include signal lines connected to the pixel drive circuit and/or the sensor drive circuit.

The element layer DP_ED may include a light emitting element included in each of the pixels and a light receiving element included in each of the sensors. In some embodiments of the present disclosure, the light receiving element may be a photo diode. The light receiving element may be a sensor that senses, or reacts to, light reflected by a fingerprint of the user. The circuit layer DP_CL and the element layer DP_ED will be described below in detail with reference to FIGS. 6A to 8K.

The encapsulation layer TFE seals the element layer DP_ED. The encapsulation layer TFE may include at least one organic film and at least one inorganic film. The inorganic film may include an inorganic material and may protect the element layer DP_ED from moisture/oxygen. The inorganic film may include a silicon nitride layer, a silicon oxy nitride layer, a silicon oxide layer, a titanium oxide layer, and/or an aluminum oxide layer, but is not particularly limited thereto. The organic film may include an organic material and may protect the element layer DP_ED from foreign matter such as dust particles.

The input sensing layer ISL may be formed on the display panel DP. The input sensing layer ISL may be directly disposed on the encapsulation layer TFE. According to some embodiments of the present disclosure, the input sensing layer ISL may be formed on the display panel DP by a continuous process. That is, when the input sensing layer ISL is directly disposed on the display panel DP, an adhesive film is not disposed between the input sensing layer ISL and the encapsulation layer TFE. In some examples, an adhesive film may be disposed between the input sensing layer ISL and the display panel DP. In this case, the input sensing layer ISL may not be manufactured together with the display panel DP by a continuous process and may be manufactured separately from the display panel DP and then fixed to the upper surface of the display panel DP by the adhesive film.

The input sensing layer ISL may sense an external input (e.g., a touch of the user), may change the sensed external input into a preset input signal, and may provide the input signal to the display panel DP. The input sensing layer ISL may include a plurality of sensing electrodes for sensing the external input. The sensing electrodes may sense the external input in a capacitive type (e.g., by detecting a change in a capacitance). The display panel DP may receive the input signal from the input sensing layer ISL and may generate an image corresponding to the input signal.

The display module DM may further include a color filter layer CFL. In some embodiments of the present disclosure, the color filter layer CFL may be disposed on the input sensing layer ISL. However, the present disclosure is not limited thereto. The color filter layer CFL may be disposed between the display panel DP and the input sensing layer ISL. The color filter layer CFL may include a plurality of color filters and a black matrix.

The structures of the input sensing layer ISL and the color filter layer CFL will be described below in detail.

The display device DD according to some embodiments of the present disclosure may further include an adhesive layer AL. The window WM may be attached to the input sensing layer ISL by the adhesive layer AL. The adhesive layer AL may include an optically clear adhesive, an optically clear adhesive resin, a pressure sensitive adhesive (PSA), or the like.

The display module DM may further include a driver chip DIC and sensor chips SIC1 and SIC2. In some embodiments of the present disclosure, the driver chip DIC and the sensor chips SIC1 and SIC2 may be mounted on the display panel DP. The driver chip DIC and the sensor chips SIC1 and SIC2 may be disposed adjacent to (e.g., on) one end portion (hereinafter, referred to as the first end portion) of the display panel DP. Although FIG. 2A illustrates a structure in which the driver chip DIC and the sensor chips SIC1 and SIC2 are disposed adjacent to the first end portion of the display panel DP, the present disclosure is not limited thereto. For example, the driver chip DIC may be disposed adjacent to the first end portion of the display panel DP, and the sensor chips SIC1 and SIC2 may be disposed adjacent to a second end portion of the display panel DP that faces away from the first end portion.

In some embodiments of the present disclosure, the sensor chips SIC1 and SIC2 may include the first sensor chip SIC1 disposed on one side of the driver chip DIC (hereinafter, referred to as the first side) and the second sensor chip SIC2 disposed on a second side of the driver chip DIC that differs from the first side. However, in some examples, the first and second sensor chips SIC1 and SIC2 may be integrated into one sensor chip, and the one sensor chip may be disposed adjacent to the driver chip DIC. In the present disclosure, the number of sensor chips SIC1 and SIC2 and the number of driver chips DIC are not particularly limited.

The housing EDC may be combined with the window WM. The housing EDC may be combined with the window WM and provide a preset inner space. The display module DM may be accommodated in the inner space. The housing EDC may include a material having a relatively high rigidity. For example, the housing EDC may include glass, plastic, metal, and/or the like, or may include a plurality of frames and/or plates formed of a combination thereof. The housing EDC may stably protect components of the display device DD accommodated in the inner space from external impact. A battery module for supplying power for overall operation of the display device DD may be disposed between the display module DM and the housing EDC.

Figure 3:
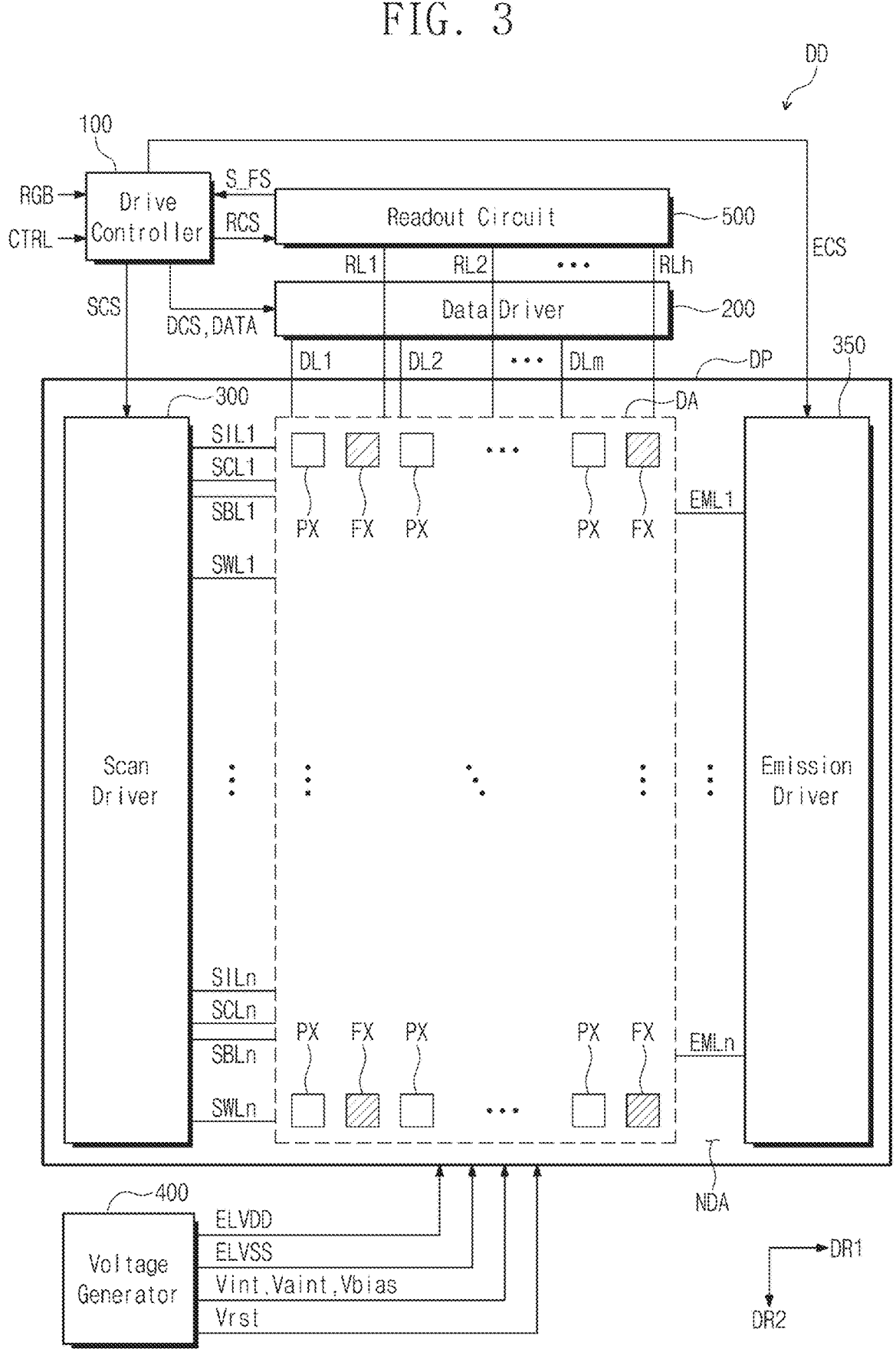
FIG. 3 is a block diagram of the display device according to some embodiments of the present disclosure.

FIG. 3 is a block diagram of the display device according to some embodiments of the present disclosure.

Referring to FIG. 3, the display device DD may include the display panel DP, a panel driver, and a drive controller 100. In some embodiments of the present disclosure, the panel driver includes a data driver 200, a scan driver 300, an emission driver 350, a voltage generator 400, and a readout circuit 500.

The drive controller 100 may receive an image signal RGB and a control signal CTRL. The drive controller 100 may generate image data DATA by converting the data format of the image signal RGB according to the specification of an interface with the data driver 200. The drive controller 100 may output a first control signal SCS, a second control signal ECS, a third control signal DCS, and a fourth control signal RCS.

The data driver 200 may receive the third control signal DCS and the image data DATA from the drive controller 100. The data driver 200 may convert the image data DATA into data signals and output the data signals to a plurality of data lines DL1 to DLm, which will be described below. The data signals may be analog voltages corresponding to gray level values of the image data DATA. In some embodiments of the present disclosure, the data driver 200 may be embedded in the driver chip DIC illustrated in FIG. 2A.

The scan driver 300 may receive the first control signal SCS from the drive controller 100. The scan driver 300 may output scan signals to scan lines in response to the first control signal SCS.

The voltage generator 400 may generate voltages utilized for operation of the display panel DP. In some embodiments, the voltage generator 400 generates a first drive voltage ELVDD, a second drive voltage ELVSS, a first initialization voltage Vint, a second initialization voltage Vaint, a bias voltage Vbias, and a reset voltage Vrst.

The display panel DP may include a display region DA corresponding to the transmissive region TA (e.g., illustrated in FIG. 1) and a non-display region NDA corresponding to the bezel region BZA (e.g., illustrated in FIG. 1).

The display panel DP may include a plurality of pixels PX disposed in the display region DA and a plurality of sensors FX disposed in the display region DA. In some embodiments of the present disclosure, each of the plurality of sensors FX may be disposed between two pixels PX. The plurality of pixels PX and the plurality of sensors FX may be alternately disposed in the first and second directions DR1 and DR2. However, the present disclosure is not limited thereto. That is, two or more pixels PX may be disposed between two sensors FX adjacent to each other in the first direction DR1 among the plurality of sensors FX, or two or more pixels PX may be disposed between two sensors FX adjacent to each other in the second direction DR2 among the plurality of sensors FX.

The display panel DP further includes initialization scan lines SIL1 to SILn, compensation scan lines SCL1 to SCLn, write scan lines SWL1 to SWLn, black scan lines SBL1 to SBLn, emission control lines EML1 to EMLn, the data lines DL1 to DLm, and readout lines RL1 to RLh. The initialization scan lines SIL1 to SILn, the compensation scan lines SCL1 to SCLn, the write scan lines SWL1 to SWLn, the black scan lines SBL1 to SBLn, and the emission control lines EML1 to EMLn may extend in the first direction DR1. The initialization scan lines SIL1 to SILn, the compensation scan lines SCL1 to SCLn, the write scan lines SWL1 to SWLn, the black scan lines SBL1 to SBLn, and the emission control lines EML1 to EMLn may be arranged in the second direction DR2 so as to be spaced apart from each other. The data lines DL1 to DLm and the readout lines RL1 to RLh may extend in the second direction DR2 and may be arranged in the first direction DR1 so as to be spaced apart from each other. Here, "n", "m", and "h" are natural numbers of 1 or larger.

The plurality of pixels PX may be electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm, respectively. For example, each of the plurality of pixels PX may be electrically connected to four scan lines. However, without being limited thereto, the number of scan lines connected to each pixel PX may be changed.

The plurality of sensors FX may be electrically connected to the write scan lines SWL1 to SWLn and the readout lines RL1 to RLh, respectively. Each of the plurality of sensors FX may be electrically connected to one scan line. However, the present disclosure is not limited thereto. The number of scan lines connected to each sensor FX may be varied. In some embodiments of the present disclosure, the number of readout lines RL1 to RLh may be smaller than or equal to the number of data lines DL1 to DLm. For example, the number of readout lines RL1 to RLh may correspond to ½, ¼, or ⅛ of the number of data lines DL1 to DLm.

The scan driver 300 may be disposed in the non-display region NDA of the display panel DP. The scan driver 300 may receive the first control signal SCS from the drive controller 100. In response to the first control signal SCS, the scan driver 300 may output initialization scan signals to the initialization scan lines SIL1 to SILn and output compensation scan signals to the compensation scan lines SCL1 to SCLn. Furthermore, in response to the first control signal SCS, the scan driver 300 may output write scan signals to the write scan lines SWL1 to SWLn and may output black scan signals to the black scan lines SBL1 to SBLn. In some examples, the scan driver 300 may include first and second scan drivers. The first scan driver may output the initialization scan signals and the compensation scan signals, and the second scan driver may output the write scan signals and the black scan signals.

The emission driver 350 may be disposed in the non-display region NDA of the display panel DP. The emission driver 350 may receive the second control signal ECS from the drive controller 100. The emission driver 350 may output emission control signals to the emission control lines EML1 to EMLn in response to the second control signal ECS. In some examples, the scan driver 300 may be connected to the emission control lines EML1 to EMLn. In this case, the emission driver 350 may be omitted, and the scan driver 300 may output the emission control signals to the emission control lines EML1 to EMLn.

The readout circuit 500 may receive the fourth control signal RCS from the drive controller 100. In response to the fourth control signal RCS, the readout circuit 500 may receive detection signals from the readout lines RL1 to RLh. The readout circuit 500 may process the detection signals received from the readout lines RL1 to RLh and may provide processed detection signals S_FS to the drive controller 100. The drive controller 100 may recognize biometric information based on the detection signals S_FS. In some embodiments of the present disclosure, the readout circuit 500 may be embedded in the sensor chips SIC1 and SIC2 illustrated in FIG. 2A.

Figure 4A:
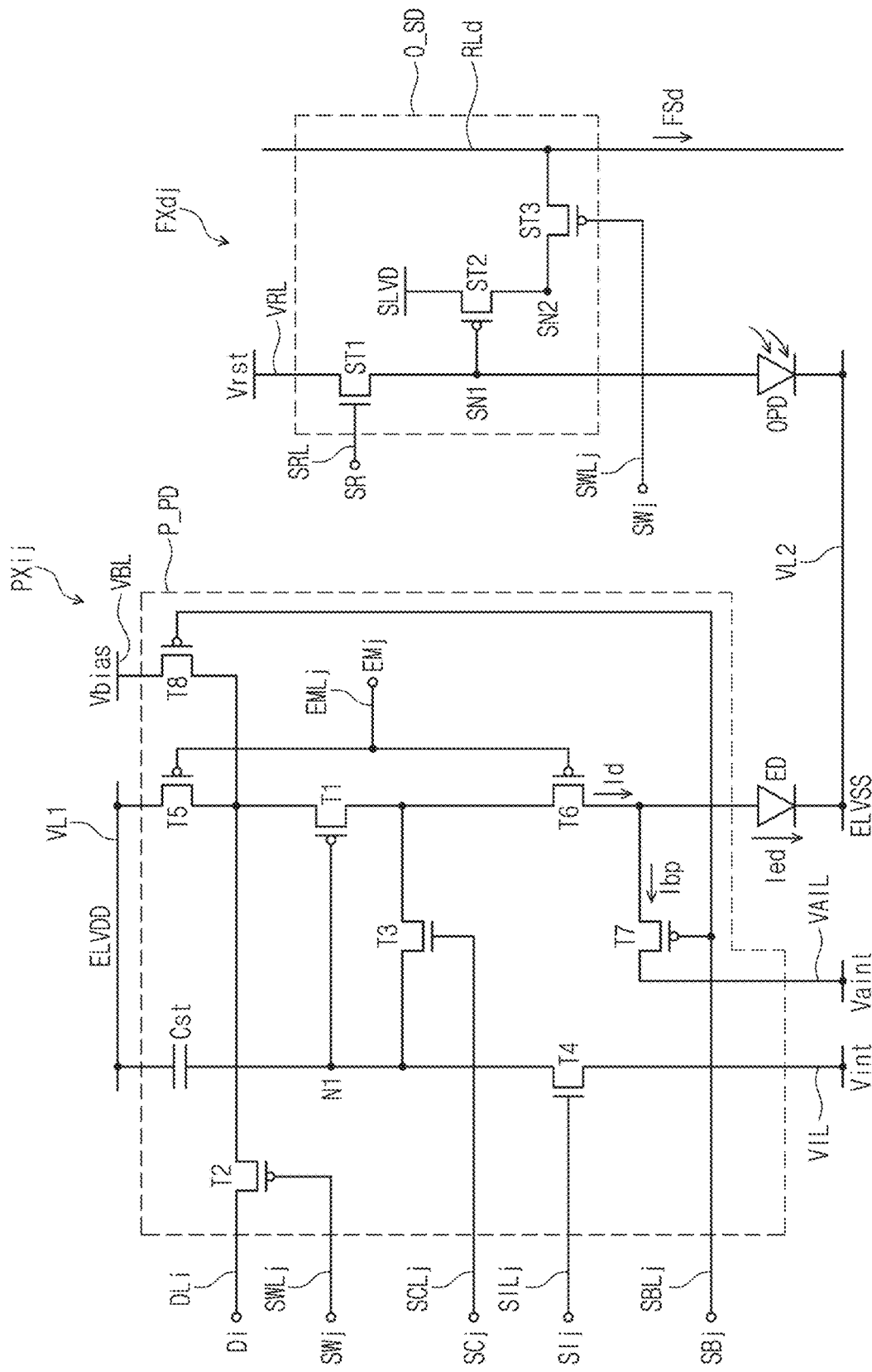
FIG. 4A is a circuit diagram illustrating a pixel and a sensor according to some embodiments of the present disclosure.
Figure 4B:
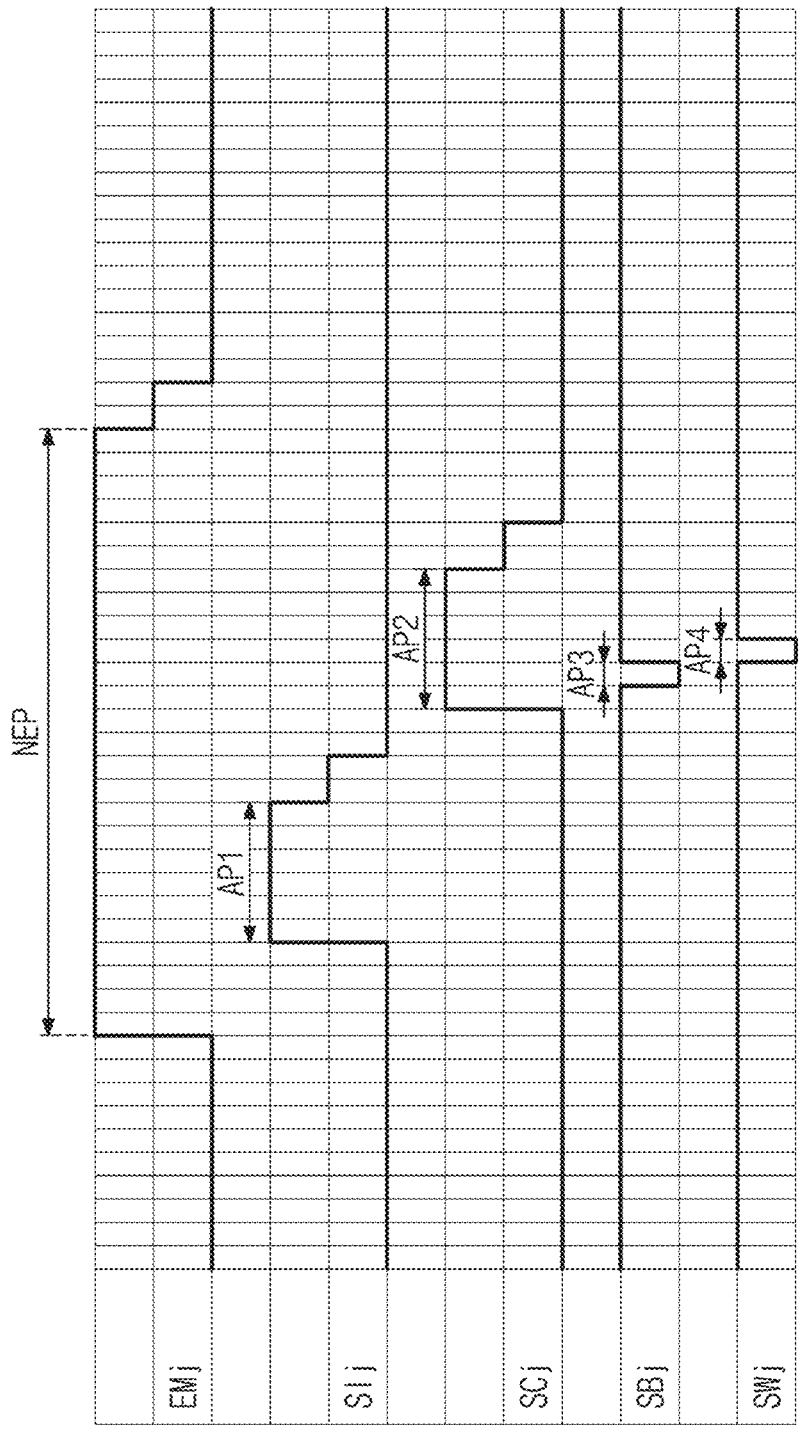
FIG. 4B is a waveform diagram for explaining operations of the pixel and the sensor illustrated in FIG. 4A, according to some embodiments of the present disclosure.

FIG. 4A is a circuit diagram illustrating a pixel and a sensor according to some embodiments of the present disclosure, and FIG. 4B is a waveform diagram for explaining operations of the pixel and the sensor illustrated in FIG. 4A, according to some embodiments of the present disclosure.

In FIG. 4A, an equivalent circuit diagram of one pixel PXij among the plurality of pixels PX illustrated in FIG. 3 is illustrated. Because the plurality of pixels PX have the same circuit structure, description of the circuit structure of the pixel PXij may be applied to the remaining pixels, and detailed description of the remaining pixels will be omitted. Furthermore, in FIG. 4A, an equivalent circuit diagram of one sensor FXdj among the plurality of sensors FX illustrated in FIG. 3 is illustrated. Because the plurality of sensors FX have the same circuit structure, description of the circuit structure of the sensor FXdj may be applied to the remaining sensors, and detailed description of the remaining sensors will be omitted.

Referring to FIG. 4A, the pixel PXij may be connected to an i-th data line DLi among the data lines DL1 to DLm, a j-th initialization scan line SILj among the initialization scan lines SIL1 to SILn, a j-th compensation scan line SCLj among the compensation scan lines SCL1 to SCLn, a j-th write scan line SWLj among the write scan lines SWL1 to SWLn, a j-th black scan line SBLj among the black scan lines SBL1 to SBLn, and a j-th emission control line EMLj among the emission control lines EML1 to EMLn.

The pixel PXij includes a light emitting element ED and a pixel drive circuit P_PD. The light emitting element ED may be a light emitting diode. In some embodiments of the present disclosure, the light emitting element ED may be an organic light emitting diode including an organic light emitting layer.

The pixel drive circuit P_PD may include first to eighth transistors T1, T2, T3, T4, T5, T6, T7, and T8 and one capacitor Cst. At least one of the first to eighth transistors T1 to T8 may be a transistor having a low-temperature polycrystalline silicon (LTPS) semiconductor layer. Some of the first to eighth transistors T1 to T8 may be P-type transistors, and the others may be N-type transistors. At least one of the first to eighth transistors T1 to T8 may be a transistor having an oxide semiconductor layer. For example, the third and fourth transistors T3 and T4 may be oxide semiconductor transistors, and the first, second, and fifth to eighth transistors T1, T2, and T5 to T8 may be LTPS transistors. The third and fourth transistors T3 and T4 may be NMOS transistors.

The configuration of the pixel drive circuit P_PD according to the present disclosure is not limited to the embodiment illustrated in FIG. 4A. The pixel drive circuit P_PD illustrated in FIG. 4A is merely an example, and various suitable changes and modifications may be made to the configuration of the pixel drive circuit P_PD. For example, the first, second, and fifth to eighth transistors T1, T2, and T5 to T8 may all be P-type transistors or N-type transistors.

The j-th initialization scan line SILj, the j-th compensation scan line SCLj, the j-th write scan line SWLj, the j-th black scan line SBLj, and the j-th emission control line EMLj may transfer the j-th initialization scan signal SIj, the j-th compensation scan signal SCj, the j-th write scan signal SWj, the j-th black scan signal SBj, and the j-th emission control signal EMj, respectively, to the pixel PXij. The i-th data line DLi may transfer the i-th data signal Di to the pixel PXij. The i-th data signal Di may have a voltage level corresponding to the image signal RGB (e.g., refer to FIG. 3) that is input to the display device DD (e.g., refer to FIG. 3).

In some embodiments of the present disclosure, the pixel PXij may be connected to first and second drive voltage lines VL1 and VL2, first and second initialization voltage lines VIL and VAIL, and a bias voltage line VBL. The first drive voltage line VL1 may transfer the first drive voltage ELVDD to the pixel PXij, and the second drive voltage line VL2 may transfer the second drive voltage ELVSS to the pixel PXij. In addition, the first initialization voltage line VIL may transfer the first initialization voltage Vint to the pixel PXij, and the second initialization voltage line VAIL may transfer the second initialization voltage Vaint to the pixel PXij. The bias voltage line VBL may transfer the bias voltage Vbias to the pixel PXij.

The first transistor T1 may be connected between the first drive voltage line VL1, which receives the first drive voltage ELVDD, and the light emitting element ED. The first transistor T1 may include a first electrode connected with the first drive voltage line VL1 via the fifth transistor T5, a second electrode connected with an anode electrode of the light emitting element ED via the sixth transistor T6, and a third electrode (e.g., a gate electrode) connected with one end of the capacitor Cst (e.g., a first node N1). The first transistor T1 may receive the i-th data signal Di that the i-th data line DLi transfers depending on a switching operation of the second transistor T2 and may supply a drive current Id to the light emitting element ED.

The second transistor T2 may be connected between the i-th data line DLi and the first electrode of the first transistor T1. The second transistor T2 may include a first electrode connected with the i-th data line DLi, a second electrode connected with the first electrode of the first transistor T1, and a third electrode (e.g., a gate electrode) connected with the j-th write scan line SWLj. The second transistor T2 may be turned on depending on the j-th write scan signal SWj transferred through the j-th write scan line SWLj and may transfer, to the first electrode of the first transistor T1, the i-th data signal Di transferred from the i-th data line DLi.

The third transistor T3 may be connected between the second electrode of the first transistor T1 and the first node N1. The third transistor T3 may include a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on depending on the j-th compensation scan signal SCj transferred through the j-th compensation scan line SCLj and may diode-connect the first transistor T1 by connecting the third electrode and the second electrode of the first transistor T1.

The fourth transistor T4 may be connected between the first initialization voltage line VIL, to which the first initialization voltage Vint is applied, and the first node N1. The fourth transistor T4 may include a first electrode connected with the first initialization voltage line VIL to which the first initialization voltage Vint is transferred, a second electrode connected with the first node N1, and a third electrode (e.g., a gate electrode) connected with the j-th initialization scan line SILj. The fourth transistor T4 may be turned on depending on the j-th initialization scan signal Slj transferred through the j-th initialization scan line SILj. The turned-on fourth transistor T4 initializes the potential of the third electrode of the first transistor T1 (that is, the potential of the first node N1) by transferring the first initialization voltage Vint to the first node N1.

The fifth transistor T5 may include a first electrode connected with the first drive voltage line VL1, a second electrode connected with the first electrode of the first transistor T1, and a third electrode (e.g., a gate electrode) connected to the j-th emission control line EMLj.

The sixth transistor T6 may include a first electrode connected with the second electrode of the first transistor T1, a second electrode connected to the anode electrode of the light emitting element ED, and a third electrode (e.g., a gate electrode) connected to the j-th emission control line EMLj.

The fifth and sixth transistors T5 and T6 may be simultaneously turned on depending on the j-th emission control signal EMj transferred through the j-th emission control line EMLj. The first drive voltage ELVDD applied through the turned-on fifth transistor T5 may be compensated for through the diode-connected first transistor T1 and, thereafter, may be transferred to the light emitting element ED.

The seventh transistor T7 may include a first electrode connected to the second initialization voltage line VAIL to which the second initialization voltage Vaint is transferred, a second electrode connected with the second electrode of the sixth transistor T6, and a third electrode (e.g., a gate electrode) connected with the j-th black scan line SBLj. The second initialization voltage Vaint may have a voltage level lower than or equal to the voltage level of the first initialization voltage Vint.

The eighth transistor T8 may include a first electrode connected to the bias voltage line VBL to which the bias voltage Vbias is transferred, a second electrode connected with the first electrode of the first transistor T1, and a third electrode (e.g., a gate electrode) connected with the j-th black scan line SBLj.

The seventh and eighth transistors T7 and T8 may be simultaneously turned on depending on the j-th black scan signal SBj transferred through the j-th black scan line SBLj. The second initialization voltage Vaint applied through the turned-on seventh transistor T7 may be transferred to the anode electrode of the light emitting element ED. Accordingly, the anode electrode of the light emitting element ED may be initialized to the second initialization voltage Vaint. The bias voltage Vbias applied through the turned-on eighth transistor T8 may be transferred to the first electrode of the first transistor T1. Accordingly, the bias voltage Vbias may be periodically applied to the first electrode of the first transistor T1. As a result, deterioration in display quality due to an increase in the potential difference between the first and second electrodes of the first transistor T1 to a preset level or higher by a hysteresis phenomenon may be prevented or reduced.

The one end of the capacitor Cst may be connected with the third electrode of the first transistor T1 as described above, and an opposite end of the capacitor Cst is connected with the first drive voltage line VL1. A cathode electrode of the light emitting element ED may be connected with the second drive voltage line VL2 that transfers the second drive voltage ELVSS. The second drive voltage ELVSS may have a lower voltage level than the first drive voltage ELVDD. In some embodiments of the present disclosure, the second drive voltage ELVSS may have a lower voltage level than the first and second initialization voltages Vint and Vaint.

Referring to FIGS. 4A and 4B, the j-th emission control signal EMj may have a high level during a non-light emission period NEP. Within the non-light emission period NEP, the j-th initialization scan signal Slj may be activated. When the j-th initialization scan signal Slj having a high level is provided through the j-th initialization scan line SILj during an activation period AP1 (hereinafter, referred to as a first activation period) of the j-th initialization scan signal Slj, the fourth transistor T4 may be turned on in response to the j-th initialization scan signal Slj having the high level. The first initialization voltage Vint may be transferred to the third electrode of the first transistor T1 through the turned-on fourth transistor T4, and the first node N1 may be initialized to the first initialization voltage Vint. Accordingly, the first activation period AP1 may be defined as an initialization period of the pixel PXij.

Next, when the j-th compensation scan signal SCj may be activated and the j-th compensation scan signal SCj having a high level is supplied through the j-th compensation scan line SCLj during an activation period AP2 (hereinafter, referred to as a second activation period) of the j-th compensation scan signal SCj, the third transistor T3 may be turned on. The first transistor T1 may be diode-connected by the turned-on third transistor T3 and forward-biased. The first activation period AP1 may not overlap with the second activation period AP2.

Within the second activation period AP2, the j-th write scan signal SWj may be activated. The j-th write scan signal SWj has a low level during an activation period AP4 (hereinafter, referred to as a fourth activation period). During the fourth activation period AP4, the second transistor T2 may be turned on by the j-th write scan signal SWj having the low level. Then, a compensation voltage "Di-Vth" (e.g., Di minus Vth) obtained by subtracting the threshold voltage (Vth) of the first transistor T1 from the i-th data signal Di supplied from the i-th data line DLi may be applied to the third electrode of the first transistor T1. That is, the potential of the third electrode of the first transistor T1 may be the compensation voltage "Di-Vth". The fourth activation period AP4 may overlap with the second activation period AP2. The duration of the second activation period AP2 may be greater than the duration of the fourth activation period AP4.

The first drive voltage ELVDD and the compensation voltage "Di-Vth" may be applied to the opposite ends of the capacitor Cst, and charges corresponding to a difference between voltages at the opposite ends of the capacitor Cst may be stored in the capacitor Cst. Here, the period during which the j-th compensation scan signal SCj has the high level may be referred to as the compensation period of the pixel PXij.

The j-th black scan signal SBj may be activated within the second activation period AP2 of the j-th compensation scan signal SCj. The j-th black scan signal SBj may have a low level during an activation period AP3 (hereinafter, referred to as a third activation period). During the third activation period AP3, the seventh transistor T7 may be turned on by receiving the j-th black scan signal SBj having the low level through the j-th black scan line SBLj. A portion of the drive current Id may escape through the seventh transistor T7 as a bypass current Ibp. The third activation period AP3 may overlap with the second activation period AP2. The duration of the second activation period AP2 may be greater than the duration of the third activation period AP3. The third activation period AP3 may precede the fourth activation period AP4 and may not overlap with the fourth activation period AP4.

When the pixel PXij displays a black image, the pixel PXij is not able to normally display the black image if the light emitting element ED emits light, even though the minimum drive current of the first transistor T1 flows as the drive current Id. Accordingly, the seventh transistor T7 in the pixel PXij according to some embodiments of the present disclosure may distribute a portion of the minimum drive current of the first transistor T1 as the bypass current Ibp to a current path other than the current path toward the light emitting element ED. Here, the minimum drive current of the first transistor T1 means a current flowing to the first transistor T1 under the condition that a gate-source voltage (Vgs) of the first transistor T1 is lower than the threshold voltage Vth, so that the first transistor T1 is turned off. The minimum drive current (e.g., a current of 10 pA or less) flowing to the first transistor T1, under the condition that the first transistor T1 is turned off, may be transferred to the light emitting element ED, and a black gray-scale image is displayed. When the pixel PXij displays the black image, an influence of the bypass current Ibp on the minimum drive current is relatively great, whereas when the pixel PXij displays an image such as a general image or a white image, the bypass current Ibp has little influence on the drive current Id. Accordingly, when the pixel PXij displays the black image, the current obtained by subtracting the bypass current Ibp escaping through the seventh transistor T7 from the drive current Id (that is, a light emission current Ied) may be provided to the light emitting element ED, so that the pixel PXij clearly expresses the black image. Thus, the pixel PXij may implement an accurate black gray-scale image using the seventh transistor T7, thereby improving (e.g., increasing) the contrast ratio.

After that, the j-th emission control signal EMj supplied from the j-th emission control line EMLj is changed from the high level to a low level. The fifth and sixth transistors T5 and T6 may be turned on by the emission control signal EMj having the low level. Then, the drive current Id, depending on the difference between the voltage of the third electrode of the first transistor T1 and the first drive voltage ELVDD, is generated. The drive current Id may be supplied to the light emitting element ED through the sixth transistor T6, and the light emission current Ied may flow through the light emitting element ED.

Referring again to FIG. 4A, the sensor FXdj may be connected to the d-th readout line RLd among the readout lines RL1 to RLh, the j-th write scan line SWLj, and a reset control line SRL, according to some embodiments of the present disclosure.

The sensor FXdj may include a light receiving element OPD and a sensor drive circuit O_SD. In some embodiments of the present disclosure, the light receiving element OPD may be an organic photo diode including an organic material as a photoelectric conversion layer. Although FIG. 4A illustrates a structure in which the sensor FXdj includes one light receiving element, the present disclosure is not limited thereto. For example, the sensor FXdj may include a plurality of light receiving elements OPD connected in parallel.

An anode electrode of the light receiving element OPD may be connected to a first sensing node SN1, and a cathode electrode of the light receiving element OPD may be connected with the second drive voltage line VL2 that transfers the second drive voltage ELVSS. The cathode electrode of the light receiving element OPD may be electrically connected with the cathode electrode of the light emitting element ED. In some embodiments of the present disclosure, the cathode electrode of the light receiving element OPD may be integrally formed with the cathode electrode of the light emitting element ED to form a common cathode electrode.

The sensor drive circuit O_SD may include three transistors ST1, ST2, and ST3. The three transistors ST1, ST2, and ST3 may be a reset transistor ST1, an amplifying transistor ST2, and an output transistor ST3, respectively. At least one of the reset transistor ST1, the amplifying transistor ST2, or the output transistor ST3 may be an oxide semiconductor transistor. In some embodiments of the present disclosure, the reset transistor ST1 may be an oxide semiconductor transistor, and the amplifying transistor ST2 and the output transistor ST3 may be LTPS transistors. However, without being limited thereto, at least the reset transistor ST1 and the output transistor ST3 may be oxide semiconductor transistors, and the amplifying transistor ST2 may be an LTPS transistor.

Furthermore, some of the reset transistor ST1, the amplifying transistor ST2, and the output transistor ST3 may be P-type transistors, and the rest may be N-type transistors. In some embodiments of the present disclosure, the amplifying transistor ST2 and the output transistor ST3 may be PMOS transistors, and the reset transistor ST1 may be an NMOS transistor. However, without being limited thereto, the reset transistor ST1, the amplifying transistor ST2, and the output transistor ST3 may all be N-type transistors or P-type transistors.

Some of the reset transistor ST1, the amplifying transistor ST2, and the output transistor ST3 (e.g., the reset transistor ST1) may be of the same kind as the third and fourth transistors T3 and T4 of the pixel PXij. The amplifying transistor ST2 and the output transistor ST3 may be transistors of the same kind as the first, second, and fifth to eighth transistors T1, T2, and T5 to T8 of the pixel PXij.

The circuit configuration of the sensor drive circuit O_SD according to the present disclosure is not limited to that illustrated in FIG. 4A. The sensor drive circuit O_SD illustrated in FIG. 4A is merely illustrative, and various suitable changes and modifications may be made to the configuration of the sensor drive circuit O_SD.

The reset transistor ST1 may include a first electrode that receives the reset voltage Vrst, a second electrode connected with the first sensing node SN1, and a third electrode that receives a reset control signal SR. The reset transistor ST1 may reset the potential of the first sensing node SN1 to the reset voltage Vrst in response to the reset control signal SR. The reset control signal SR may be a signal provided through the reset control line SRL. However, the present disclosure is not limited thereto. In some examples, the reset control signal SR may be the j-th compensation scan signal SCj supplied through the j-th compensation scan line SCLj. That is, the reset transistor ST1 may receive the j-th compensation scan signal SCj, which is supplied from the j-th compensation scan line SCLj, as the reset control signal SR. In some embodiments of the present disclosure, the reset voltage Vrst may have a lower voltage level than the second drive voltage ELVSS at least during an activation period of the reset control signal SR. The reset voltage Vrst may be transferred to the sensor FXdj through a reset voltage line VRL. The reset voltage Vrst may be a DC voltage maintained at a voltage level lower than that of the second drive voltage ELVSS.

The reset transistor ST1 may include a plurality of sub-reset transistors connected in series. For example, the reset transistor ST1 may include two sub-reset transistors (hereinafter, referred to as the first and second sub-reset transistors). In this case, a third electrode of the first sub-reset transistor and a third electrode of the second sub-reset transistor may be connected to the reset control line SRL. Furthermore, a second electrode of the first sub-reset transistor and a first electrode of the second sub-reset transistor may be electrically connected with each other. In addition, the reset voltage Vrst may be applied to a first electrode of the first sub-reset transistor, and a second electrode of the second sub-reset transistor may be electrically connected with the first sensing node SN1. However, the number of sub-reset transistors is not limited thereto and may be modified in various suitable ways.

The amplifying transistor ST2 may include a first electrode that receives a sensing drive voltage SLVD, a second electrode connected with a second sensing node SN2, and a third electrode connected with the first sensing node SN1. The amplifying transistor ST2 may be turned on depending on the potential of the first sensing node SN1 and may apply the sensing drive voltage SLVD to the second sensing node SN2. In some embodiments of the present disclosure, the sensing drive voltage SLVD may be one of the first drive voltage ELVDD, the first initialization voltage Vint, and/or the second initialization voltage Vaint. When the sensing drive voltage SLVD is the first drive voltage ELVDD, the first electrode of the amplifying transistor ST2 may be electrically connected to the first drive voltage line VL1. When the sensing drive voltage SLVD is the first initialization voltage Vint, the first electrode of the amplifying transistor ST2 may be electrically connected to the first initialization voltage line VIL, and when the sensing drive voltage SLVD is the second initialization voltage Vaint, the first electrode of the amplifying transistor ST2 may be electrically connected to the second initialization voltage line VAIL.

The output transistor ST3 may include a first electrode connected with the second sensing node SN2, a second electrode connected with the d-th readout line RLd, and a third electrode that receives an output control signal. In response to the output control signal, the output transistor ST3 may transfer a detection signal FSd to the d-th readout line RLd. The output control signal may be the j-th write scan signal SWj supplied through the j-th write scan line SWLj. That is, the output transistor ST3 may receive the j-th write scan signal SWj, which is supplied from the j-th write scan line SWLj, as the output control signal.

The light receiving element OPD of the sensor FXdj may be exposed to light during a light emission period of the light emitting element ED. The light may be light output from the light emitting element ED.

If the user's hand US_F (e.g., refer to FIG. 1) touches the display surface IS (see, e.g., FIG. 1), the light receiving element OPD may generate photo-charges corresponding to light reflected by ridges of a fingerprint or valleys between the ridges. The amount of current flowing through the light receiving element OPD varies depending on the generated photo-charges. When the light receiving element OPD receives light reflected by the ridges of the fingerprint, a current flowing through the light receiving element OPD may be referred to as a first current, and when the light receiving element OPD receives light reflected by the valleys of the fingerprint, a current flowing through the light receiving element OPD may be referred to as a second current. The amount of light reflected by the ridges of the fingerprint and the amount of light reflected by the valleys of the fingerprint differ from each other, and the difference between the amounts of light appears as a difference between the first and second currents. When the first current flows through the light receiving element OPD, the potential of the first sensing node SN1 may be referred to as the first potential, and when the second current flows through the light receiving element OPD, the potential of the first sensing node SN1 may be referred to as the second potential. In some embodiments of the present disclosure, the first current may be greater than the second current. In this case, the first potential may be lower than the second potential.

The amplifying transistor ST2 may be a source follower amplifier that generates a source-drain current in proportion to the potential of the first sensing node SN1 that is input to the third electrode.

During the fourth activation period AP4, the j-th write scan signal SWj having the low level may be supplied to the output transistor ST3 through the j-th write scan line SWLj. When the output transistor ST3 is turned on in response to the j-th write scan signal SWj having the low level, the detection signal FSd corresponding to a current flowing through the amplifying transistor ST2 may be output to the d-th readout line RLd.

When the reset control signal SR having a high level is supplied through the reset control line SRL during a reset period, the reset transistor ST1 is turned on. The reset period may be defined as an activation period (that is, a high-level period) of the reset control signal SR. In some examples, when the reset transistor ST1 is implemented with a P-type transistor, the reset control signal SR having a low level may be supplied to the reset control line SRL during the reset period. The first sensing node SN1 may be reset to a potential corresponding to the reset voltage Vrst during the reset period. In some embodiments of the present disclosure, the reset voltage Vrst may have a lower voltage level than the second drive voltage ELVSS.

When the reset period ends, the light receiving element OPD may generate photo-charges corresponding to received light, and the generated photo-charges may be accumulated in the first sensing node SN1.

Figure 5:
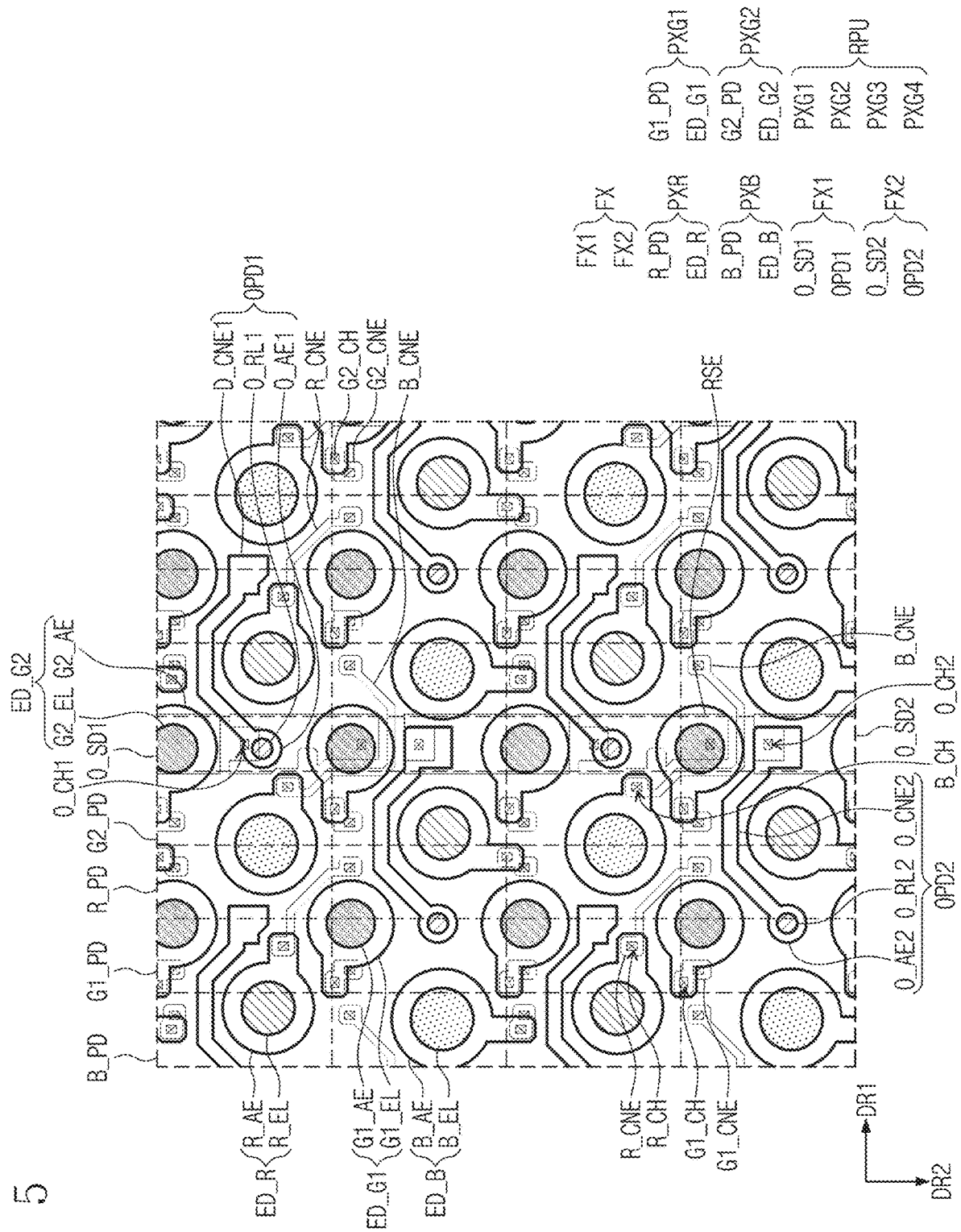
FIG. 5 is an enlarged plan view illustrating a partial region of a display panel according to some embodiments of the present disclosure.

FIG. 5 is an enlarged plan view illustrating a partial region of the display panel according to some embodiments of the present disclosure.

Referring to FIG. 5, the display panel DP may include a plurality of pixels PXR, PXG1, PXG2, and PXB and a plurality of sensors FX, according to some embodiments of the present disclosure.

The plurality of pixels PXR, PXG1, PXG2, and PXB may be grouped into a plurality of reference pixel units RPU. In some embodiments of the present disclosure, each of the reference pixel units RPU may include four pixels, that is, a first pixel PXB (hereinafter, referred to as the blue pixel), a second pixel PXR (hereinafter, referred to as the red pixel), and two third pixels PXG1 and PXG2 (hereinafter, referred to as the first and second green pixels). However, the number of pixels included in each reference pixel unit RPU is not limited thereto. In some examples, each reference pixel unit RPU may include three pixels, that is, a blue pixel PXB, a red pixel PXR, and a green pixel (one of first and second green pixels PXG1 and PXG2).

The blue pixel PXB may include a first light emitting element ED_B (hereinafter, referred to as the blue light emitting element), the red pixel PXR may include a second light emitting element ED_R (hereinafter, referred to as the red light emitting element), and the first and second green pixels PXG1 and PXG2 include third and fourth light emitting elements ED_G1 and ED_G2 (hereinafter, referred to as the first and second green light emitting elements), respectively. In some embodiments of the present disclosure, the blue light emitting element ED_B outputs first color light (e.g., blue light), and the red light emitting element ED_R outputs second color light (e.g., red light) different from the first color light. Each of the first and second green light emitting elements ED_G1 and ED_G2 outputs third color light (e.g., green light) that is different from the first color light and the second color light. The green light output from the first green light emitting element ED_G1 may have the same wavelength band as the green light output from the second green light emitting element ED_G2.

The red light emitting elements ED_R and the blue light emitting elements ED_B may be alternately and repeatedly disposed in the first and second directions DR1 and DR2. The first and second green light emitting elements ED_G1 and ED_G2 may be alternately and repeatedly disposed in the first direction DR1 and alternately and repeatedly disposed in the second direction DR2. In a first row (e.g., an odd-numbered row) parallel to the first direction DR1, the light emitting elements ED_R, ED_G1, ED_G2, and ED_B may be arranged in the order of the red light emitting element ED_R, the first green light emitting element ED_G1, the blue light emitting element ED_B, and the second green light emitting element ED_G2. In a second row (e.g., an even-numbered row) parallel to the first direction DR1, the light emitting elements ED_R, ED_G1, ED_G2, and ED_B may be arranged in the order of the blue light emitting element ED_B, the second green light emitting element ED_G2, the red light emitting element ED_R, and the first green light emitting element ED_G1.

In some embodiments of the present disclosure, the red light emitting element ED_R may have a larger size than the first and second green light emitting elements ED_G1 and ED_G2. In addition, the blue light emitting element ED_B may have a size larger than or equal to the size of the red light emitting element ED_R. The sizes of the light emitting elements ED_R, ED_G1, ED_G2, and ED_B are not limited thereto and may be modified in various suitable ways. For example, in some embodiments of the present disclosure, the light emitting elements ED_R, ED_G1, ED_G2, and ED_B may have the same size.

The first and second green light emitting elements ED_G1 and ED_G2 may have the same shape as the red and blue light emitting elements ED_R and ED_B. In some embodiments of the present disclosure, each of the red and blue light emitting elements ED_R and ED_B and the first and second green light emitting elements ED_G1 and ED_G2 may have a circular shape. In some examples, each of the red and blue light emitting elements ED_R and ED_B and the first and second green light emitting elements ED_G1 and ED_G2 may have a polygonal shape (e.g., one of an octagonal shape, a square shape, and a rectangular shape). However, the present disclosure is not limited thereto, and the red and blue light emitting elements ED_R and ED_B and the first and second green light emitting elements ED_G1 and ED_G2 may have different shapes.

The blue light emitting element ED_B may be electrically connected to a blue pixel drive circuit B_PD (or, a first pixel drive circuit). Specifically, the blue light emitting element ED_B may include a blue anode electrode B_AE (or a first pixel anode electrode) and a blue emissive layer B_EL, and the blue anode electrode B_AE may be electrically connected with the blue pixel drive circuit B_PD through a blue pixel connecting electrode B_CNE (or a first pixel connecting electrode). The blue pixel connecting electrode B_CNE may be connected with the blue anode electrode B_AE and the blue pixel drive circuit B_PD through a blue contact hole B_CH.

The red light emitting element ED_R may be electrically connected to a red pixel drive circuit R_PD (or, a second pixel drive circuit). Specifically, the red light emitting element ED_R may include a red anode electrode R_AE (or a second pixel anode electrode) and a red emissive layer R_EL, and the red anode electrode R_AE may be electrically connected with the red pixel drive circuit R_PD through a red pixel connecting electrode R_CNE (or a second pixel connecting electrode). The red pixel connecting electrode R_CNE may be connected with the red anode electrode R_AE and the red pixel drive circuit R_PD through red contact holes R_CH.

The first green light emitting element ED_G1 may be electrically connected to a first green pixel drive circuit G1_PD (or, a third pixel drive circuit). Specifically, the first green light emitting element ED_G1 may include a first green anode electrode G1_AE (or a third pixel anode electrode) and a first green emissive layer G1_EL, and the first green anode electrode G1_AE may be electrically connected with the first green pixel drive circuit G1_PD through a first green pixel connecting electrode G1_CNE (or a third pixel connecting electrode). The first green pixel connecting electrode G1_CNE may be connected with the first green anode electrode G1_AE and the first green pixel drive circuit G1_PD through first green contact holes G1_CH. The second green light emitting element ED_G2 may be electrically connected to a second green pixel drive circuit G2_PD (or, a fourth pixel drive circuit). Specifically, the second green light emitting element ED_G2 may include a second green anode electrode G2_AE (or a fourth pixel anode electrode) and a second green emissive layer G2_EL, and the second green anode electrode G2_AE may be electrically connected with the second green pixel drive circuit G2_PD through a second green pixel connecting electrode G2_CNE (or a fourth pixel connecting electrode). The second green pixel connecting electrode G2_CNE may be connected with the second green anode electrode G2_AE and the second green pixel drive circuit G2_PD through second green contact holes G2_CH.

The first green emissive layer G1_EL and the second green emissive layer G2_EL may have the same size and the same shape. However, the present disclosure may be not limited thereto. For example, the first green emissive layer G1_EL and the second green emissive layer G2_EL may have the same size (or, area), but may have different shapes. In some examples, the first green anode electrode G1_AE and the second green anode electrode G2_AE may have different sizes (or, areas) and different shapes.

In the first row (e.g., an odd-numbered row), the pixel drive circuits R_PD, G1_PD, G2_PD, and B_PD may be arranged in the order of the blue pixel drive circuit B_PD, the second green pixel drive circuit G2_PD, the red pixel drive circuit R_PD, and the first green pixel drive circuit G1_PD. In the second row (e.g., an even-numbered row), the pixel drive circuits R_PD, G1_PD, G2_PD, and B_PD may be arranged in the order of the blue pixel drive circuit B_PD, the first green pixel drive circuit G1_PD, the red pixel drive circuit R_PD, and the second green pixel drive circuit G2_PD. The first and second rows may be repeated in the second direction DR2.

In some embodiments of the present disclosure, the blue pixel drive circuits B_PD may be disposed in a first column parallel to the second direction DR2, and the first and second green pixel drive circuits G1_PD and G2_PD may be alternately disposed in a second column parallel to the second direction DR2. The red pixel drive circuits R_PD may be disposed in a third column, and the second and first green pixel drive circuits G2_PD and G1_PD may be alternately disposed in a fourth column.

Each of sensors FX1 and FX2 may include a light receiving element OPD1 or OPD2 and a sensor drive circuit O_SD1 or O_SD2. In some embodiments of the present disclosure, one light receiving element OPD1 or OPD2 may be disposed to correspond to one reference pixel unit RPU. However, the number of light receiving elements disposed to correspond to each reference pixel unit RPU is not limited thereto. For example, two light receiving elements may be disposed to correspond to each reference pixel unit RPU.

A plurality of light receiving elements OPD1 and OPD2 may be arranged in the first and second directions DR1 and DR2 in the display panel DP. When the first direction DR1 may be defined as a row direction and the second direction DR2 may be defined as a column direction, the light receiving element disposed in the first row (e.g., an odd-numbered row) among the light receiving elements OPD1 and OPD2 is referred to as the first light receiving element OPD1, and the light receiving element disposed in the second row (e.g., an even-numbered row) is referred to as the second light receiving element OPD2.

Each of the first and second light receiving elements OPD1 and OPD2 may be disposed between the red and blue light emitting elements ED_R and ED_B in the first direction DR1. The first light receiving element OPD1 may be disposed between two first green light emitting elements ED_G1 adjacent to each other in the second direction DR2, and the second light receiving element OPD2 may be disposed between two second green light emitting elements ED_G2 adjacent to each other in the second direction DR2.

The sensor drive circuits O_SD1 and O_SD2 may be arranged in the first and second directions DR1 and DR2 in the display panel DP. Each of the sensor drive circuits O_SD1 and O_SD2 may have the same length as the red and blue pixel drive circuits R_PD and B_PD and the first and second green pixel drive circuits G1_PD and G2_PD in the second direction DR2. Among the sensor drive circuits O_SD1 and O_SD2, the sensor drive circuit disposed in the first row (e.g., an odd-numbered row) is referred to as the first sensor drive circuit O_SD1, and the sensor drive circuit disposed in the second row (e.g., an even-numbered row) is referred to as the second sensor drive circuit O_SD2. The first and second sensor drive circuits O_SD1 and O_SD2 may be alternately disposed in the second direction DR2 in a fifth column parallel to the second direction DR2. The fifth column may be adjacent to the fourth column, and the first to fifth columns may be repeated in the second direction DR2.

The first light receiving element OPD1 may be connected to the first sensor drive circuit O_SD1, and the second light receiving element OPD2 may be connected to the second sensor drive circuit O_SD2. In some embodiments of the present disclosure, the first light receiving element OPD1 may be disposed in a position overlapping with the first sensor drive circuit O_SD1 when viewed from above the plane (e.g., in a plan view), and the second light receiving element OPD2 may be disposed in a position not overlapping with the second sensor drive circuit O_SD2 when viewed from above the plane (e.g., in a plan view).

The first light receiving element OPD1 may include a first sensor anode electrode O_AE1 (or a first row anode electrode) and a first photoelectric conversion layer O_RL1, and the second light receiving element OPD2 may include a second sensor anode electrode O_AE2 (or a second row anode electrode) and a second photoelectric conversion layer O_RL2. The first sensor anode electrode O_AE1 may be provided in a position overlapping with the first sensor drive circuit O_SD1. The first sensor anode electrode O_AE1 may be directly connected with the first sensor drive circuit O_SD1 through a first sensor contact hole O_CH1. The second sensor anode electrode O_AE2 may be provided in a position not overlapping with the second sensor drive circuit O_SD2. The second light receiving element OPD2 further may include a sensor connecting electrode O_CNE2 extending from the second sensor anode electrode O_AE2 in the first direction DR1 so as to overlap with the second sensor drive circuit O_SD2. That is, the sensor connecting electrode O_CNE2 may have a one-body shape with (e.g., be integrally formed with) the second sensor anode electrode O_AE2. The sensor connecting electrode O_CNE2 may be directly connected with the second sensor drive circuit O_SD2 through a second sensor contact hole O_CH2.

In some embodiments of the present disclosure, the first light receiving element OPD1 further may include a dummy connecting electrode D_CNE1 extending from the first sensor anode electrode O_AE1 in the first direction DR1. That is, the dummy connecting electrode D_CNE1 has a one-body shape with the first sensor anode electrode O_AE1. The sum of the area of the first sensor anode electrode O_AE1 and the area of the dummy connecting electrode D_CNE1 may be about equal to the sum of the area of the second sensor anode electrode O_AE2 and the area of the sensor connecting electrode O_CNE2.

In some embodiments of the present disclosure, the first and second light receiving elements OPD1 and OPD2 may have the same shape as the light emitting elements ED_G1, ED_G2, ED_R, and ED_B. For example, the first and second light receiving elements OPD1 and OPD2 may have a circular shape. However, the shapes of the first and second light receiving elements OPD1 and OPD2 are not limited thereto. For example, the first and second light receiving elements OPD1 and OPD2 may have a polygonal shape (e.g., an octagonal shape, a square shape, or a rectangular shape). In some examples, each of the first and second light receiving elements OPD1 and OPD2 may have a different shape from at least one of the light emitting elements ED_G1, ED_G2, ED_R, and ED_B.

The first and second light receiving elements OPD1 and OPD2 may have a size smaller than or equal to the sizes of the first and second green light emitting elements ED_G1 and ED_G2. However, the sizes of the first and second light receiving elements OPD1 and OPD2 are not particularly limited and may be modified in various suitable ways.

The first and second sensor anode electrodes O_AE1 and O_AE2, the sensor connecting electrode O_CNE2, and the dummy connecting electrode D_CNE1 may be disposed at (e.g., on or in) the same layer as the anode electrodes R_AE, G1_AE, G2_AE, and B_AE. In this case, the first and second sensor anode electrodes O_AE1 and O_AE2, the sensor connecting electrode O_CNE2, and the dummy connecting electrode D_CNE1 may include the same material as the anode electrodes R_AE, G1_AE, G2_AE, and B_AE and may be provided at (e.g., on or in) the same layer as the anode electrodes R_AE, G1_AE, G2_AE, and B_AE through the same process.

The first and second green pixel connecting electrodes G1_CNE and G2_CNE, the red pixel connecting electrode R_CNE, and the blue pixel connecting electrode B_CNE may be disposed on a layer different from the anode electrodes R_AE, G1_AE, G2_AE, and B_AE, the first and second sensor anode electrodes O_AE1 and O_AE2, the sensor connecting electrode O_CNE2, and the dummy connecting electrode D_CNE1.

Figure 6A:
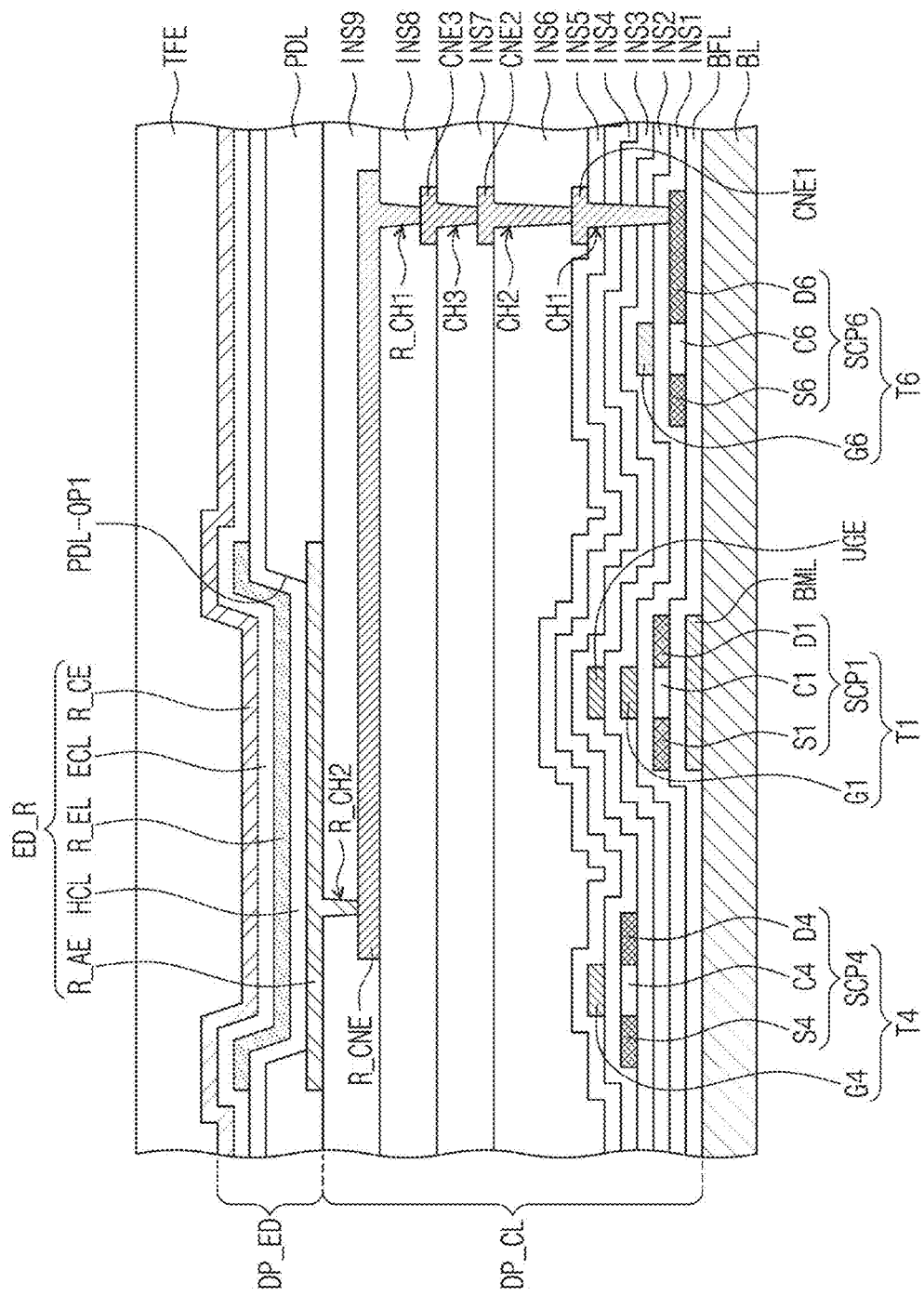
FIG. 6A is a sectional view illustrating a connection structure of a red light emitting element and a red pixel drive circuit illustrated in FIG. 5, according to some embodiments of the present disclosure.
Figure 6B:
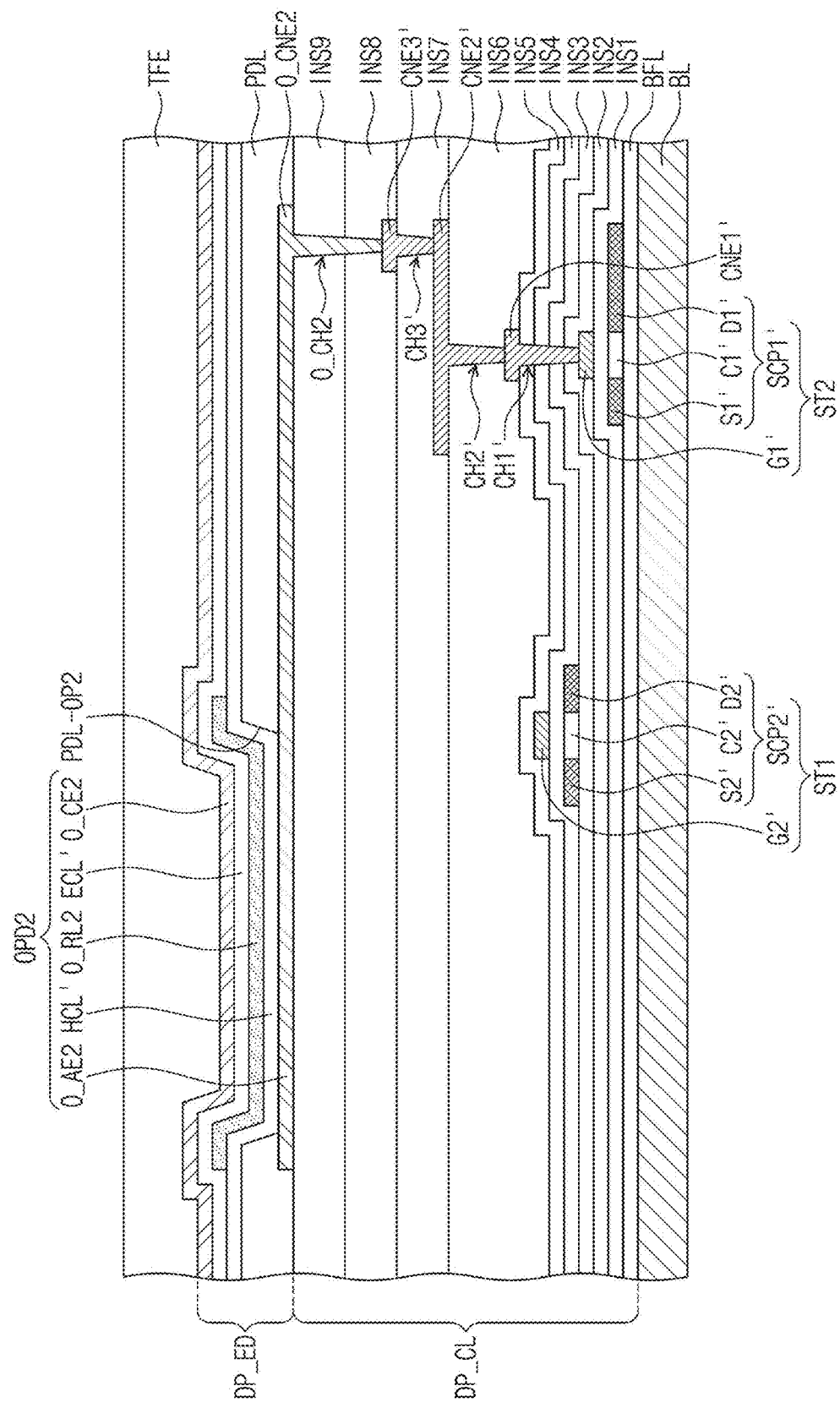
FIG. 6B is a sectional view illustrating a connection structure of a second light receiving element and a second sensor drive circuit illustrated in FIG. 5, according to some embodiments of the present disclosure.

The anode electrodes R_AE, G1_AE, G2_AE, and B_AE, the first and second sensor anode electrodes O_AE1 and O_AE2, the sensor connecting electrode O_CNE2, and the dummy connecting electrode D_CNE1 may be included in the element layer DP_ED (e.g., refer to FIGS. 6A and 6B), and the first and second green pixel connecting electrodes G1_CNE and G2_CNE, the red pixel connecting electrode R_CNE, and the blue pixel connecting electrode B_CNE may be included in the circuit layer DP_CL (e.g., refer to FIGS. 6A and 6B).

The circuit layer DP_CL further may include a shielding electrode RSE overlapping with the first and second sensor drive circuits O_SD1 and O_SD2. In some embodiments of the present disclosure, the first and second green pixel connecting electrodes G1_CNE and G2_CNE, the red pixel connecting electrode R_CNE, and the blue pixel connecting electrode B_CNE may include the same material as the shielding electrode RSE and may be provided at (e.g., on or in) the same layer as the shielding electrode RSE through the same process.

FIG. 6A is a sectional view illustrating a connection structure of the red light emitting element and the red pixel drive circuit illustrated in FIG. 5, according to some embodiments of the present disclosure, and FIG. 6B is a sectional view illustrating a connection structure of the second light receiving element and the second sensor drive circuit illustrated in FIG. 5, according to some embodiments of the present disclosure.

Referring to FIGS. 6A and 6B, the display panel DP may include the base layer BL, the circuit layer DP_CL, and the element layer DP_ED, according to some embodiments of the present disclosure.

The base layer BL may include a synthetic resin layer. The synthetic resin layer may include a thermosetting resin. In particular, the synthetic resin layer may be a polyimide-based resin layer, and the material thereof is not particularly limited. The synthetic resin layer may include at least one of an acrylic resin, a methacrylic resin, a polyisoprene resin, a vinyl resin, an epoxy resin, a urethane-based resin, a cellulosic resin, a siloxane-based resin, a polyamide resin, or a perylene-based resin. In addition, the base layer BL may include a glass substrate, a metal substrate, or an organic/inorganic composite substrate.

At least one inorganic layer may be formed on the upper surface of the base layer BL. The inorganic layer may include at least one of aluminum oxide, titanium oxide, silicon oxide, silicon oxy nitride, zirconium oxide, or hafnium oxide. The inorganic layer may be formed of multiple layers.

The circuit layer DP_CL may be disposed on the base layer BL. In FIG. 6A, first, fourth, and sixth transistors T1, T4, and T6 of the red pixel drive circuit R_PD illustrated in FIG. 5 are illustrated. Referring to FIG. 6A, a shielding layer BML may be disposed on the base layer BL. The shielding layer BML may overlap with the first transistor T1. The shielding layer BML may include metal and may receive a constant voltage. When the constant voltage is applied to the shielding layer BML, the threshold voltage Vth of the first transistor T1 disposed over the shielding layer BML may remain unchanged.

In addition, the shielding layer BML may block light incident to the first transistor T1 from below the shielding layer BML. For example, the shielding layer BML may include reflective metal. In some embodiments of the present disclosure, the shielding layer BML may be omitted.

A buffer layer BFL may be disposed on the base layer BL. The buffer layer BFL may include an inorganic layer. The buffer layer BFL may cover the shielding layer BML. A semiconductor layer SCP1 (or, a semiconductor pattern region, hereinafter, referred to as the first semiconductor layer) of the first transistor T1 and a semiconductor layer SCP6 (or, a semiconductor pattern region, hereinafter, referred to as the sixth semiconductor layer) of the sixth transistor T6 may be disposed on the buffer layer BFL. The first and sixth semiconductor layers SCP1 and SCP6 may include poly-silicon. However, without being limited thereto, the first and sixth semiconductor layers SCP1 and SCP6 may include amorphous silicon.

The first and sixth semiconductor layers SCP1 and SCP6 may be formed through the same process, and partial regions of the first and sixth semiconductor layers SCP1 and SCP6 may be doped with an N-type dopant or a P-type dopant. Each of the first and sixth semiconductor layers SCP1 and SCP6 may include a heavily-doped region and a lightly-doped region. The heavily-doped regions have a higher conductivity than the lightly-doped regions. The heavily-doped regions may substantially correspond to sources and drains of the first and sixth transistors T1 and T6. The lightly-doped regions may substantially correspond to active (or, channel) regions of the first and sixth transistors T1 and T6.

The heavily-doped region of the first semiconductor layer SCP1 may include a first source region S1 and a first drain region D1. The lightly-doped region of the first semiconductor layer SCP1 may be defined as a first channel region C1 and may be disposed between the first source region S1 and the first drain region D1. The sixth semiconductor layer SCP6 may include a sixth source region S6, a sixth channel region C6, and a sixth drain region D6. The first source region S1 is defined as a first electrode of the first transistor T1, and the first drain region D1 is defined as a second electrode of the first transistor T1. The sixth source region S6 is defined as a first electrode of the sixth transistor T6, and the sixth drain region D6 is defined as a second electrode of the sixth transistor T6.

Although the first semiconductor layer SCP1 and the sixth semiconductor layer SCP6 are spaced apart from each other on the section of FIG. 6A, the first semiconductor layer SCP1 and the sixth semiconductor layer SCP6 may have a one-body shape (e.g., be integrally formed) when viewed from above the plane (e.g., in a plan view). In other words, the first semiconductor layer SCP1 and the sixth semiconductor layer SCP6 may be different portions or regions of one semiconductor pattern.

A first insulating layer INS1 may be disposed on the buffer layer BFL to cover the first and sixth semiconductor layers SCP1 and SCP6. Third electrodes (or, gate electrodes) of the first and sixth transistors T1 and T6 may be disposed on the first insulating layer INS1. The gate electrodes of the first and sixth transistors T1 and T6 may be formed through the same process. Hereinafter, the gate electrode of the first transistor T1 is defined as the first gate electrode G1, and the gate electrode of the sixth transistor T6 is defined as the sixth gate electrode G6.

A second insulating layer INS2 may be disposed on the first insulating layer INS1 to cover the first and sixth gate electrodes G1 and G6. An upper gate electrode UGE may be disposed on the second insulating layer INS2. The upper gate electrode UGE may be disposed over the first gate electrode G1 and may overlap with the first gate electrode G1 when viewed from above the plane. The upper gate electrode UGE, together with the first gate electrode G1, may form the capacitor Cst illustrated in FIG. 4A. In other words, the first gate electrode G1 corresponds to one electrode of the capacitor Cst, and the upper gate electrode UGE corresponds to the other electrode of the capacitor Cst.

A third insulating layer INS3 may be disposed on the second insulating layer INS2 to cover the upper gate electrode UGE. A semiconductor layer SCP4 (or, a semiconductor pattern region, hereinafter, referred to as a fourth semiconductor layer) of the fourth transistor T4 may be disposed on the third insulating layer INS3. The fourth semiconductor layer SCP4 may include an oxide semiconductor including metal oxide. The oxide semiconductor may include a crystalline or amorphous oxide semiconductor.

The fourth semiconductor layer SCP4 may include a plurality of regions distinguished from one another depending on whether metal oxide is reduced or not. Regions where metal oxide is reduced (hereinafter, referred to as a reduced regions) have a higher conductivity than a region where metal oxide is not reduced (hereinafter, referred to as a non-reduced region). The reduced regions may substantially correspond to a source and a drain of the fourth transistor T4. The non-reduced region may substantially correspond to an active (or, a channel) region of the fourth transistor T4.

The reduced regions of the fourth semiconductor layer SCP4 may include a fourth source region S4 and a fourth drain region D4. A fourth channel region C4 may be disposed between the fourth source region S4 and the fourth drain region D4. The fourth source region S4 is defined as a first electrode of the fourth transistor T4, and the fourth drain region D4 is defined as a second electrode of the fourth transistor T4.

A fourth insulating layer INS4 may be disposed on the third insulating layer INS3 to cover the fourth semiconductor layer SCP4. A third electrode (that is, a fourth gate electrode G4) of the fourth transistor T4 may be disposed on the fourth insulating layer INS4.

A fifth insulating layer INS5 may be disposed on the fourth insulating layer INS4 to cover the fourth gate electrode G4. The buffer layer BFL and the first to fifth insulating layers INS1 to INS5 may include inorganic layers.

Circuit connecting electrodes CNE1, CNE2, and CNE3 and the red pixel connecting electrode R_CNE may be disposed between the sixth transistor T6 and the red light emitting element ED_R. The circuit connecting electrodes CNE1, CNE2, and CNE3 and the red pixel connecting electrode R_CNE may electrically connect the sixth transistor T6 and the red light emitting element ED_R. In some embodiments of the present disclosure, the circuit connecting electrodes CNE1, CNE2, and CNE3 may include the first circuit connecting electrode CNE1, the second circuit connecting electrode CNE2 disposed on the first circuit connecting electrode CNE1, and the third circuit connecting electrode CNE3 disposed on the second circuit connecting electrode CNE2.

The first circuit connecting electrode CNE1 may be disposed on the fifth insulating layer INS5 and may be connected to the sixth drain region D6 through a first contact hole CH1 defined in the first to fifth insulating layers INS1 to INS5. A sixth insulating layer INS6 may be disposed on the fifth insulating layer INS5 to cover the first circuit connecting electrode CNE1. The second connecting electrode CNE2 may be disposed on the sixth insulating layer INS6. The second circuit connecting electrode CNE2 may be connected to the first circuit connecting electrode CNE1 through a second contact hole CH2 defined in the sixth insulating layer INS6. A seventh insulating layer INS7 may be disposed on the sixth insulating layer INS6 to cover the second circuit connecting electrode CNE2.

The third circuit connecting electrode CNE3 may be disposed on the seventh insulating layer INS7. The third circuit connecting electrode CNE3 may be connected to the second circuit connecting electrode CNE2 through a third contact hole CH3 defined in the seventh insulating layer INS7.

An eighth insulating layer INS8 may be disposed on the seventh insulating layer INS7 to cover the third circuit connecting electrode CNE3. The red pixel connecting electrode R_CNE may be disposed on the eighth insulating layer INS8. The red pixel connecting electrode R_CNE may overlap with the circuit connecting electrodes CNE1, CNE2, and CNE3 and the red anode electrode R_AE when viewed from above the plane.

The red pixel connecting electrode R_CNE may be connected with the third circuit connecting electrode CNE3 through a first red contact hole R_CH1 defined in the eighth insulating layer INS8. A ninth insulating layer INS9 may be disposed on the eighth insulating layer INS8. The sixth to ninth insulating layers INS6 to INS9 may include an inorganic layer or an organic layer. In this embodiment, each of the sixth to ninth insulating layers INS6 to INS9 may include an organic layer.

The red light emitting element ED_R may be disposed on the ninth insulating layer INS9. The red light emitting element ED_R may include the red anode electrode R_AE, a red cathode electrode R_CE, and the red emissive layer R_EL. The red cathode electrode R_CE may be disposed over the red anode electrode R_AE, and the red emissive layer R_EL may be disposed between the red anode electrode R_AE and the red cathode electrode R_CE. In some embodiments of the present disclosure, a hole control layer HCL may be additionally disposed between the red anode electrode R_AE and the red emissive layer R_EL, and an electron control layer ECL may be additionally disposed between the red cathode electrode R_CE and the red emissive layer R_EL.

The red anode electrode R_AE may be disposed on the ninth insulating layer INS9 and may be connected to the red pixel connecting electrode R_CNE through a second red contact hole R_CH2 defined in the ninth insulating layer INS9.

A pixel defining layer PDL exposing a preset portion of the red anode electrode R_AE may be disposed on the red anode electrode R_AE and the ninth insulating layer INS9. A pixel opening PDL-OP1 for exposing the preset portion of the red anode electrode R_AE may be defined in the pixel defining layer PDL.

The red emissive layer R_EL may include an organic material and/or an inorganic material. The red emissive layer R_EL may generate red light.

The hole control layer HCL and the electron control layer ECL may be commonly disposed for the pixels PX (e.g., refer to FIG. 3). In addition, the red cathode electrode R_CE may be integrally formed with cathode electrodes of adjacent light emitting elements to form a common cathode electrode.

The layers from the buffer layer BFL to the ninth insulating layer INS9 may be defined as the circuit layer DP_CL. The layer in which the red light emitting element ED_R is disposed may be defined as the element layer DP_ED.

The encapsulation layer TFE may be disposed on the element layer DP_ED. The encapsulation layer TFE may include an inorganic layer, an organic layer, and an inorganic layer that are sequentially stacked one above another. The inorganic layers may include an inorganic material and may protect the pixels PX from moisture/oxygen. The organic layer may include an organic material and may protect the pixels PX from foreign matter such as dust particles.

Referring to FIG. 6B, a semiconductor layer SCP1' (hereinafter, referred to as the first sensing semiconductor layer) of an amplifying transistor ST2 may be formed through the same process as the first semiconductor layer SCP1 of FIG. 6A, and a semiconductor layer SCP2' (hereinafter, referred to as the second sensing semiconductor layer) of a reset transistor ST1 may be formed through the same process as the fourth semiconductor layer SCP4 of FIG. 6A. The first sensing semiconductor layer SCP1' may include a first source region S1', a first drain region D1', and a first channel region C1'. The second sensing semiconductor layer SCP2' may include a second source region S2', a second drain region D2', and a second channel region C2'. The first source region S1' is defined as a first electrode of the amplifying transistor ST2, and the first drain region D1' is defined as a second electrode of the amplifying transistor ST2. The second source region S2' is defined as a first electrode of the reset transistor ST1, and the second drain region D2' is defined as a second electrode of the reset transistor ST1.

A stacked structure of the amplifying transistor ST2 may be substantially the same as the stacked structure of the first transistor T1 illustrated in FIG. 6A. A stacked structure of the reset transistor ST1 may be substantially the same as the stacked structure of the fourth transistor T4 illustrated in FIG. 6A. A stacked structure of an output transistor ST3 may be substantially the same as the stacked structure of the amplifying transistor ST2.

Circuit connecting electrodes CNE1', CNE2', and CNE3' may include the fourth circuit connecting electrode CNE1', the fifth circuit connecting electrode CNE2', and the sixth circuit connecting electrode CNE3'. The fourth circuit connecting electrode CNE1' may be disposed at (e.g., on or in) the same layer as the first circuit connecting electrode CNE1 illustrated in FIG. 6A and may be connected to a third electrode (that is, a first gate electrode G1') of the amplifying transistor ST2 through a fourth contact hole CH1'. Hereinafter, the first gate electrode G1' is defined as a first sensor gate electrode G1' so as to be distinguished from the above-described first gate electrode G1.

The fifth circuit connecting electrode CNE2' may be disposed at (e.g., in or on) the same layer as the second pixel connecting electrode CNE2 illustrated in FIG. 6A and may be connected to the fourth circuit connecting electrode CNE1' through a fifth contact hole CH2' defined in the sixth insulating layer INS6. The sixth circuit connecting electrode CNE3' may be disposed at (e.g., in or on) the same layer as the third circuit connecting electrode CNE3 illustrated in FIG. 6A and may be connected to the fifth circuit connecting electrode CNE2' through a sixth contact hole CH3'.

The second sensor anode electrode O_AE2 and the sensor connecting electrode O_CNE2 may be disposed on the ninth insulating layer INS9. The sensor connecting electrode O_CNE2 may extend from the second sensor anode electrode O_AE2 and may overlap with the fourth to sixth circuit connecting electrodes CNE1', CNE2', and CNE3' when viewed from above the plane. The sensor connecting electrode O_CNE2 may be connected to the sixth circuit connecting electrode CNE3' through the second sensor contact hole O_CH2 defined in the eighth insulating layer INS8 and the ninth insulating layer INS9.

The second light receiving element OPD2 may include the second sensor anode electrode O_AE2, a second sensor cathode electrode O_CE2, and the second photoelectric conversion layer O_RL2. The second sensor anode electrode O_AE2 may be formed through the same process as the red anode electrode R_AE illustrated in FIG. 6A. The second sensor cathode electrode O_CE2 may have a one-body shape (e.g., be integrally formed) with the red cathode electrode R_CE illustrated in FIG. 6A. That is, the second sensor cathode electrode O_CE2 of FIG. 6B and the red cathode electrode R_CE of FIG. 6A may be different regions of the common cathode electrode. The common cathode electrode may be deposited through an open mask so as to have a one-body shape.

A hole control layer HCL' may be disposed between the second sensor anode electrode O_AE2 and the second photoelectric conversion layer O_RL2, and an electron control layer ECL' may be disposed between the second sensor cathode electrode O_CE2 and the second photoelectric conversion layer O_RL2. The hole control layer HCL' and the electron control layer ECL' may be layers that extend from the hole control layer HCL and the electron control layer ECL of FIG. 6A, respectively.

Figure 7:
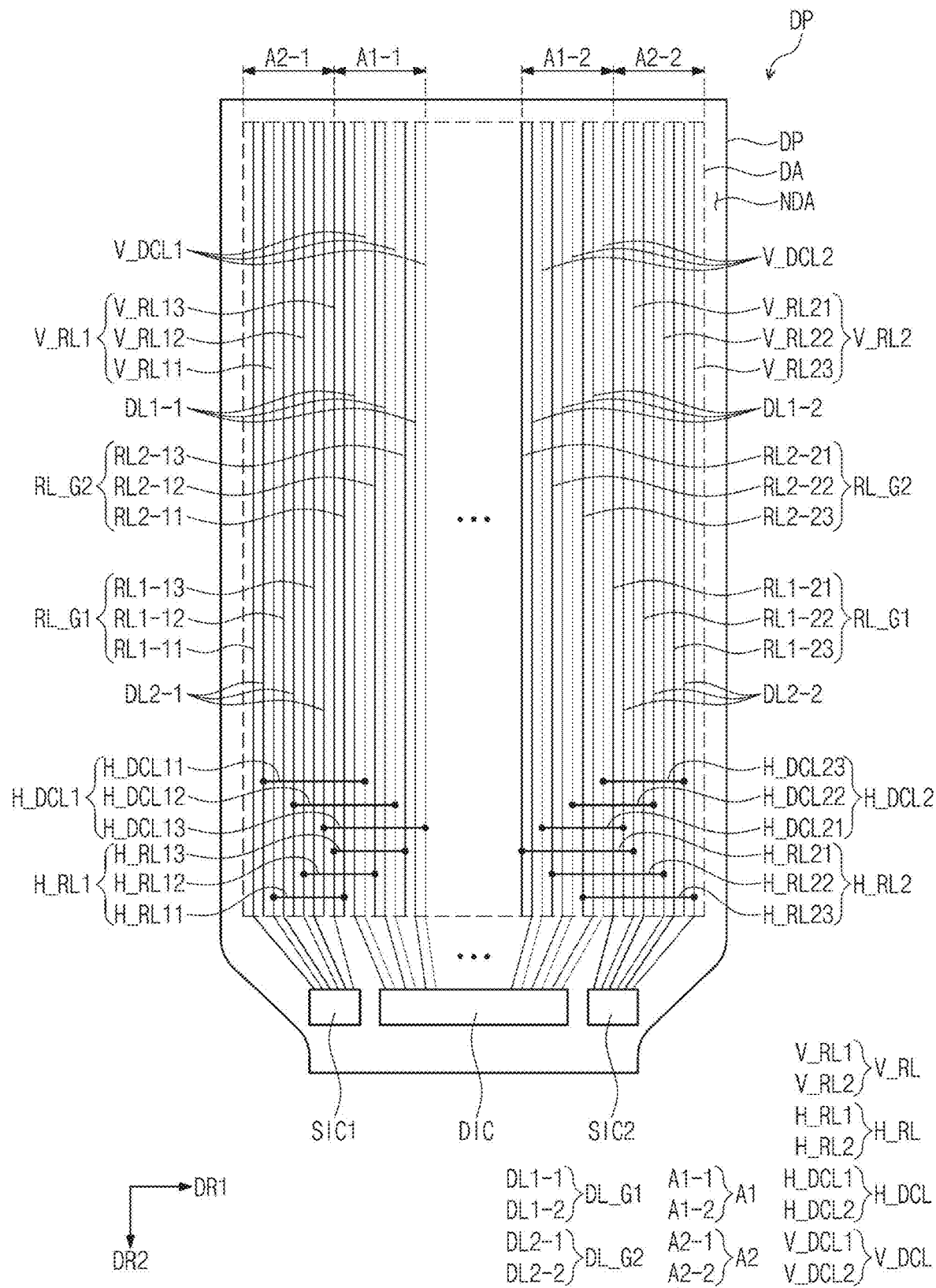
FIG. 7 is a plan view of the display panel according to some embodiments of the present disclosure.

FIG. 7 is a plan view of the display panel according to some embodiments of the present disclosure.

Referring to FIG. 7, the display panel DP may include the display region DA (see, e.g. FIG. 3) and the non-display region NDA (see, e.g. FIG. 3), according to some embodiments of the present disclosure. The plurality of pixels PX (e.g., refer to FIG. 3) and the plurality of sensors FX (e.g., refer to FIG. 3) may be disposed in the display region DA. The drive chip DIC and the sensor chips SIC1 and SIC2 may be mounted on the non-display region NDA.

The data lines DL1 to DLm (e.g., refer to FIG. 3) may be connected to the plurality of pixels PX in the display region DA and connected to the driver chip DIC in the non-display region NDA. The readout lines RL1 to RLh (e.g., refer to FIG. 3) may be connected to the plurality of sensors FX in the display region DA and connected to the sensor chips SIC1 and SIC2 in the non-display region NDA.

The data lines DL1 to DLm may be divided into a first group and a second group. The first group includes a plurality of first data lines DL_G1, and the second group includes a plurality of second data lines DL_G2. The plurality of first data lines DL_G1 may be arranged in the first direction DR1, and the plurality of second data lines DL_G2 may be arranged in the first direction DR1. The plurality of first data lines DL_G1 may be spaced apart from the plurality of second data lines DL_G2 in the first direction DR1.

The plurality of first data lines DL_G1 may be connected to pixel drive circuits P_PD (see, e.g. FIG. 4A) of a first group of pixels among the plurality of pixels PX, and the plurality of second data lines DL_G2 may be connected to pixel drive circuits P_PD of a second group of pixels among the plurality of pixels PX. The first group of pixels and the first data lines DL_G1 may be disposed in a first region A1, and the second group of pixels and the second data lines DL_G2 may be disposed in a second region A2. The first region A1 may include a first-first region A1-1 defined on a first side with respect to a center line of the display panel DP parallel to the second direction DR2 and a first-second region A1-2 defined on a second side with respect to the center line. The second region A2 may include a second-first region A2-1 disposed between the first-first region A1-1 and the non-display region NDA and a second-second region A2-2 disposed between the first-second region A1-2 and the non-display region NDA.

The plurality of first data lines DL_G1 may include first-first data lines DL1-1 disposed in the first-first region A1-1 and first-second data lines DL1-2 disposed in the first-second region A1-2. The plurality of second data lines DL_G2 may include second-first data lines DL2-1 disposed in the second-first region A2-1 and second-second data lines DL2-2 disposed in the second-second region A2-2.

The first-first data lines DL1-1 and the first-second data lines DL1-2 may be connected to the driver chip DIC. Although FIG. 7 illustrates an example that the first-first data lines DL1-1 and the first-second data lines DL1-2 are connected to the same driver chip DIC, the present disclosure is not limited thereto. For example, the first-first data lines DL1-1 and the first-second data lines DL1-2 may be connected to different driver chips, respectively.

The display panel DP further may include data connecting lines that connect the second data lines DL_G2 to the driver chip DIC. The data connecting lines may include a plurality of vertical data connecting lines V_DCL extending along the first data lines DL_G1 and a plurality of horizontal data connecting lines H_DCL extending in the first direction DR1.

The plurality of horizontal data connecting lines H_DCL may include first horizontal data connecting lines H_DCL11 to H_DCL13 and second horizontal data connecting lines H_DCL21 to H_DCL23. The first horizontal data connecting lines H_DCL11 to H_DCL13 may be connected with the second-first data lines DL2-1, and the second horizontal data connecting lines H_DCL21 to H_DCL23 may be connected with the second-second data lines DL2-2. The plurality of vertical data connecting lines V_DCL may include first vertical data connecting lines V_DCL1 and second vertical data connecting lines V_DCL2. The first vertical data connecting lines V_DCL1 may be connected to the first horizontal data connecting lines H_DCL11 to H_DCL13, and the second vertical data connecting lines V_DCL2 may be connected with the second horizontal data connecting lines H_DCL21 to H_DCL23.

Accordingly, the first vertical data connecting lines V_DCL1 may be electrically connected with the second-first data lines DL2-1 by the first horizontal data connecting lines H_DCL11 to H_DCL13. The second vertical data connecting lines V_DCL2 may be electrically connected with the second-second data lines DL2-2 by the second horizontal data connecting lines H_DCL21 to H_DCL23.

The first vertical data connecting lines V_DCL1 may alternate with the first-first data lines DL1-1 in the first-first region A1-1 in the first direction DR1. The second vertical data connecting lines V_DCL2 may alternate with the first-second data lines DL1-2 in the first-second region A1-2 in the first direction DR1.

The plurality of horizontal data connecting lines H_DCL and portions of the vertical data connecting lines V_DCL may be disposed in the display region DA. For example, portions of the data connecting lines for connecting the second data lines DL_G2 and the driver IC DIC may be disposed in the display region DA. Accordingly, the area of the region occupied by the data connecting lines in the non-display region NDA may be decreased, and thus the area of dead space of the display panel DP may be decreased.

The readout lines RL1 to RLh may be divided into a first group and a second group. The first group includes a plurality of first readout lines RL_G1, and the second group includes a plurality of second readout lines RL_G2. The plurality of first readout lines RL_G1 may be arranged in the first direction DR1, and the plurality of second readout lines RL_G2 may be arranged in the first direction DR1. The plurality of first readout lines RL_G1 may be spaced apart from the plurality of second readout lines RL_G2 in the first direction DR1.

The plurality of first readout lines RL_G1 may be connected to sensor drive circuits O_SD (e.g., refer to FIG. 4A) of a first group of sensors among the plurality of sensors FX, and the plurality of second readout lines RL_G2 may be connected to sensor drive circuits O_SD (e.g., refer to FIG. 4A) of a second group of sensors among the plurality of sensors FX. The first group of sensors and the first readout lines RL_G1 may be disposed in the second region A2, and the second group of sensors and the second readout lines RL_G2 are disposed in the first region A1.

The plurality of first readout lines RL_G1 may include first-first readout lines RL1-11 to RL1-13 and first-second readout lines RL1-21 to RL1-23. The first-first readout lines RL1-11 to RL1-23 may be disposed in the second-first region A2-1 and connected to the first sensor chip SIC1. The first-second readout lines RL1-21 to RL1-23 may be disposed in the second-second region A2-2 and connected to the second sensor chip SIC2.

The plurality of second readout lines RL_G2 may include second-first readout lines RL2-11 to RL2-13 and second-second readout lines RL2-21 to RL2-23. The readout lines RL2-11 to RL2-13 may be disposed in the first-first region A1-1 and electrically connected to the first sensor chip SIC1. The second-second readout lines RL2-21 to RL2-23 may be disposed in the first-second region A1-2 and electrically connected to the second sensor chip SIC2. The plurality of second readout lines RL_G2 may be disposed between the first-first readout lines RL1-11 to RL1-13 and the first-second readout lines RL1-21 to RL1-23 in the first direction DR1.

The display panel DP may further include connecting lines electrically connected with the second readout lines RL_G2. The connecting lines may include a plurality of vertical connecting lines V_RL extending along the first readout lines RL_G1 (e.g., in the second direction DR2) and a plurality of horizontal connecting lines H_RL extending in the first direction DR1. The vertical connecting lines V_RL may include first vertical connecting lines V_RL1 electrically connected to the first sensor chip SIC1 and second vertical connecting lines V_RL2 electrically connected to the second sensor chip SIC2.

The first vertical connecting lines V_RL1 may alternate with the first-first readout lines RL1-11 to RL1-13 in the first direction DR1. The second vertical connecting lines V_RL2 may alternate with the first-second readout lines RL1-21 to RL1-23 in the first direction DR1.

The horizontal connecting lines H_RL may electrically connect the vertical connecting lines V_RL to the second readout lines RL_G2. The horizontal connecting lines H_RL may include first horizontal connecting lines H_RL1 that connect the first vertical connecting lines V_RL1 to the second-first readout lines RL2-11 to RL2-13, respectively, and second horizontal connecting lines H_RL2 that connect the second vertical connecting lines V_RL2 to the second-second readout lines RL2-21 to RL2-23, respectively.

The plurality of horizontal connecting lines H_RL and portions of the vertical connecting lines V_RL may be disposed in the display region DA. For example, portions of connecting lines for connecting the second readout lines RL_G2 and the first and second sensor chips SIC1 and SIC2 may be disposed in the display region DA. Accordingly, the area of the region occupied by the connecting lines in the non-display region NDA may be decreased, and thus the area of dead space of the display panel DP may be decreased.

Even though the first or second sensor chip SIC1 or SIC2 may be disposed adjacent to the driver chip DIC, the readout lines and the data lines may not cross each other in the non-display region NDA when the second readout lines RL_G2 are connected to the first or second sensor chip SIC1 or SIC2 through the connecting lines and the second data lines DL_G2 are connected to the driver chip DIC through the data connecting lines. Accordingly, coupling capacitance between the readout lines and the data lines may be decreased, and thus the sensing accuracy of the sensors FX may be improved (e.g., increased).

FIGS. 8A to 8K are plan views illustrating a process of stacking the circuit layer and the element layer according to some embodiments of the present disclosure. FIG. 9 is a sectional view taken along the line I-I' illustrated in FIG. 8K, according to some embodiments of the present disclosure.

Referring to FIGS. 8A to 8K, conductive patterns and semiconductor patterns may be repeatedly arranged on a plane according to a preset rule. FIGS. 8A to 8K illustrates a part of the pixel drive circuits P_PD (e.g., refer to FIG. 4A) and a part of the sensor drive circuits O_SD (e.g., refer to FIG. 4A) that may be disposed in the first row ODD_R and a part of the pixel drive circuits P_PD and a part of the sensor drive circuits O_SD that may be disposed in the second row EVEN_R, according to some embodiments of the present disclosure. The first row ODD_R and the second row EVEN_R may be adjacent to each other in the second direction DR2. Eight first circuit regions P_PA corresponding to eight pixel drive circuits P_PD adjacent to one another in the first direction DR1 and a second circuit region O_SA corresponding to one sensor drive circuit O_SD are defined in the first row ODD_R. Eight first circuit regions P_PA corresponding to eight pixel drive circuits P_PD adjacent to one another in the first direction DR1 and a second circuit region O_SA corresponding to one sensor drive circuit O_SD are defined in the second row EVEN_R. In FIGS. 8A to 8K, the boundaries between the first and second circuit regions P_PA and O_SA are illustrated by dotted lines.

Figure 8A:
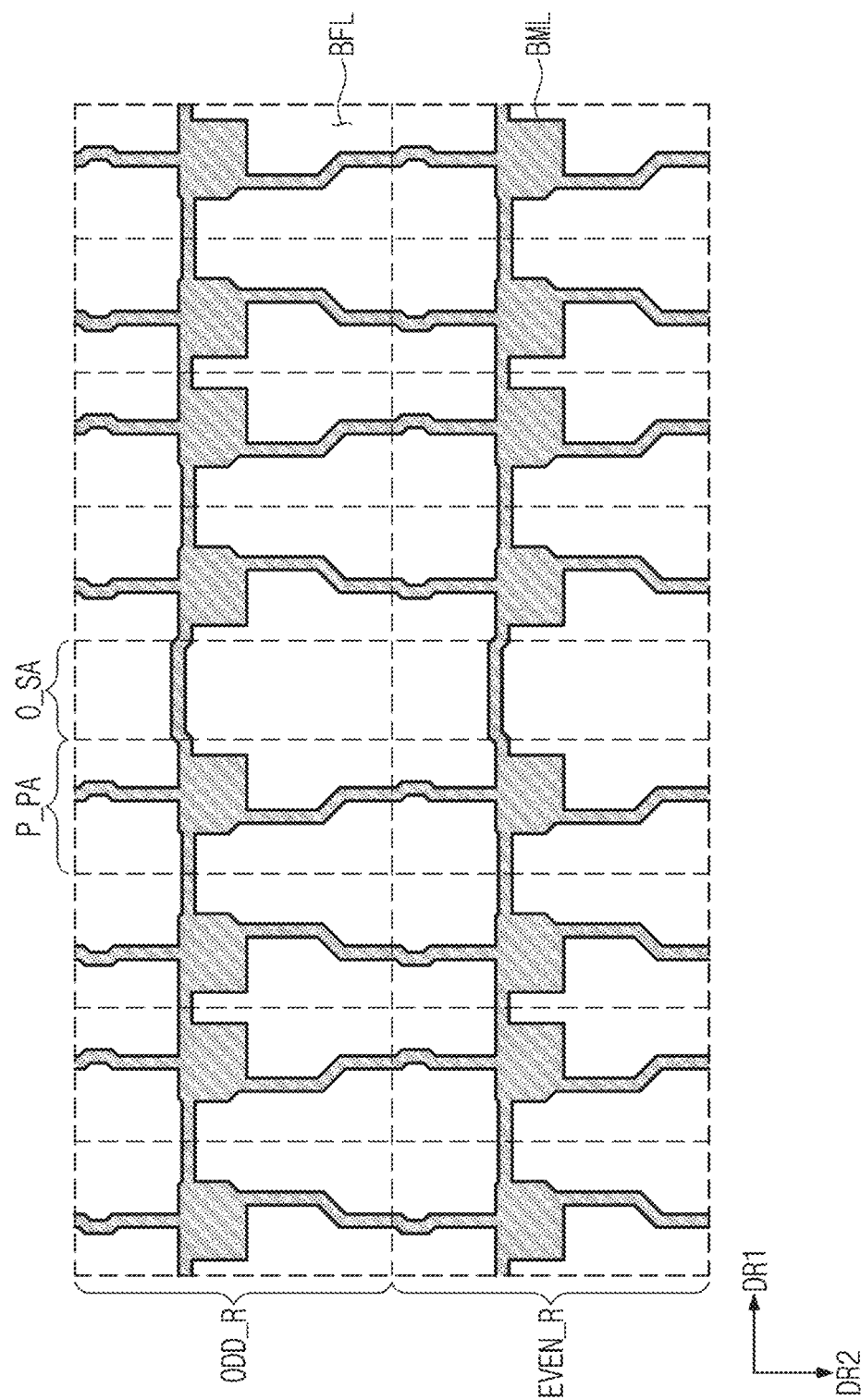
FIGS. 8A to 8K are plan views illustrating a process of stacking a circuit layer and an element layer according to some embodiments of the present disclosure.
Figure 9:
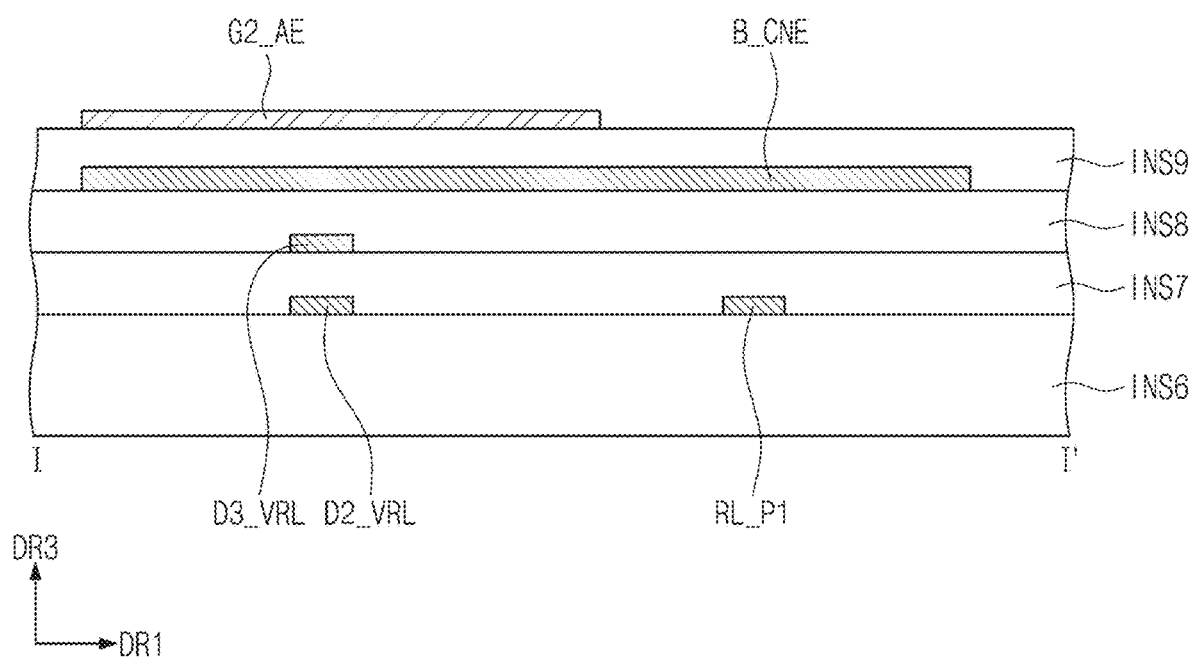
FIG. 9 is a sectional view taken along the line I-I' illustrated in FIG. 8K, according to some embodiments of the present disclosure.

Referring to FIG. 8A, the shielding layer BML may be formed on the buffer layer BFL, according to some embodiments of the present disclosure. The shielding layer BML may be a conductive pattern having a light-blocking function. The shielding layer BML may be disposed under at least one of the transistors T1 to T8 (e.g., refer to FIG. 4A) included in each of the first circuit regions P_PA and may block light incident to the transistors T1 to T8 from the outside.

Figure 8B:
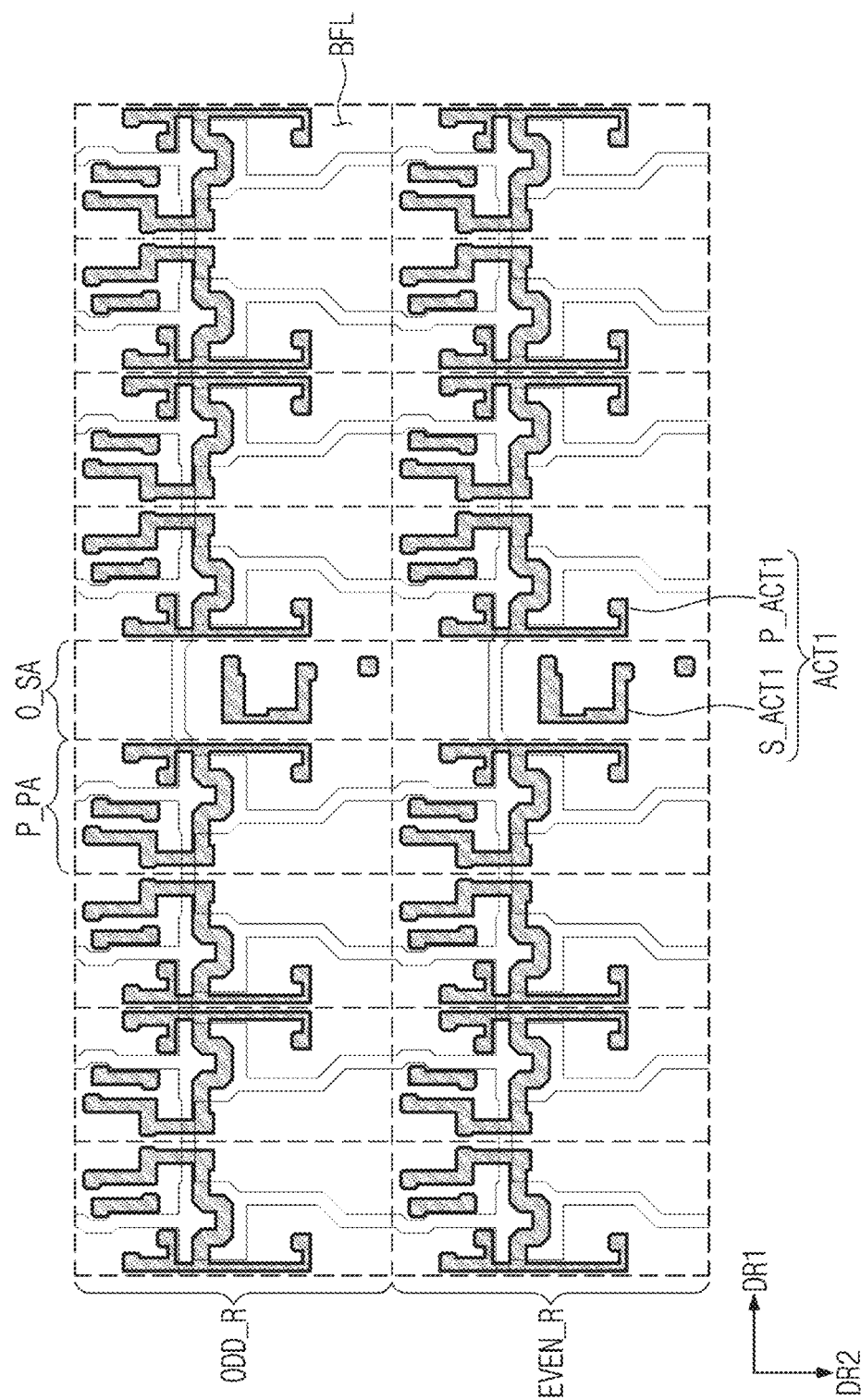

Referring to FIGS. 8A and 8B, a first semiconductor pattern layer ACT1 may be disposed on the shielding layer BML and the buffer layer BFL, according to some embodiments of the present disclosure. The first semiconductor pattern layer ACT1 may overlap with the shielding layer BML on the buffer layer BFL. The first semiconductor pattern layer ACT1 may include a silicon semiconductor. For example, the silicon semiconductor may include amorphous silicon or polycrystalline silicon. For example, the first semiconductor pattern layer ACT1 may include low-temperature polycrystalline silicon (LTPS).

The first semiconductor pattern layer ACT1 may include a first semiconductor pattern P_ACT1 disposed in each of the first circuit regions P_PA and a second semiconductor pattern S_ACT1 disposed in each of the second circuit regions O_SA.

Figure 8C:
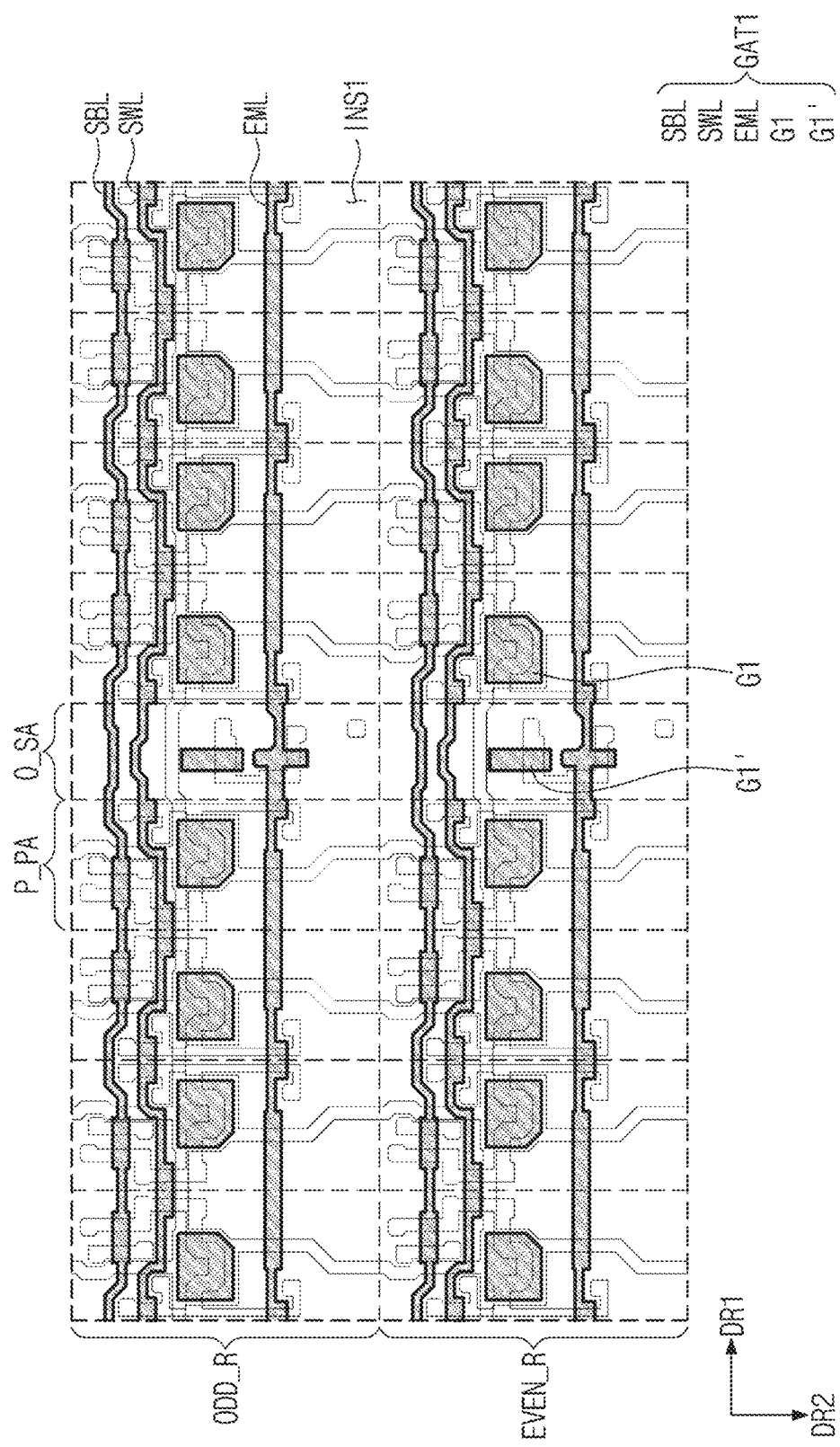

Referring to FIG. 8C, a first gate pattern layer GAT1 may be disposed on the first insulating layer INS1, according to some embodiments of the present disclosure. The first gate pattern layer GAT1 may include metal, an alloy, conductive metal oxide, and/or a transparent conductive material. For example, the first gate pattern layer GAT1 may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), indium tin oxide (ITO), and/or indium zinc oxide (IZO), but is not particularly limited thereto.

The first gate pattern layer GAT1 may include a first gate wiring SBL, a second gate wiring EML, a third gate wiring SWL, a first gate electrode G1, and a first sensor gate electrode G1'.

Each of the first to third gate wirings SBL, EML, and SWL may extend in the first direction DR1. The first gate wiring SBL may correspond to the j-th black scan line SBLj of FIG. 4A. For example, the j-th black scan signal SBj (e.g., refer to FIG. 4A) may be provided to the first gate wiring SBL. The first gate wiring SBL may constitute the seventh transistor T7 of FIG. 4A together with the first semiconductor pattern P_ACT1.

The second gate wiring EML may correspond to the j-th emission control line EMLj of FIG. 4A. For example, the j-th emission control signal EMj (e.g., refer to FIG. 4A) may be provided to the second gate wiring EML. The second gate wiring EML may constitute the fifth and sixth transistors T5 and T6 of FIG. 4A together with the first semiconductor pattern P_ACT1.

The third gate wiring SWL may correspond to the j-th write scan line SWLj of FIG. 4A. For example, the j-th write scan signal SWj (e.g., refer to FIG. 4A) may be provided to the third gate wiring SWL. The third gate wiring SWL may constitute the second transistor T2 of FIG. 4A together with the first semiconductor pattern P_ACT1 and may constitute the output transistor ST3 of FIG. 4A together with the second semiconductor pattern S_ACT1.

The first gate electrode G1 and the first sensor gate electrode G1' may be disposed in an island shape. The first gate electrode G1 may constitute the first transistor T1 of FIG. 4A together with the first semiconductor pattern P_ACT1. The first gate electrode G1 may correspond to the first electrode G1 of the first transistor T1 illustrated in FIG. 6A. The first sensor gate electrode G1' may constitute the amplifying transistor ST2 of FIG. 4A together with the second semiconductor pattern S_ACT1.

Figure 8D:
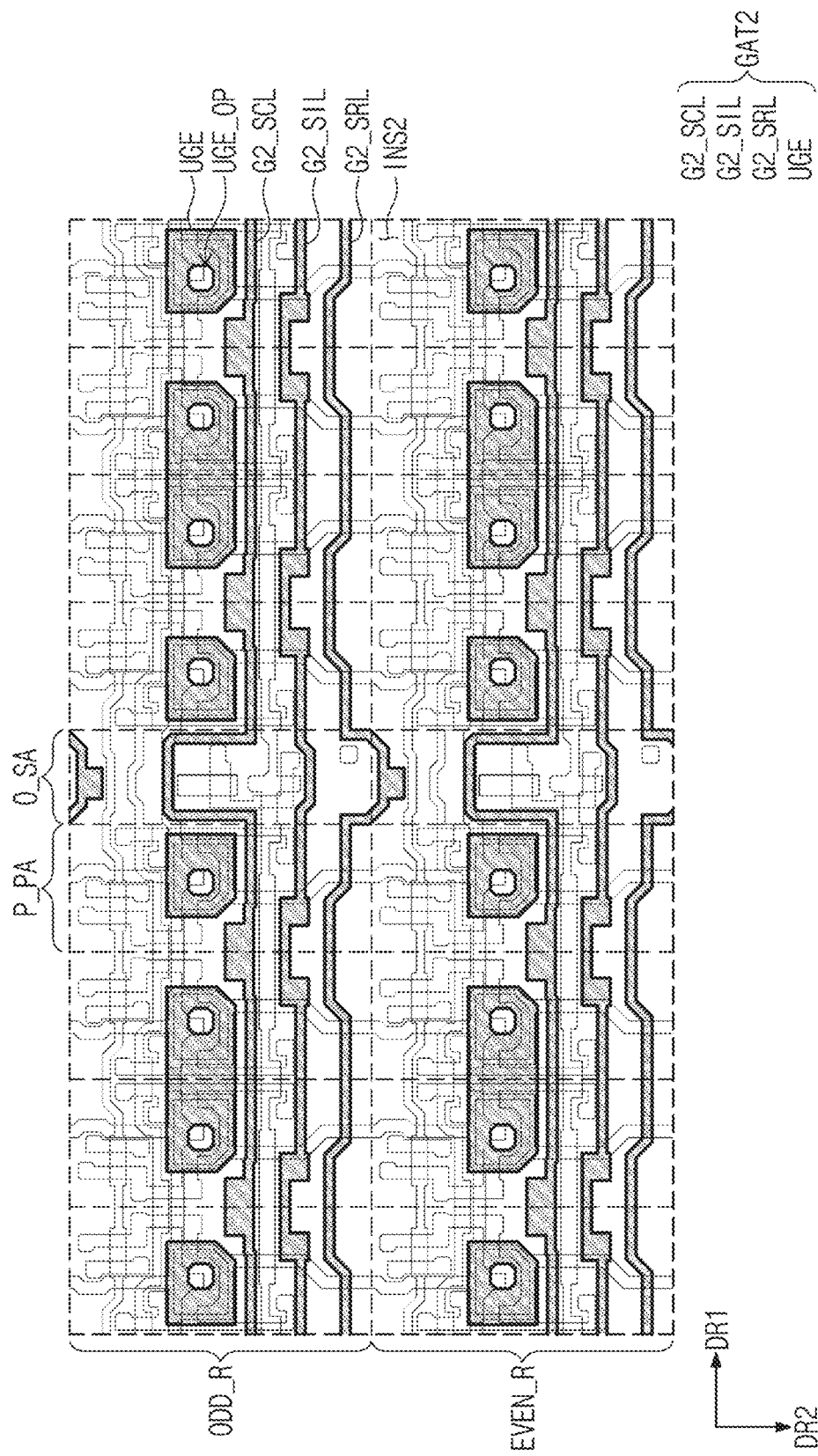

Referring to FIGS. 8C and 8D, the second insulating layer INS2 may cover the first gate pattern layer GAT1 and may be disposed on the first insulating layer INS1. A second gate pattern layer GAT2 may be disposed on the second insulating layer INS2. The second gate pattern layer GAT2 may include metal, an alloy, conductive metal oxide, and/or a transparent conductive material.

The second gate pattern layer GAT2 may include a fourth gate wiring G2_SRL, a fifth gate wiring G2_SCL, a sixth gate wiring G2_SIL, and an upper gate electrode UGE.

The fourth to sixth gate wirings G2_SRL, G2_SCL, and G2_SIL may extend in the first direction DR1. The fourth gate wiring G2_SRL may correspond to (or, is included in) the reset control line SRL (e.g., refer to FIG. 4A). The fifth gate wiring G2_SCL may correspond to (or, may be included in) the j-th compensation scan line SCLj (e.g., refer to FIG. 4A). The sixth gate wiring G2_SIL may correspond to (or, may be included in) the j-th initialization scan line SILj (e.g., refer to FIG. 4A).

The upper gate electrode UGE may overlap with the first gate electrode G1 and may be disposed in an island shape. For example, the upper gate electrode UGE may constitute the capacitor Cst (e.g., refer to FIG. 4A) together with the first gate electrode G1. The upper gate electrode UGE may correspond to the upper electrode UGE illustrated in FIG. 6A. An opening UGE_OP may be formed through the upper gate electrode UGE, and the first gate electrode G1 (see, e.g. FIG. 6A) may be partially exposed through the opening UGE_OP.

Figure 8E:
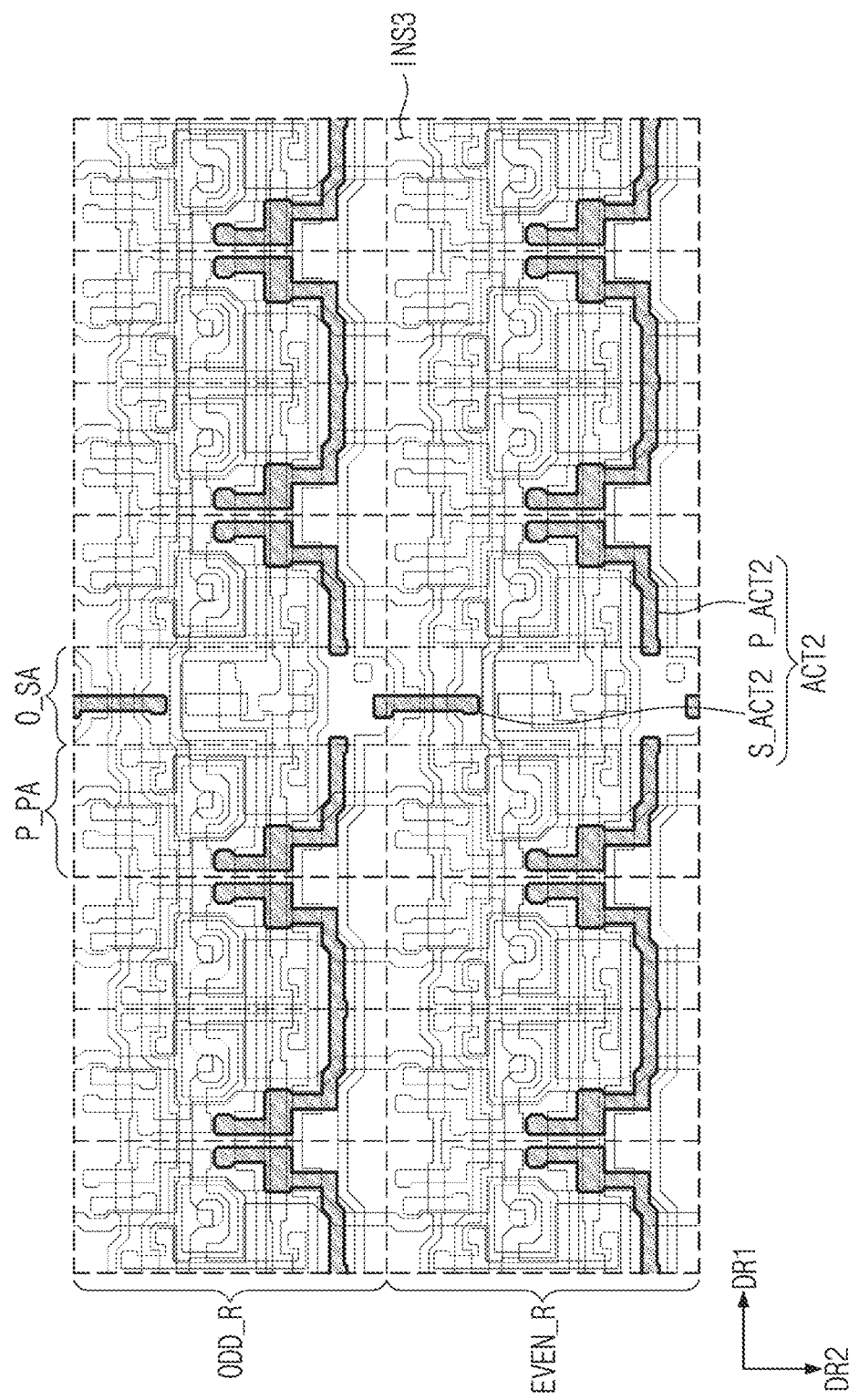

Referring to FIGS. 8D and 8E, the third insulating layer INS3 may cover the second gate pattern layer GAT2 and may be disposed on the second insulating layer INS2. A second semiconductor pattern layer ACT2 may be disposed on the third insulating layer INS3. The second semiconductor pattern layer ACT2 may include an oxide semiconductor. The second semiconductor pattern layer ACT2 may be disposed in a layer different from the first semiconductor pattern layer ACT1 and may not overlap with the first semiconductor pattern layer ACT1.

The second semiconductor pattern layer ACT2 may include a third semiconductor pattern P_ACT2 disposed in each of the first circuit regions P_PA and a fourth semiconductor pattern S_ACT2 disposed in each of the second circuit regions O_SA.

Figure 8F:
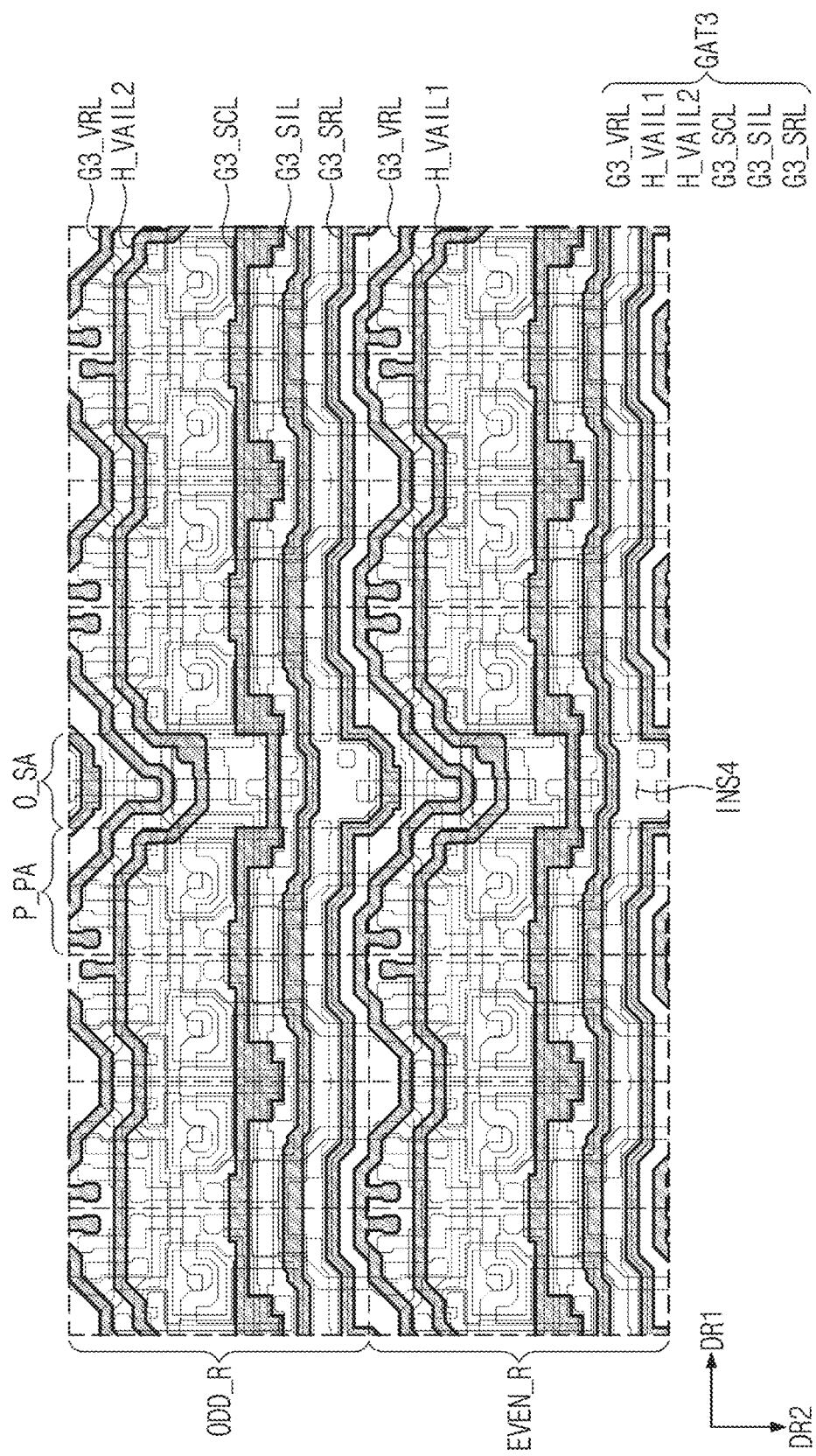
Figure 8G:
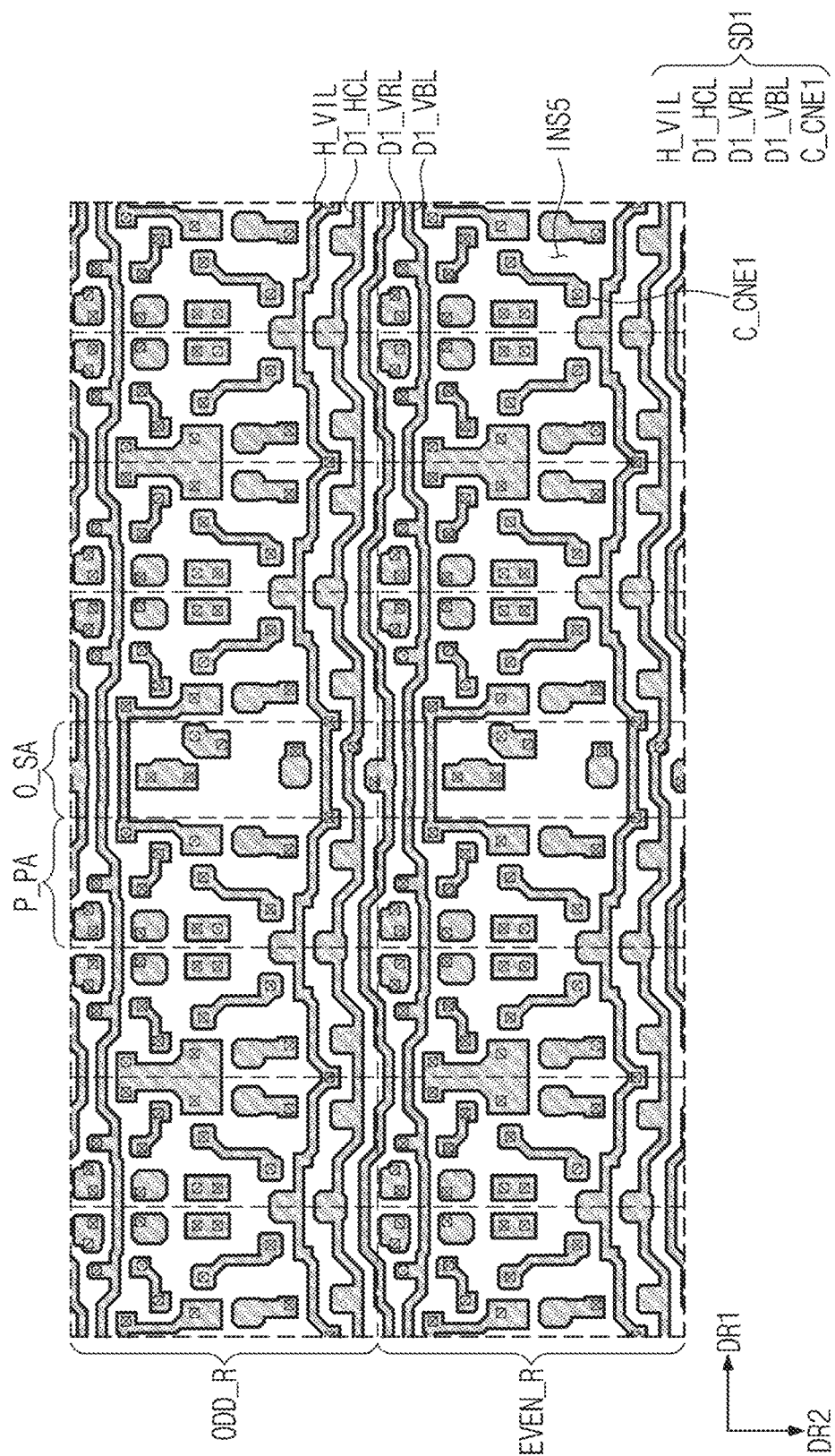

Referring to FIGS. 8E to 8G, the fourth insulating layer INS4 may cover the second semiconductor pattern layer ACT2 and may be disposed on the third insulating layer INS3. A third gate pattern layer GAT3 may be disposed on the fourth insulating layer INS4. The third gate pattern layer GAT3 may include metal, an alloy, conductive metal oxide, and/or a transparent conductive material.

The third gate pattern layer GAT3 may include a seventh gate wiring G3_SRL, an eighth gate wiring G3_SCL, a ninth gate wiring G3_SIL, a second-first horizontal initialization voltage line H_VAIL1, a second-second horizontal initial- ization voltage line H_VAIL2, and a first horizontal reset voltage line G3_VRL. The second-first horizontal initialization voltage line H_VAIL1 and the second-second horizontal initialization voltage line H_VAIL2 may be referred to as a second horizontal initialization voltage line.

The seventh to ninth gate wirings G3_SRL, G3_SCL, and G3_SIL may extend in the first direction DR1. The seventh gate wiring G3_SRL may overlap with the fourth semiconductor pattern S_ACT2. The seventh gate wiring G3_SRL may constitute the reset transistor ST1 of FIG. 4A together with the fourth semiconductor pattern S_ACT2. The seventh gate wiring G3_SRL may be electrically connected with the fourth gate wiring G2_SRL illustrated in FIG. 8D.

The eighth gate wiring G3_SCL may overlap with the fifth gate wiring G2_SCL and the third semiconductor pattern P_ACT2. In some embodiments, the eighth gate wiring G3_SCL may make contact with (e.g., contact or directly contact) the fifth gate wiring G2_SCL through a contact portion. Accordingly, the j-th compensation scan signal SCj applied to the fifth gate wiring G2_SCL may be provided to the eighth gate wiring G3_SCL. The fifth gate wiring G2_SCL, the third semiconductor pattern P_ACT2, and the eighth gate wiring G3_SCL may constitute the third transistor T3 of FIG. 4A.

The ninth gate wiring G3_SIL may overlap with the sixth gate wiring G2_SIL and the third semiconductor pattern P_ACT2. The ninth gate wiring G3_SIL may be electrically connected with the sixth gate wiring G2_SIL. The j-th initialization scan signal Slj may be provided to the ninth gate wiring G3_SIL through the sixth gate wiring G2_SIL. The sixth gate wiring G2_SIL, the third semiconductor pattern P_ACT2, and the ninth gate wiring G3_SIL may constitute the fourth transistor T4 of FIG. 4A.

The second-first horizontal initialization voltage line H_VAIL1 and the second-second horizontal initialization voltage line H_VAIL2 may be components included in the second initialization voltage line VAIL (e.g., refer to FIG. 4A). The second-first horizontal initialization voltage line H_VAIL1 may be connected to a first color pixel (e.g., a red pixel) among the plurality of pixels PX illustrated in FIG. 3, and the second-second horizontal initialization voltage line H_VAIL2 may be connected to a second or third color pixel (e.g., a blue or green pixel) different from the first color pixel among the plurality of pixels PX.

The second-first horizontal initialization voltage line H_VAIL1 may apply a second-first initialization voltage to the first color pixel as the second initialization voltage Vaint (e.g., refer to FIG. 4A), and the second-second horizontal initialization voltage line H_VAIL2 may apply a second-second initialization voltage to the second or third color pixel as the second initialization voltage Vaint. The second-second initialization voltage may have a voltage level different from that of the second-first initialization voltage.

The first horizontal reset voltage line G3_VRL may be a component included in the reset voltage line VRL of FIG. 4A. The reset voltage Vrst (e.g., refer to FIG. 4A) may be provided to the first horizontal reset voltage line G3_VRL. The first horizontal reset voltage line G3_VRL may be electrically connected with the reset transistor ST1. The reset transistor ST1 may receive the reset voltage Vrst through the first horizontal reset voltage line G3_VRL.

Referring to FIGS. 8F and 8G, the fifth insulating layer INS5 may cover at least a portion of the third gate pattern layer GAT3 and may be disposed on the fourth insulating layer INS4. A first data pattern layer SD1 may be disposed on the fifth insulating layer INS5. The first data pattern layer SD1 may include, for example, metal, an alloy, conductive metal oxide, and/or a transparent conductive material. Hereinafter, for convenience of description, only some of the components included in the first data pattern layer SD1 are illustrated in FIG. 8G.

The first data pattern layer SD1 may include a second horizontal reset voltage line D1_VRL, a bias voltage line D1_VBL, a first horizontal initialization voltage line H_VIL, and a plurality of first connecting electrode patterns C_CNE1.

The second horizontal reset voltage line D1_VRL, the bias voltage line D1_VBL, and the first horizontal initialization voltage line H_VIL may extend in the first direction DR1. The second horizontal reset voltage line D1_VRL, the bias voltage line D1_VBL, and the first horizontal initialization voltage line H_VIL may be spaced apart from each other in the second direction DR2.

The second horizontal reset voltage line D1_VRL may be a component included in the reset voltage line VRL of FIG. 4A. The reset voltage Vrst (e.g., refer to FIG. 4A) may be provided to the second horizontal reset voltage line D1_VRL. The second horizontal reset voltage line D1_VRL may be electrically connected with the first horizontal reset voltage line G3_VRL. The bias voltage line D1_VBL may correspond to the bias voltage line VBL of FIG. 4A. The bias voltage Vbias (e.g., refer to FIG. 4A) may be provided to the bias voltage line D1_VBL. The bias voltage line D1_VBL may be connected with the eighth transistor T8 through a contact portion. The eighth transistor T8 may receive the bias voltage Vbias through the bias voltage line D1_VBL.

The first horizontal initialization voltage line H_VIL may be a component included in the first initialization voltage line VIL of FIG. 4A. The first initialization voltage Vint (e.g., refer to FIG. 4A) may be provided to the first horizontal initialization voltage line H_VIL. The first horizontal initialization voltage line H_VIL may be connected with the fourth transistor T4 through a contact portion. The fourth transistor T4 may receive the first initialization voltage Vint through the first horizontal initialization voltage line H_VIL.

The plurality of first connecting electrode patterns C_CNE1 may make contact with (e.g., contact or directly contact) one of the first to fourth semiconductor patterns P_ACT1, S_ACT1, P_ACT2, and S_ACT2. The plurality of first connecting electrode patterns C_CNE1 may perform a function of electrically connecting one of the first to fourth semiconductor patterns P_ACT1, S_ACT1, P_ACT2, and S_ACT2 to other wiring or lines. The plurality of first connecting electrode patterns C_CNE1 may be connected with one of the first to fourth semiconductor patterns P_ACT1, S_ACT1, P_ACT2, and S_ACT2 through a contact portion. The plurality of first connecting electrode patterns C_CNE1 may include the first and fourth circuit connecting electrodes CNE1 and CNE1' illustrated in FIGS. 6A and 6B.

The first data pattern layer SD1 may further include a horizontal connecting wiring D1_HCL. The horizontal connecting wiring D1_HCL may extend in the first direction DR1. The horizontal connecting wiring D1_HCL may be a component used as the horizontal data connecting lines H_DCL illustrated in FIG. 7 or the horizontal connecting lines H_RL illustrated in FIG. 7.

Figure 8H:
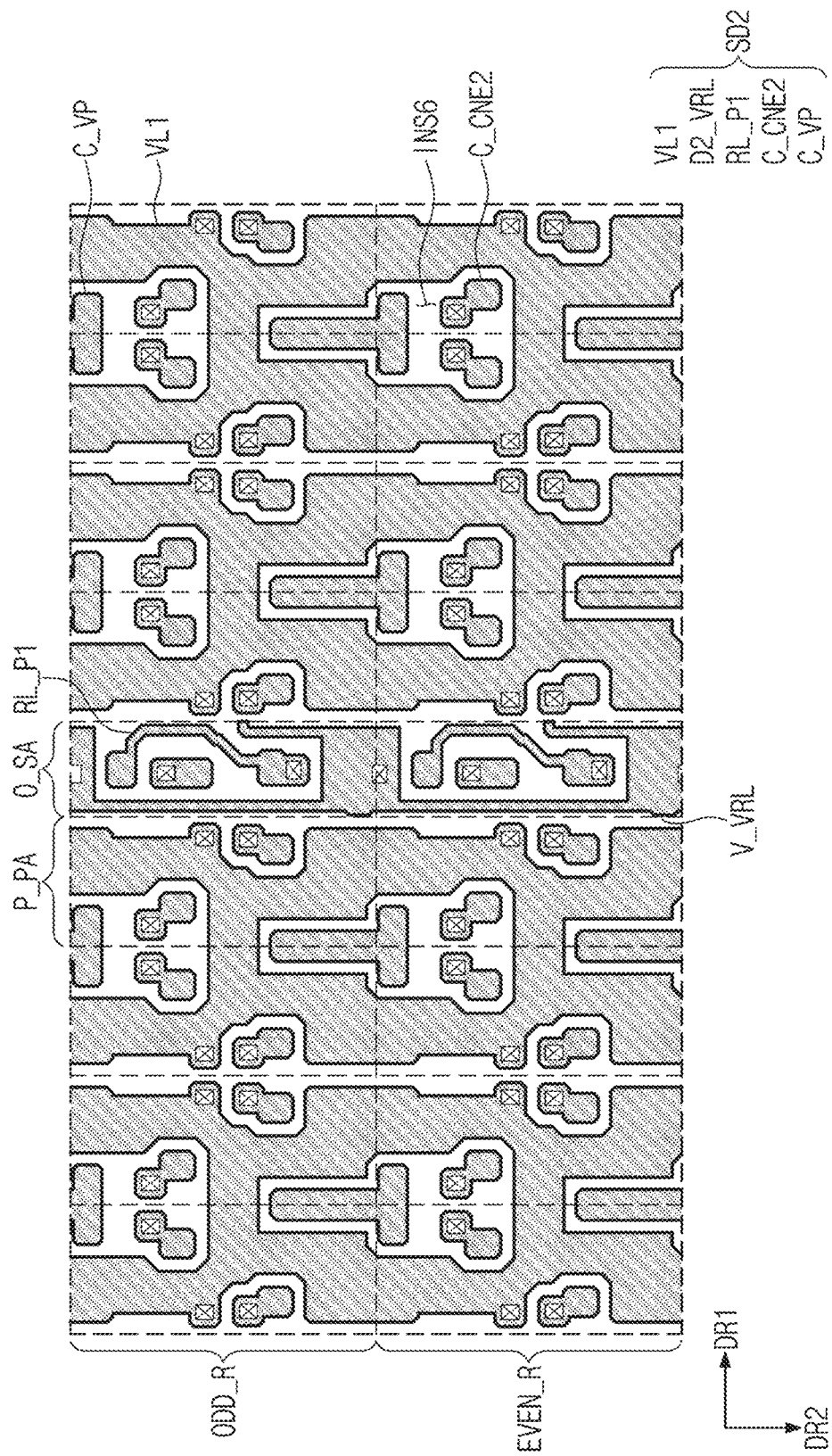

Referring to FIGS. 8G and 8H, the sixth insulating layer INS6 may cover at least a portion of the first data pattern layer SD1 and may be disposed on the fifth insulating layer INS5. A second data pattern layer SD2 may be disposed on the sixth insulating layer INS6. The second data pattern layer SD2 may include, for example, metal, an alloy, conductive metal oxide, and/or a transparent conductive material.

The second data pattern layer SD2 may include a first readout line portion RL_P1, a vertical reset voltage line V_VRL, a first drive voltage line VL1, and a plurality of voltage connecting patterns.

The first readout line portion RL_P1 may extend in the second direction DR2 in each of the second circuit regions O_SA. That is, the first readout line portion RL_P1 may overlap with one corresponding second circuit region O_SA. The first readout line portion RL_P1 may be a portion of each of the readout lines RL1 to RLh illustrated in FIG. 3. The readout wiring RL (see, e.g. FIG. 8I) may be connected to the sensor drive circuit O_SD illustrated in FIG. 4A (in particular, the output transistor ST3).

The vertical reset voltage line V_VRL may extend in the second direction DR2 and are spaced apart from each other in the first direction DR1. The vertical reset voltage line V_VRL may be a component included in the reset voltage line VRL of FIG. 4A. The vertical reset voltage line V_VRL may be connected with the first and second horizontal reset voltage lines G3_VRL and D1_VRL (see, e.g., FIGS. 8F and 8G). The reset voltage line VRL may have a mesh form by the coupling of the vertical reset voltage line V_VRL and the first and second horizontal reset voltage lines G3_VRL and D1_VRL.

The first drive voltage line VL1 may overlap with the first circuit regions P_PA. The first drive voltage line VL1 may correspond to the first drive voltage line VL1 of FIG. 4A. The first drive voltage ELVDD (e.g., refer to FIG. 4A) may be provided to the first drive voltage line VL1. The first drive voltage line VL1 may be disposed in a mesh form in the display region DA (e.g., refer to FIG. 3) of the display panel DP. The first drive voltage line VL1 may be connected with the fifth transistor T5 and the capacitor Cst, which are illustrated in FIG. 4A, through a contact portion.

The plurality of voltage connecting patterns C_VP may be connected with vertical voltage lines V_VL that will be described below.

The second data pattern layer SD2 may further include a plurality of second connecting electrode patterns C_CNE2. The plurality of second connecting electrode patterns C_CNE2 may include the second and fifth circuit connecting electrodes CNE2 and CNE2' illustrated in FIGS. 6A and 6B.

Figure 8I:
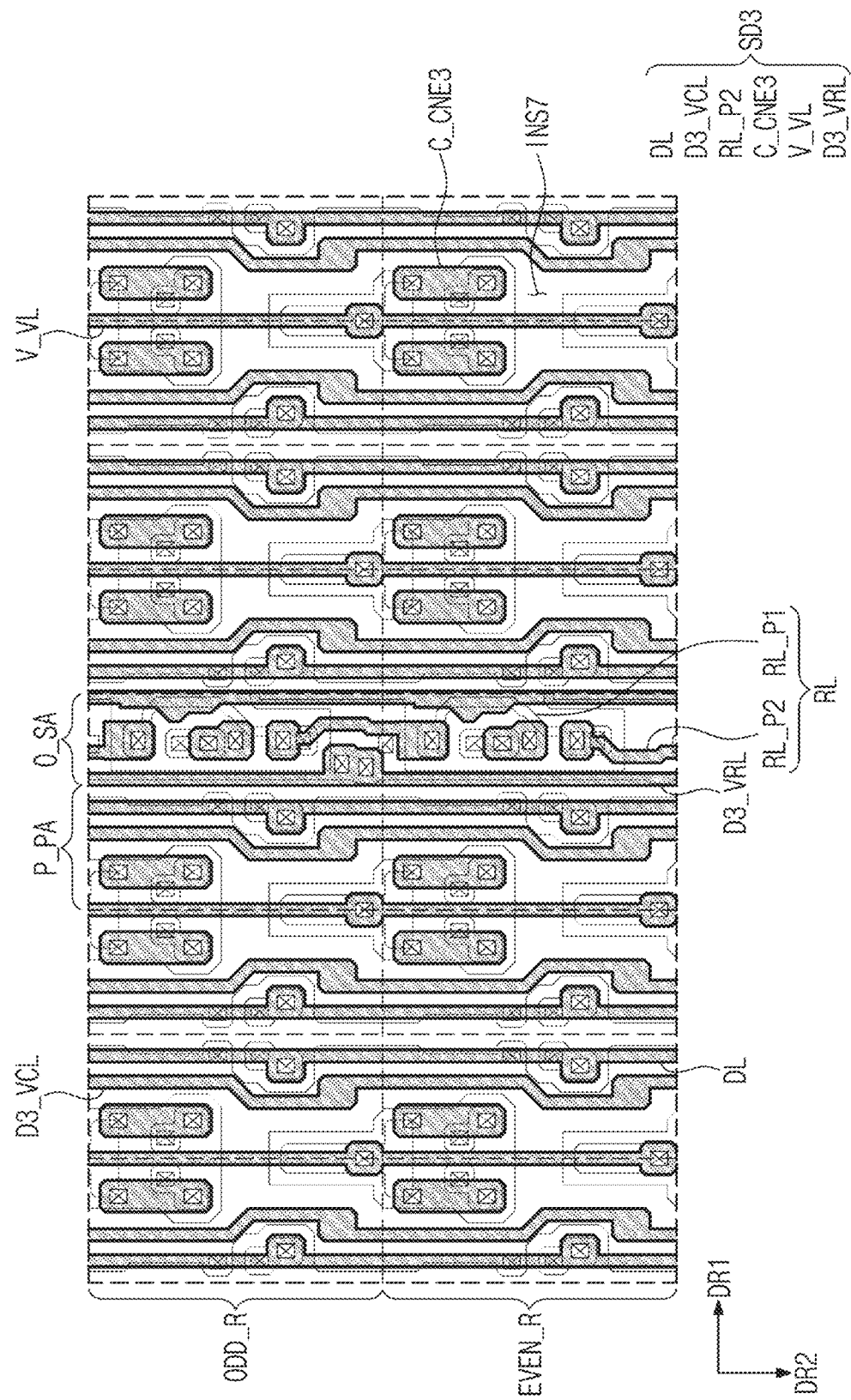

Referring to FIGS. 8H and 8I, the seventh insulating layer INS7 may cover at least a portion of the second data pattern layer SD2 and may be disposed on the sixth insulating layer INS6. A third data pattern layer SD3 may be disposed on the seventh insulating layer INS7. The third data pattern layer SD3 may include, for example, metal, an alloy, conductive metal oxide, and/or a transparent conductive material.

The third data pattern layer SD3 may include a data wiring DL, a second readout line portion RL_P2, a vertical connecting wring D3_VCL, the vertical voltage lines V_VL, and a plurality of third connecting electrode patterns C_CNE3.

The data wiring DL, the vertical connecting wiring D3_VCL, and the vertical voltage lines V_VL may extend in the second direction DR2. The data wiring DL, the vertical connecting wiring D3_VCL, and the vertical voltage lines V_VL may be spaced apart from each other in the first direction DR1.

The data wiring DL may correspond to the data lines DL1 to DLm illustrated in FIG. 3. The data wiring DL may be connected to the pixel drive circuit P_PD illustrated in FIG. 4A (in particular, the second transistor T2). The vertical connecting wiring D3_VCL may be a component used as the vertical data connecting lines V_DCL illustrated in FIG. 7 or the vertical connecting lines V_RL illustrated in FIG. 7. The vertical connecting wiring D3_VCL may be electrically connected with the horizontal connecting wiring D1_HCL illustrated in FIG. 8G.

The second readout line portion RL_P2 may overlap with two second circuit regions O_SA adjacent to each other. The second readout line portion RL_P2 may be connected with two first readout line portions RL_P1 adjacent to each other. Accordingly, one readout wiring RL may include a plurality of first and second readout line portions RL_P1 and RL_P2. The readout wiring RL may correspond to one of the readout lines RL1 to RLh illustrated in FIG. 3.

One of the vertical voltage lines V_VL may be electrically connected to the second-first horizontal initialization voltage line H_VAIL1, which is illustrated in FIG. 8F, through a corresponding voltage connecting pattern C_VP (e.g., refer to FIG. 8H), and another one of the vertical voltage lines V_VL may be electrically connected to the second-second horizontal initialization voltage line H_VAIL2, which is illustrated in FIG. 8F, through a corresponding voltage connecting pattern C_VP. That is, a part of the vertical voltage lines V_VL may be used as the second initialization voltage line VAIL (e.g., refer to FIG. 4A). In addition, another one of the vertical voltage lines V_VL may be electrically connected to the first horizontal initialization voltage line H_VIL, which is illustrated in FIG. 8G, through a corresponding voltage connecting pattern C_VP (e.g., refer to FIG. 8H) and may be sued as the first initialization voltage line VIL (e.g., refer to FIG. 4A).

Another one of the vertical voltage lines V_VL may be used as the second drive voltage line VL2 of FIG. 4A. As described above, the vertical voltage lines V_VL may be used as different voltage lines connected to the pixels PX (e.g., refer to FIG. 3) and the sensors FX (e.g., refer to FIG. 3) and may alleviate a drop in the voltages applied to the respective voltage lines.

The plurality of third connecting electrode patterns C_CNE3 may include the third circuit connecting electrode CNE3 and the sixth circuit connecting electrode CNE3' illustrated in FIGS. 6A and 6B.

Figure 8J:
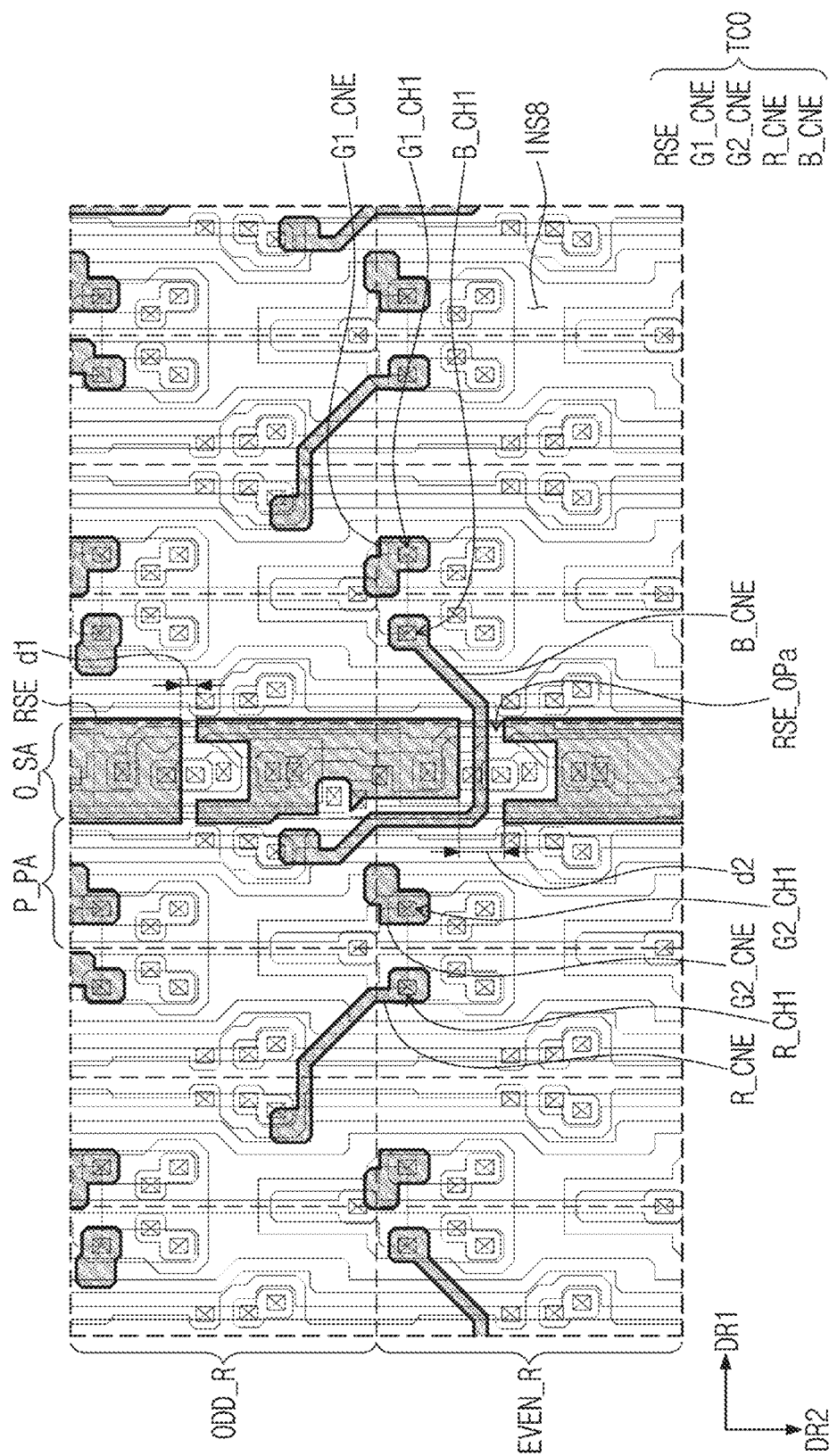

Referring to FIGS. 8I and 8J, the eighth insulating layer INS8 may cover at least a portion of the third data pattern layer SD3 and may be disposed on the seventh insulating layer INS7. A conductive pattern TCO may be disposed on the eighth insulating layer INS8. The conductive pattern TCO may include transparent conductive oxide. For example, the conductive pattern TCO may include metal, an alloy, conductive metal oxide, and/or a transparent conductive material.

The conductive pattern TCO may include a plurality of shielding electrodes RSE and a plurality of pixel connecting electrodes G1_CNE, G2_CNE, R_CNE, and B_CNE. The plurality of shielding electrodes RSE may overlap with the readout wiring RL when viewed from above the plane (e.g., in a plan view). Each of the plurality of shielding electrodes RSE may make contact with (e.g., contact or directly contact) the vertical reset voltage line V_VRL through a contact portion. Accordingly, the reset voltage Vrst (e.g., refer to FIG. 4A) applied to the vertical reset voltage line V_VRL may be applied to the shielding electrodes RSE.

The plurality of shielding electrodes RSE may be disposed to partially cover the sensor drive circuits O_SD (see, e.g., FIG. 4A) in the second circuit regions O_SA. In particular, each of the shielding electrodes RSE may be disposed to cover all or part of the reset transistor ST1 (e.g., refer to FIG. 4A), the amplifying transistor ST2, and the output transistor ST3.

Each shielding electrode RSE may perform a shielding function such that a detection signal output from the readout wiring RL is not coupled by a data signal applied to the data wiring DL.

In some embodiments of the present disclosure, the plurality of shielding electrodes RSE may be spaced apart from each other in the second direction DR2. In the first row ODD_R, the plurality of shielding electrodes RSE may be spaced apart from each other at a first interval d1 in the second direction DR2, and in the second row EVEN_R, the plurality of shielding electrodes RSE may be spaced apart from each other at a second interval d2 in the second direction DR2. In some embodiments of the present disclosure, the first interval d1 may be different from the second interval d2. For example, the second interval d2 may be greater than the first interval d1.

The plurality of pixel connecting electrodes G1_CNE, G2_CNE, R_CNE, and B_CNE may include the first and second green pixel connecting electrodes G1_CNE and G2_CNE, the red pixel connecting electrode R_CNE, and the blue pixel connecting electrode B_CNE.

The first green pixel connecting electrode G1_CNE may be connected to the first green pixel drive circuit G1_PD (e.g., refer to FIG. 5) through a first-first green contact hole G1_CH1 defined in the eighth insulating layer INS8. The second green pixel connecting electrode G2_CNE may be connected to the second green pixel drive circuit G2_PD (e.g., refer to FIG. 5) through a second-first green contact hole G2_CH1 defined in the eighth insulating layer INS8. The red pixel connecting electrode R_CNE may be connected to the red pixel drive circuit R_PD (e.g., refer to FIG. 5) through a first red contact hole R_CH1 defined in the eighth insulating layer INS8, and the blue pixel connecting electrode B_CNE may be connected to the blue pixel drive circuit B_PD (e.g., refer to FIG. 5) through a first blue contact hole B_CH1 defined in the eighth insulating layer INS8.

In some embodiments of the present disclosure, in the second row EVEN_R, the blue pixel connecting electrode B_CNE may pass through a separation space RSE_OPa (or, an open portion) between the shielding electrodes RSE in the first direction DR1.

The plurality of shielding electrodes RSE and the pixel connecting electrodes G1_CNE, G2_CNE, R_CNE, and B_CNE may be disposed at (e.g., on or in) the same layer (that is, the eighth insulating layer INS8) and may not overlap with one another when viewed from above the plane (e.g., in a plan view).

Figure 8K:
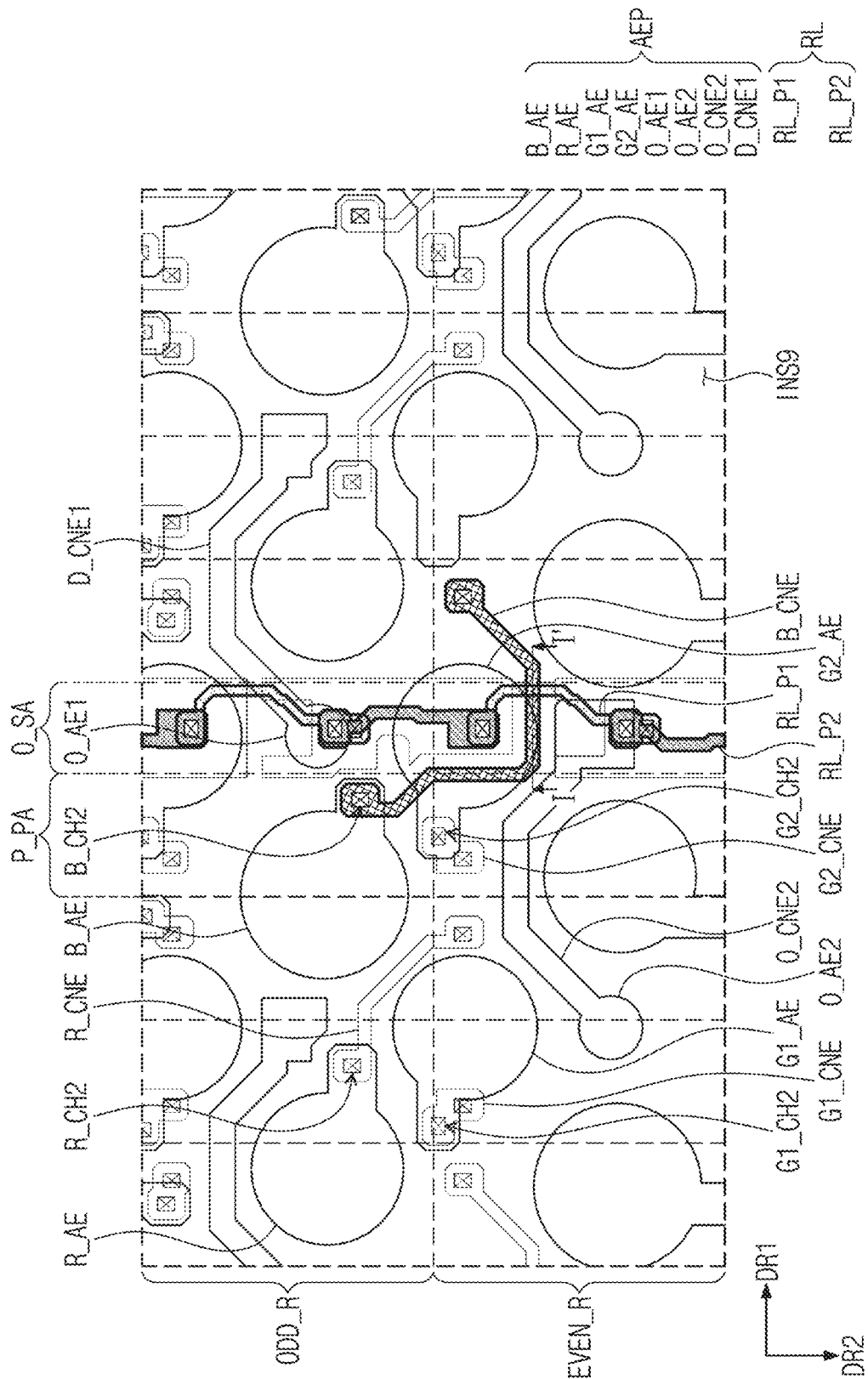

Referring to FIGS. 8J and 8K, the ninth insulating layer INS9 may cover at least a portion of the conductive pattern TCO and may be disposed on the eighth insulating layer INS8. An anode pattern AEP may be disposed on the ninth insulating layer INS9. The anode pattern AEP may include metal, an alloy, conductive metal oxide, and/or a transparent conductive material.

The anode pattern AEP may include a plurality of pixel anode electrodes G1_AE, G2_AE, R_AE, and B_AE and a plurality of sensor anode electrodes O_AE1 and O_AE2. The plurality of pixel anode electrodes G1_AE, G2_AE, R_AE, and B_AE may include the first and second green anode electrodes G1_AE and G2_AE, the red anode electrode R_AE, and the blue anode electrode B_AE. The plurality of sensor anode electrodes O_AE1 and O_AE2 may include the first sensor anode electrode O_AE1 disposed in the first row ODD_R and the second sensor anode electrode O_AE2 disposed in the second row EVEN_R.

The first green anode electrode G1_AE may be connected to the first green pixel connecting electrode G1_CNE through a first-second green contact hole G1_CH2 defined in the ninth insulating layer INS9. The second green anode electrode G2_AE may be connected to the second green pixel connecting electrode G2_CNE through a second-second green contact hole G2_CH2 defined in the ninth insulating layer INS9. The red anode electrode R_AE may be connected to the red pixel connecting electrode R_CNE through a second red contact hole R_CH2 defined in the ninth insulating layer INS9, and the blue anode electrode B_AE may be connected to the blue pixel connecting electrode B_CNE through a second blue contact hole B_CH2 defined in the ninth insulating layer INS9.

As described above, the pixel connecting electrodes G1_CNE, G2_CNE, R_CNE, and B_CNE may be disposed at (e.g., on or in) the same layer as the shielding electrode RSE (that is, on the eighth insulating layer INS8) and may connect the pixel anode electrodes G1_AE, G2_AE, R_AE, and B_AE to the corresponding pixel drive circuits. Thus, even though the resolution of the display device DD (e.g., refer to FIG. 3) is increased, the degree of freedom in the arrangement of the pixel anode electrodes G1_AE, G2_AE, R_AE, and B_AE may be improved (e.g., increased).

The blue anode electrode B_AE may be disposed adjacent to a first side (e.g., a left side) of the readout wiring RL (or, a first readout wiring), and the blue pixel drive circuit B_PD (that is, the first pixel drive circuit) corresponding to the blue anode electrode B_AE (that is, the blue light emitting element ED_B) may be disposed adjacent to a second side (e.g., a right side) of the adjacent readout wiring RL.

Referring to FIGS. 8K and 9, in the second row EVEN_R, the blue pixel connecting electrode B_CNE may cross the readout wiring RL. In particular, the blue pixel connecting electrode B_CNE may cross the first readout line portion RL_P1 and may not cross the second readout line portion RL_P2. Two sequentially stacked insulating layers (that is, the seventh and eighth insulating layers INS7 and INS8) may be disposed between the first readout line portion RL_P1 and the blue pixel connecting electrode B_CNE.

The first readout line portion RL_P1 may be disposed on the sixth insulating layer INS6 (or a first intermediate insulating layer), and the second readout line portion RL_P2 (see, e.g., FIG. 8K) may be disposed on the seventh insulating layer INS7 (or a second intermediate insulating layer). The blue pixel connecting electrode B_CNE may be disposed on the eighth insulating layer INS8 (or a third intermediate insulating layer) that covers the second readout line portion RL_P2.

When the blue pixel connecting electrode B_CNE is disposed to cross the first readout line portion RL_P1 in the second row EVEN_R, the gap between the blue pixel connecting electrode B_CNE and the first readout line portion RL_P1 in the third direction DR3 may be sufficiently secured by the seventh and eighth insulating layers INS7 and INS8. Accordingly, coupling capacitance between the blue pixel connecting electrode B_CNE and the readout wiring RL may be decreased, and thus the sensing accuracy of the sensors FX may be improved (e.g., increased).

In some examples, when the blue pixel connecting electrode B_CNE crosses the second readout line portion RL_P2 in the second row EVEN_R, only one insulating layer (that is, the seventh insulating layer INS7) may be disposed between the blue pixel connecting electrode B_CNE and the second readout line portion RL_P2.

The first and second green anode electrodes G1_AE and G2_AE, the red anode electrode R_AE, the blue anode electrode B_AE, and the first and second sensor anode electrodes may be disposed on the ninth insulating layer INS9 (or a fourth intermediate insulating layer).

The first sensor anode electrode O_AE1 may be disposed to overlap with the sensor circuit region O_SA, and the second sensor anode electrode O_AE2 may be disposed so as not to overlap with the sensor circuit region O_SA. The second sensor anode electrode O_AE2 may overlap with the pixel circuit region P_PA. The first sensor anode electrode O_AE1 may be connected with a corresponding sensor drive circuit through the first sensor contact hole O_CH1.

In some embodiments of the present disclosure, the anode pattern AEP may further include a sensor connecting electrode O_CNE2 and a dummy connecting electrode D_CNE1. The sensor connecting electrode O_CNE2 may extend from the second sensor anode electrode O_AE2 and may partially overlap with the sensor circuit region O_SA. The sensor connecting electrode O_CNE2 may be integrally formed with the second sensor anode electrode O_AE2. The sensor connecting electrode O_CNE2 may be connected with a corresponding sensor drive circuit through the second sensor contact hole O_CH2. The second sensor anode electrode O_AE2 may be electrically connected with a corresponding sensor drive circuit through the sensor connecting electrode O_CNE2.

The dummy connecting electrode D_CNE1 may extend from the first sensor anode electrode O_AE1 and may overlap with the pixel circuit region P_PA. In some embodiments of the present disclosure, the dummy connecting electrode D_CNE1 may have a shape similar to that of the sensor connecting electrode O_CNE2. The sum of the area of the first sensor anode electrode O_AE1 and the area of the dummy connecting electrode D_CNE1 may be substantially the same as the sum of the area of the second sensor anode electrode O_AE2 and the area of the sensor connecting electrode O_CNE2.

When the magnitudes of coupling capacitances acting on the first and second light receiving elements OPD1 and OPD2 (e.g., refer to FIG. 5) are different from each other, the magnitudes of noises acting on the first and second light receiving elements OPD1 and OPD2 (e.g., refer to FIG. 5) may be different from each other. In this case, there may be deviations in detection signals for the respective rows. However, when the design is made such that the sum of the area of the first sensor anode electrode O_AE1 and the area of the dummy connecting electrode D_CNE1 is substantially the same as the sum of the area of the second sensor anode electrode O_AE2 and the area of the sensor connecting electrode O_CNE2, the deviations in the detection signals for the respective rows may be decreased, and thus sensing uniformity and sensing accuracy may be improved (e.g., increased).

In addition, the numbers of data wirings DL and vertical connecting wirings D3_VCL that cross the sensor connecting electrode O_CNE2 may be substantially the same as the numbers of data wirings DL and vertical connecting wirings D3_VCL that cross the dummy connecting electrode D_CNE1. Thus, the magnitude of coupling capacitance acting on the sensor connecting electrode O_CNE2 by the data wiring DL and the vertical connecting wiring D3_VCL may be the same or substantially the same as the magnitude of coupling capacitance acting on the dummy connecting electrode D_CNE1 by the data wiring DL and the vertical connecting wiring D3_VCL. Accordingly, the difference between the coupling capacitance acting on the first light receiving element OPD1 disposed in the first row ODD_R and the coupling capacitance acting on the second light receiving element OPD2 disposed in the second row EVEN_R may be decreased.

Figure 10A:
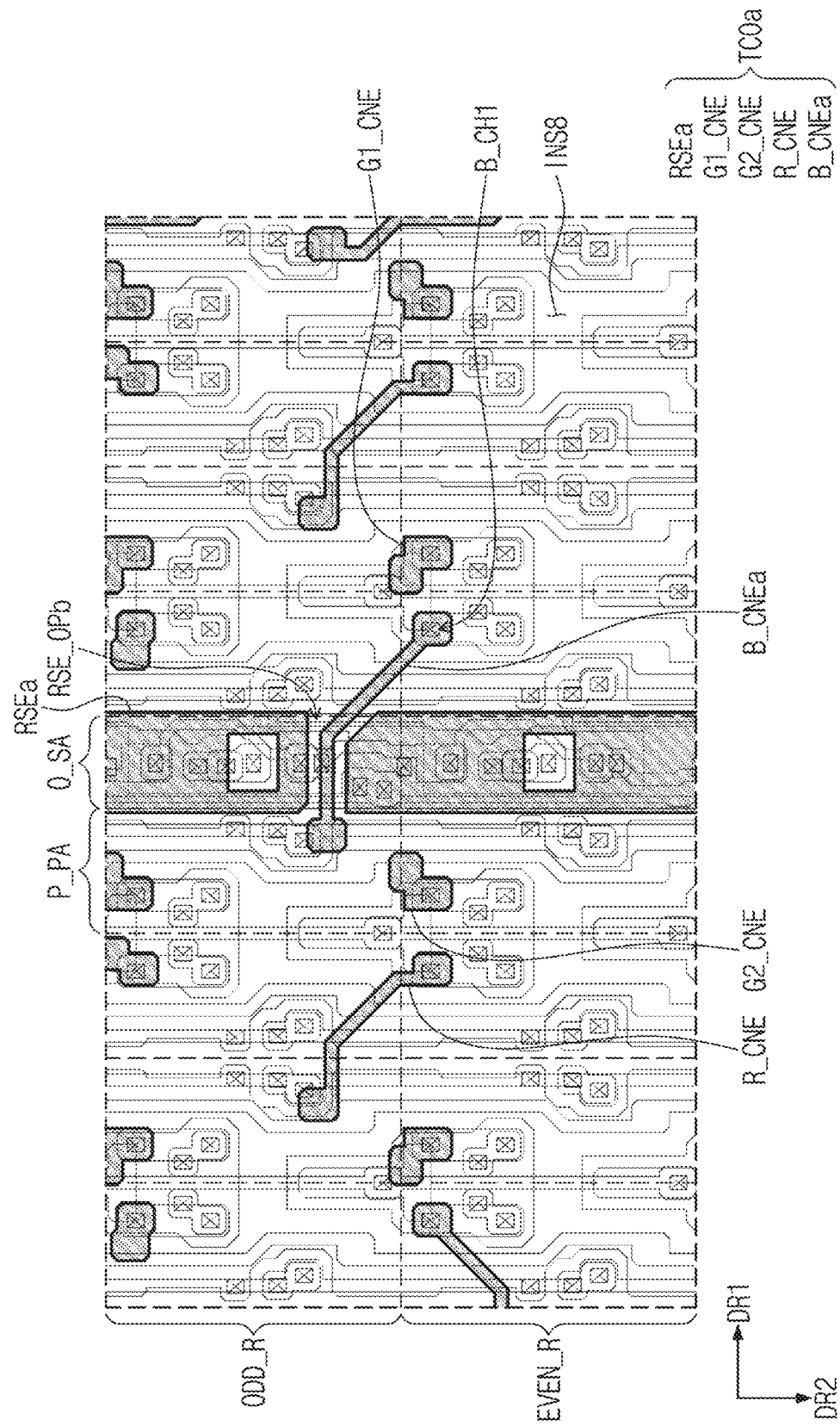
FIGS. 10A and 10B are plan views illustrating a portion of the display panel according to some embodiments of the present disclosure.
Figure 10B:
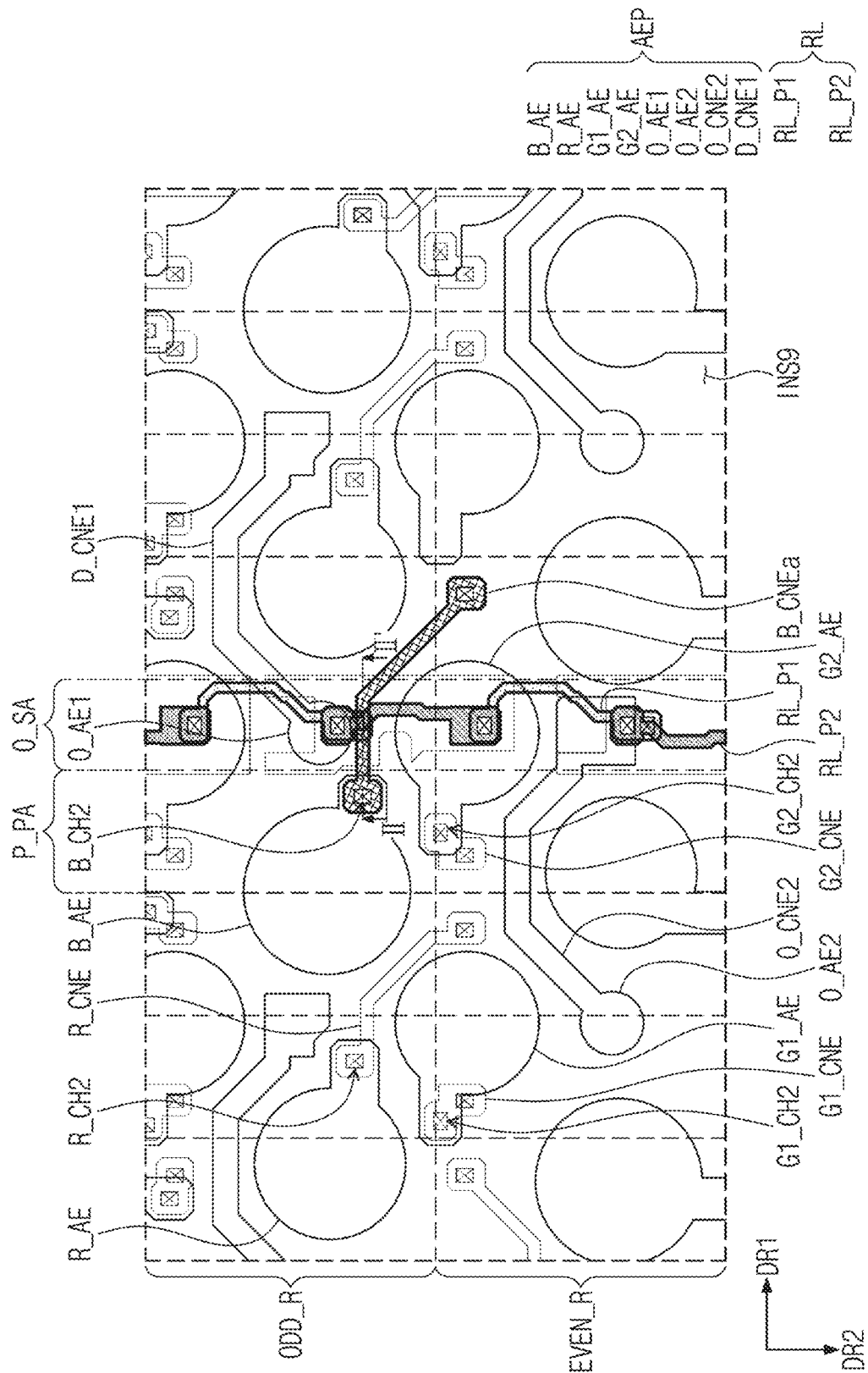
Figure 10C:
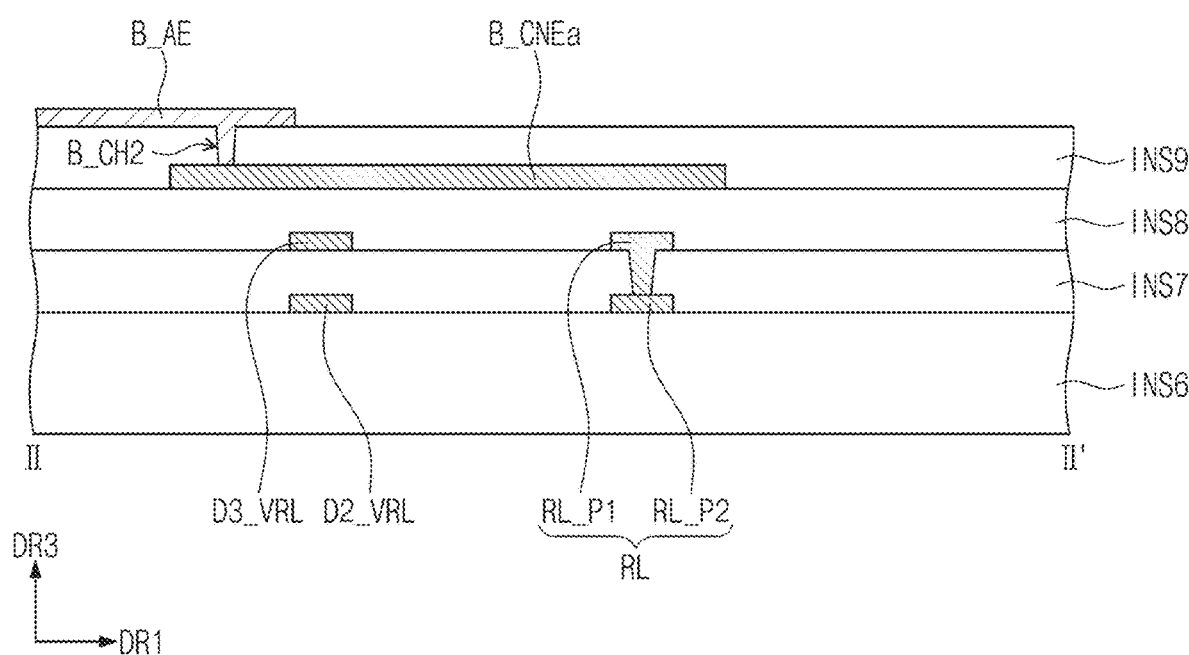
FIG. 10C is a sectional view taken along the line II-II' illustrated in FIG. 10B, according to some embodiments of the present disclosure.

FIGS. 10A and 10B are plan views illustrating a portion of the display panel according to some embodiments of the present disclosure. FIG. 10C is a sectional view taken along the line II-II' illustrated in FIG. 10B, according to some embodiments of the present disclosure.

Referring to FIGS. 10A, 10B, and 10C, a conductive pattern TCOa may include a plurality of shielding electrodes RSEa and a plurality of pixel connecting electrodes G1_CNE, G2_CNE, R_CNE, and B_CNEa, according to some embodiments of the present disclosure. The plurality of shielding electrodes RSEa may overlap with a readout wiring RL when viewed from above the plane (e.g., in a plan view). Each of the plurality of shielding electrodes RSEa may make contact with (e.g., contact or directly contact) a vertical reset voltage line V_VRL (see, e.g., FIG. 8H) through a contact portion. Accordingly, the reset voltage Vrst (e.g., refer to FIG. 4A) applied to the vertical reset voltage line V_VRL may be applied to the shielding electrodes RSEa.

In some embodiments of the present disclosure, the plurality of shielding electrodes RSEa may be spaced apart from each other in the second direction DR2. The plurality of shielding electrodes RSEa may be spaced apart from each other in the second direction DR2 in the first row ODD_R to provide an open portion RSE_OPb. The open portion RSE_OPb may not be provided in the second row EVEN_R.

The plurality of pixel connecting electrodes G1_CNE, G2_CNE, R_CNE, and B_CNEa may include the first and second green pixel connecting electrodes G1_CNE and G2_CNE, the red pixel connecting electrode R_CNE, and the blue pixel connecting electrode B_CNEa.

The blue pixel connecting electrode B_CNEa may be connected to the blue pixel drive circuit B_PD (e.g., refer to FIG. 5) through a first blue contact hole B_CH1 defined in the eighth insulating layer INS8. In some embodiments of the present disclosure, the blue pixel connecting electrode B_CNEa may pass through the open portion RSE_OPb in the first row ODD_R.

The plurality of shielding electrodes RSEa and the pixel connecting electrodes G1_CNE, G2_CNE, R_CNE, and B_CNEa may be disposed at (e.g., in or on) the same layer (that is, the eighth insulating layer INS8) and may not overlap with one another when viewed from above the plane.

An anode pattern AEP may be disposed on the ninth insulating layer INS9. The anode pattern AEP may include metal, an alloy, conductive metal oxide, and/or a transparent conductive material.

The anode pattern AEP may include a plurality of pixel anode electrodes G1_AE, G2_AE, R_AE, and B_AE and a plurality of sensor anode electrodes O_AE1 and O_AE2. The plurality of pixel anode electrodes G1_AE, G2_AE, R_AE, and B_AE may include the first and second green anode electrodes G1_AE and G2_AE, the red anode electrode R_AE, and the blue anode electrode B_AE. The plurality of sensor anode electrodes O_AE1 and O_AE2 may include the first sensor anode electrode O_AE1 disposed in the first row ODD_R and the second sensor anode electrode O_AE2 disposed in the second row EVEN_R.

The first green anode electrode G1_AE may be connected to the first green pixel connecting electrode G1_CNE through a first-second green contact hole G1_CH2 defined in the ninth insulating layer INS9. The second green anode electrode G2_AE may be connected to the second green pixel connecting electrode G2_CNE through a second-second green contact hole G2_CH2 defined in the ninth insulating layer INS9. The red anode electrode R_AE may be connected to the red pixel connecting electrode R_CNE through a second red contact hole R_CH2 defined in the ninth insulating layer INS9, and the blue anode electrode B_AE may be connected to the blue pixel connecting electrode B_CNEa through a second blue contact hole B_CH2 defined in the ninth insulating layer INS9.

Referring to FIGS. 10A, 10B and 10C, the blue pixel connecting electrode B_CNEa may cross the readout wiring RL, according to some embodiments of the present disclosure. In particular, in the first row ODD_R, the blue pixel connecting electrode B_CNEa may cross a second readout line portion RL_P2 and may not cross a first readout line portion RL_P1. One insulating layer (that is, the eighth insulating layer INS8) may be disposed between the second readout line portion RL_P2 and the blue pixel connecting electrode B_CNEa. However, the present disclosure is not limited thereto. In the first row ODD_R, the blue pixel connecting electrode B_CNEa may cross the first readout line portion RL_P1 and may not cross the second readout line portion RL_P2. In this case, two insulating layers (that is, the seventh and eighth insulating layers INS7 and INS8) may be disposed between the second readout line portion RL_P2 and the blue pixel connecting electrode B_CNEa.

As illustrated in FIG. 10C, the first readout line portion RL_P1 may be disposed on the sixth insulating layer INS6, and the second readout line portion RL_P2 may be disposed on the seventh insulating layer INS7. When the blue pixel connecting electrode B_CNEa crosses the second readout line portion RL_P2, the seventh insulating layer INS7 may be disposed between the blue pixel connecting electrode B_CNEa and the second readout line portion RL_P2. Even though the seventh insulating layer INS7 is disposed between the blue pixel connecting electrode B_CNEa and the second readout line portion RL_P2 as described above, the coupling capacitance between the blue pixel connecting electrode B_CNEa and the readout wiring RL may be decreased by making the thickness of the seventh insulating layer INS7 sufficiently large.

For example, even in the first row ODD_R, the blue pixel connecting electrode B_CNEa may be disposed to cross the first readout line portion RL_P1. In this case, the gap between the blue pixel connecting electrode B_CNEa and the first readout line portion RL_P1 in the third direction DR3 may be sufficiently secured by the seventh and eighth insulating layers INS7 and INS8, and thus the coupling capacitance between the blue pixel connecting electrode B_CNEa and the readout wiring RL may be decreased.

Figure 11:
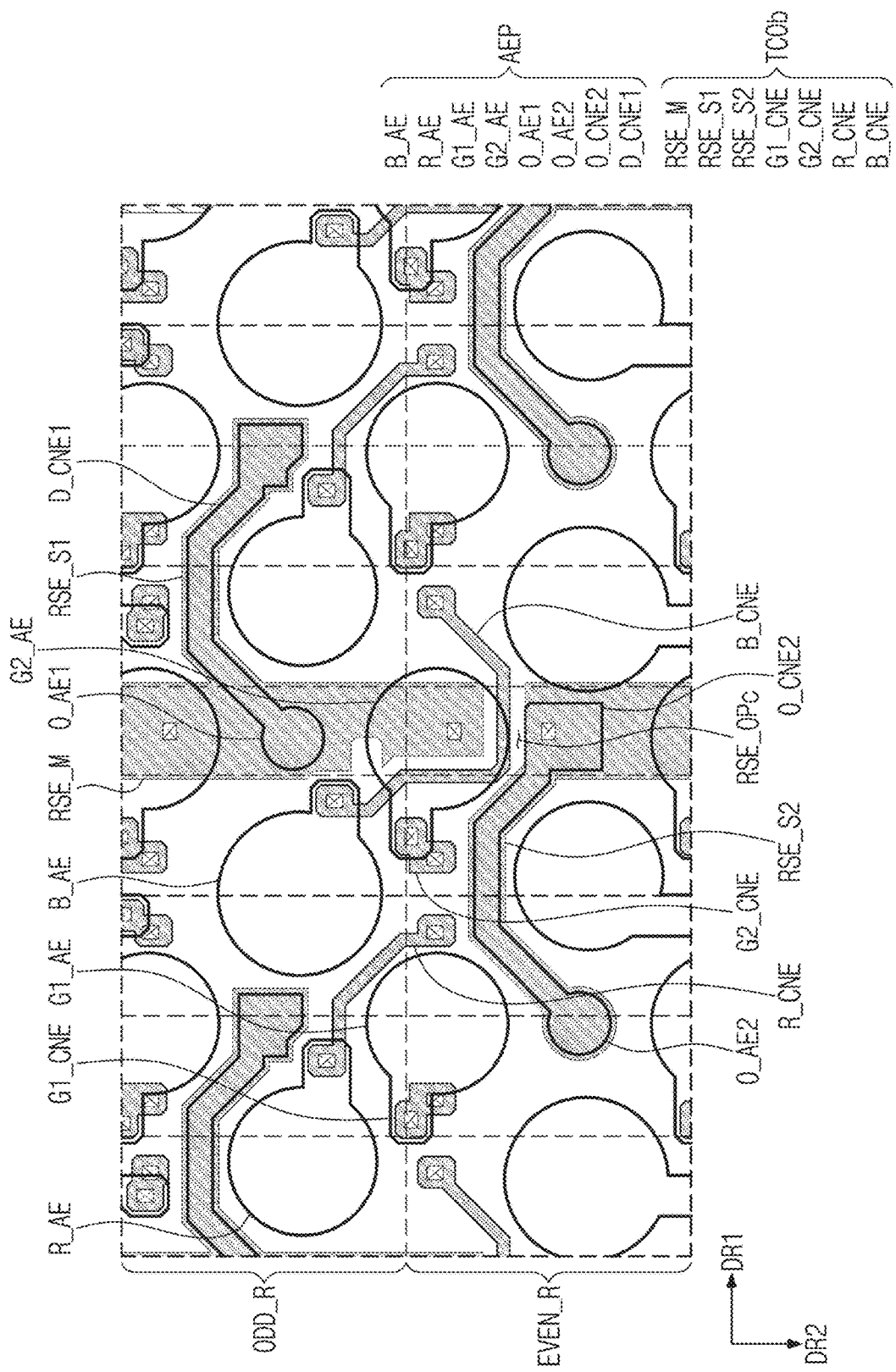
FIG. 11 is a plan view illustrating a portion of the display panel according to some embodiments of the present disclosure.

FIG. 11 is a plan view illustrating a portion of the display panel according to some embodiments of the present disclosure.

Referring to FIG. 11, a conductive pattern TCOb may include a main shielding electrode RSE_M, a first branch shielding electrode RSE_S1, and a second branch shielding electrode RSE_S2, according to some embodiments of the present disclosure. The main shielding electrode RSE_M may overlap with a readout wiring RL (see, e.g., FIG. 10B) when viewed from above the plane (e.g., in a plan view). The main shielding electrode RSE_M may make contact with (e.g., contact or directly contact) a vertical reset voltage line V_VRL (see, e.g., FIG. 8H) through a contact portion. Accordingly, the reset voltage Vrst (e.g., refer to FIG. 4A) applied to the vertical reset voltage line V_VRL may be applied to the main shielding electrode RSE_M.

The main shielding electrode RSE_M may be disposed to partially cover a sensor drive circuit O_SD (see, e.g., FIG. 4A) in each of second circuit regions O_SA. In particular, the main shielding electrode RSE_M may be disposed to cover all or part of the reset transistor ST1 (e.g., refer to FIG. 4A), the amplifying transistor ST2 (e.g., refer to FIG. 4A), and the output transistor ST3 (e.g., refer to FIG. 4A).

The main shielding electrode RSE_M may perform a shielding function such that a detection signal output from the readout wiring RL is not coupled by a data signal applied to a data wiring DL (see, e.g., FIG. 8I). In other words, the main shielding electrode RSE_M physically separates the readout wiring RL from the data wiring DL.

The first branch shielding electrode RSE_S1 may extend from a first side of the main shielding electrode RSE_M in the first direction DR1. The first side may be a side parallel to the second direction DR2. The first branch shielding electrode RSE_S1 may overlap with a first sensor anode electrode O_AE1 and a dummy connecting electrode D_CNE1 in the first row ODD_R. The second branch shielding electrode RSE_S2 may extend from a second side of the main shielding electrode RSE_M in the direction opposite to the first direction DR1. The second side may be a side parallel to the first side. The second branch shielding electrode RSE_S2 may overlap with a second sensor anode electrode O_AE2 and a sensor connecting electrode O_CNE2 in the second row EVEN_R.

The first branch shielding electrode RSE_S1 may decrease coupling capacitance acting on the dummy connecting electrode D_CNE1 by shielding the dummy connecting electrode D_CNE1 from the data wiring DL. In addition, the second branch shielding electrode RSE_S2 may decrease coupling capacitance acting on the second sensor anode electrode O_AE2 and the sensor connecting electrode O_CNE2 by shielding the second sensor anode electrode O_AE2 and the sensor connecting electrode O_CNE2 from the data wiring DL. In other words, the first branch shielding electrode RSE_S1 and second branch shielding electrode RSE_S2 create a physical separation from the data wiring DL. Accordingly, deterioration of the sensing accuracy of each sensor FX due to coupling capacitance generated when the dummy connecting electrode D_CNE1, the second sensor anode electrode O_AE2, and/or the sensor connecting electrode O_CNE2 cross the data wirings DL may be substantially reduced or prevented and/or eliminated.

The conductive pattern TCOb may further include a plurality of pixel connecting electrodes G1_CNE, G2_CNE, R_CNE, and B_CNE. The plurality of pixel connecting electrodes G1_CNE, G2_CNE, R_CNE, and B_CNE may include the first and second green pixel connecting electrodes G1_CNE and G2_CNE, the red pixel connecting electrode R_CNE, and the blue pixel connecting electrode B_CNE. In some embodiments of the present disclosure, in the second row EVEN_R, the blue pixel connecting electrode B_CNE may pass through a separation space RSE_OPc (or, an open portion) between the main shielding electrodes RSE_M.

Figure 12A:
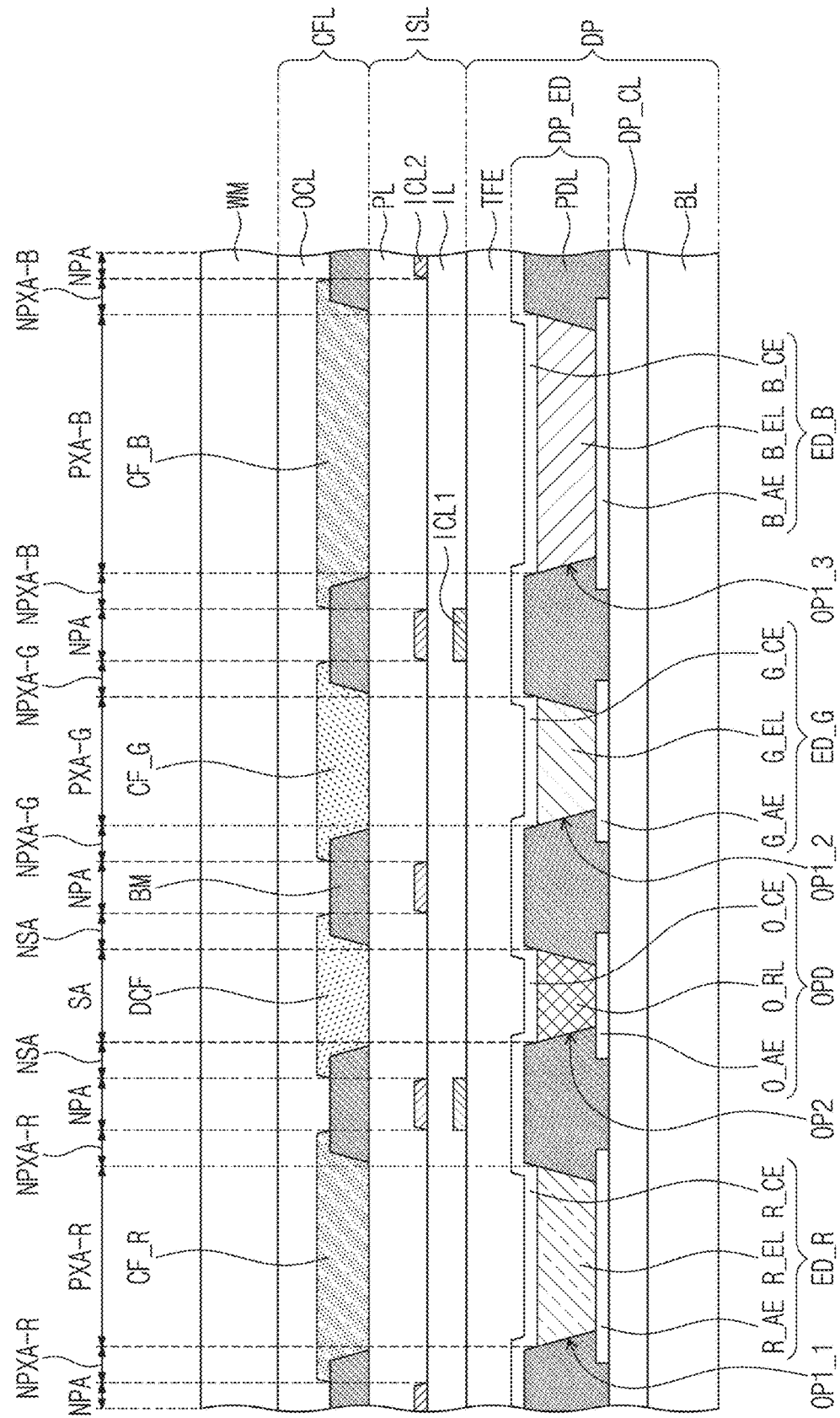
FIGS. 12A and 12B are sectional views illustrating light emitting elements and a light receiving element of the display panel according to some embodiments of the present disclosure.
Figure 12B:
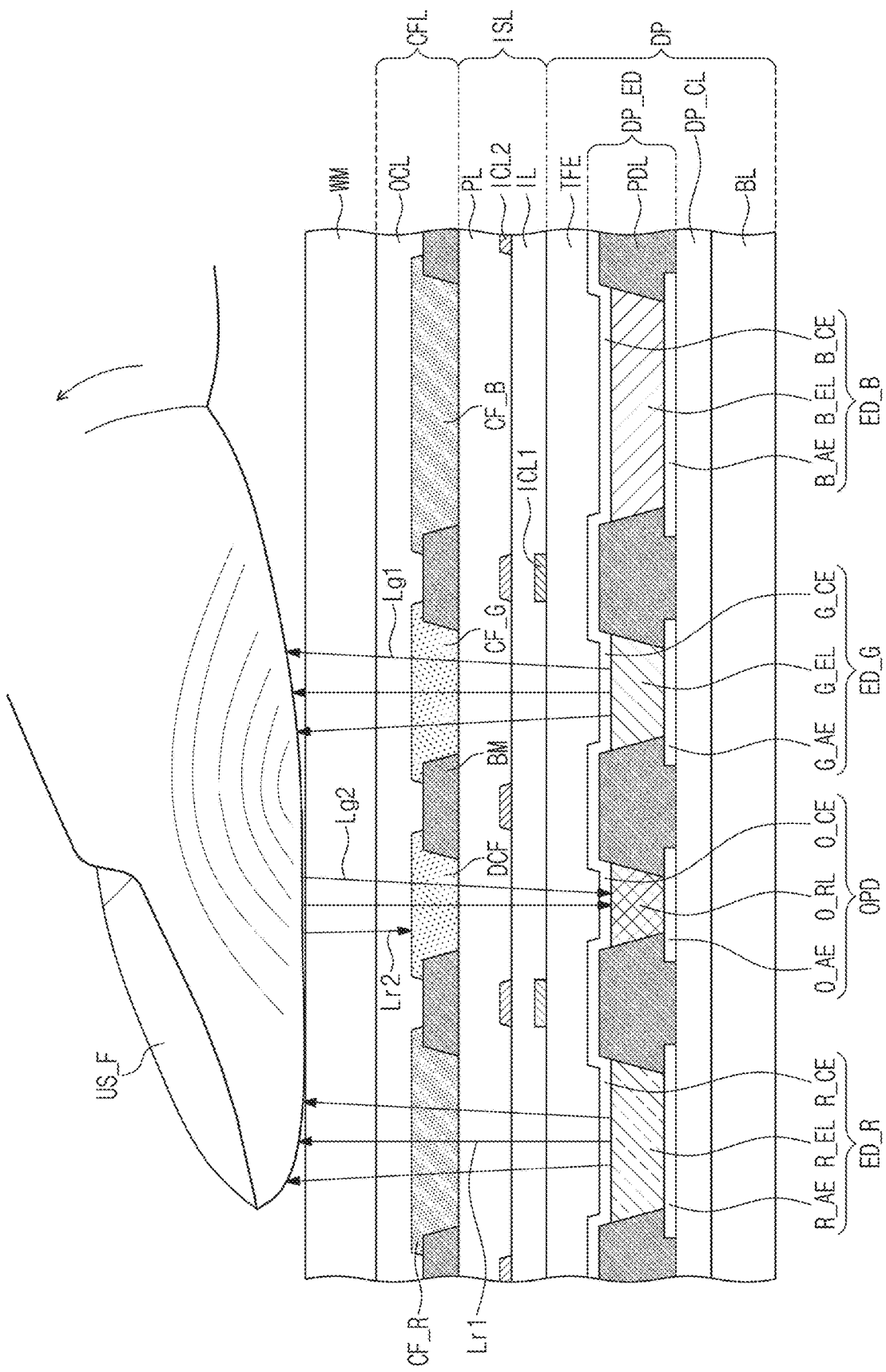

FIGS. 12A and 12B are sectional views illustrating light emitting elements and a light receiving element of the display panel according to some embodiments of the present disclosure.

Referring to FIGS. 12A and 12B, a first electrode layer may be disposed on the circuit layer DP_CL, according to some embodiments of the present disclosure. The pixel defining layer PDL may be formed on the first electrode layer. The first electrode layer may include red, green, and blue anode electrodes R_AE, G_AE, and B_AE. First to third light emitting openings OP1_1, OP1_2, and OP1_3 of the pixel defining layer PDL may expose at least portions of the red, green, and blue anode electrodes R_AE, G_AE, and B_AE, respectively. In some embodiments of the present disclosure, the pixel defining layer PDL may further include a black material. The pixel defining layer PDL may further include a black organic dye/pigment, such as carbon black, aniline black, or the like. The pixel defining layer PDL may be formed by mixing a blue organic material and a black organic material. The pixel defining layer PDL may further include a liquid-repellent organic material.

As illustrated in FIG. 12A, the display panel DP may include first to third emissive regions PXA-R, PXA-G, and PXA-B and first to third non-emissive regions NPXA-R, NPXA-G, and NPXA-B adjacent to the first to third emissive regions PXA-R, PXA-G, and PXA-B. The non-emissive regions NPXA-R, NPXA-G, and NPXA-B may surround the corresponding emissive regions PXA-R, PXA-G, and PXA-B, respectively. In some embodiments, the first emissive region PXA-R may be defined to correspond to a partial region of the red anode electrode R_AE exposed by the first light emitting opening OP1_1. The second emissive region PXA-G may be defined to correspond to a partial region of the green anode electrode G_AE exposed by the second light emitting opening OP1_2. The third emissive region PXA-B may be defined to correspond to a partial region of the blue anode electrode B_AE exposed by the third light emitting opening OP1_3. A non-pixel region NPA may be defined between the first to third non-emissive regions NPXA-R, NPXA-G, and NPXA-B.

An emissive layer may be disposed on the first electrode layer. The emissive layer may include red, green, and blue emissive layers R_EL, G_EL, and B_EL. The red, green, and blue emissive layers R_EL, G_EL, and B_EL may be disposed in regions corresponding to the first to third light emitting openings OP1_1, OP1_2, and OP1_3, respectively. The red, green, and blue emissive layers R_EL, G_EL, and B_EL may be formed to be separated from one another. Each of the red, green, and blue emissive layers R_EL, G_EL, and B_EL may include an organic material and/or an inorganic material. The red, green, and blue emissive layers R_EL, G_EL, and B_EL may generate light of preset colors. For example, the red emissive layer R_EL may generate red light, the green emissive layer G_EL may generate green light, and the blue emissive layer B_EL may generate blue light.

Although the patterned red, green, and blue emissive layers R_EL, G_EL, and B_EL are illustrated in this embodiment, one emissive layer may be commonly disposed in the first to third emissive regions PXA-R, PXA-G, and PXA-B. In this case, the emissive layer may generate white light or blue light. In addition, the emissive layer may have a multi-layer structure called tandem.

Each of the red, green, and blue emissive layers R_EL, G_EL, and B_EL may include a low molecular weight organic material or a high molecular weight organic material as a luminescent material. In some examples, each of the red, green, and blue emissive layers R_EL, G_EL, and B_EL may include a quantum-dot material as a luminescent material. A core of a quantum dot may be selected from Group II-VI compounds, Group III-V compounds, Group IV-VI compounds, Group IV elements, Group IV compounds, and/or combinations thereof.

A second electrode layer may be disposed on the red, green, and blue emissive layers R_EL, G_EL, and B_EL. The second electrode layer may include red, green, and blue cathode electrodes R_CE, G_CE, and B_CE. The red, green, and blue cathode electrodes R_CE, G_CE, and B_CE may be electrically connected with one another. In some embodiments of the present disclosure, the red, green, and blue cathode electrodes R_CE, G_CE, and B_CE may have a one-body shape (e.g., be integrally formed). In this case, the red, green, and blue cathode electrodes R_CE, G_CE, and B_CE may be commonly disposed in the first to third emissive regions PXA-R, PXA-G, and PXA-B, the first to third non-emissive regions NPXA-R, NPXA-G, and NPXA-B, and the non-pixel region NPA.

The element layer DP_ED may further include a light receiving element OPD. The light receiving element OPD may be a photo diode. The pixel defining layer PDL may further include a light receiving opening OP2 provided to correspond to the light receiving element OPD.

The light receiving element OPD may include a sensing anode electrode O_AE, a photoelectric conversion layer O_RL, and a sensing cathode electrode O_CE. The sensing anode electrode O_AE may be disposed at (e.g., in or on) the same layer as the first electrode layer. That is, the sensing anode electrode O_AE may be disposed on the circuit layer DP_CL and may be simultaneously formed through the same process as the red, green, and blue anode electrodes R_AE, G_AE, and B_AE.

The light receiving opening OP2 of the pixel defining layer PDL may expose at least a portion of the sensing anode electrode O_AE. The photoelectric conversion layer O_RL may be disposed on the sensing anode electrode O_AE exposed by the light receiving opening OP2. The photoelectric conversion layer O_RL may include an organic photo sensing material. The sensing cathode electrode O_CE may be disposed on the photoelectric conversion layer O_RL. The sensing cathode electrode O_CE may be simultaneously formed through the same process as the red, green, and blue cathode electrodes R_CE, G_CE, and B_CE. In some embodiments of the present disclosure, the sensing cathode electrode O_CE may be integrally formed with the red, green, and blue cathode electrodes R_CE, G_CE, and B_CE to form the common cathode electrode.

The encapsulation layer TFE may be disposed on the element layer DP_ED. The encapsulation layer TFE may include at least an inorganic layer or an organic layer. In some embodiments of the present disclosure, the encapsulation layer TFE may include two inorganic layers and an organic layer disposed therebetween. In some embodiments of the present disclosure, the encapsulation layer TFE may include a plurality of inorganic layers and a plurality of organic layers alternately stacked one above another.

The inorganic layers protect the red, green, and blue light emitting elements ED_R, ED_G, and ED_B and the light receiving element OPD from moisture/oxygen, and the organic layers protect the red, green, and blue light emitting elements ED_R, ED_G, and ED_B and the light receiving element OPD from foreign matter, such as dust particles. The inorganic layers may include a silicon nitride layer, a silicon oxy nitride layer, a silicon oxide layer, a titanium oxide layer, and/or an aluminum oxide layer, but are not particularly limited thereto. The organic layers may include an acrylic organic layer, but are not particularly limited.

The display device DD may include the input sensing layer ISL disposed on the display panel DP and the color filter layer CFL disposed on the input sensing layer ISL.

The input sensing layer ISL may be directly disposed on the encapsulation layer TFE. The input sensing layer ISL may include a first conductive layer ICL1, an insulating layer IL, a second conductive layer ICL2, and a protective layer PL. The first conductive layer ICL1 may be disposed on the encapsulation layer TFE. Although FIGS. 12A and 12B illustrate a structure in which the first conductive layer ICL1 is directly disposed on the encapsulation layer TFE, the present disclosure is not limited thereto. The input sensing layer ISL may further include a base insulating layer disposed between the first conductive layer ICL1 and the encapsulation layer TFE. In this case, the encapsulation layer TFE may be covered by the base insulating layer, and the first conductive layer ICL1 may be disposed on the base insulating layer. In some embodiments of the present disclosure, the base insulating layer may include an inorganic insulating material.

The insulating layer IL may cover the first conductive layer ICL1. The second conductive layer ICL2 may be disposed on the insulating layer IL. Although FIGS. 12A and 12B illustrate a structure in which the input sensing layer ISL includes the first and second conductive layers ICL1 and ICL2, the present disclosure is not limited thereto. For example, the input sensing layer ISL may include only one of the first and second conductive layers ICL1 and ICL2.

The protective layer PL may be disposed on the second conductive layer ICL2. The protective layer PL may include an organic insulating material. The protective layer PL may serve to protect the first and second conductive layers ICL1 and ICL2 from moisture/oxygen and may serve to protect the first and second conductive layers ICL1 and ICL2 from foreign matter.

The color filter layer CFL may be disposed on the input sensing layer ISL. The color filter layer CFL may be directly disposed on the protective layer PL. The color filter layer CFL may include a first color filter CF_R, a second color filter CF_G, and a third color filter CF_B. The first color filter CF_R has a first color, the second color filter CF_G has a second color, and the third color filter CF_B has a third color. In some embodiments of the present disclosure, the first color may be red, the second color may be green, and the third color may be blue.

The color filter layer CFL may further include a dummy color filter DCF. In some embodiments of the present disclosure, when a region where the photoelectric conversion layer O_RL is defined as a sensing region SA and a region around the sensing region SA is defined as a non-sensing region NSA, the dummy color filter DCF may be disposed to correspond to the sensing region SA. The dummy color filter DCF may overlap with the sensing region SA and the non-sensing region NSA. In some embodiments of the present disclosure, the dummy color filter DCF may have the same color as one of the first to third color filters CF_R, CF_G, and CF_B. In some embodiments of the present disclosure, the dummy color filter DCF may have the same green color as the second color filter CF_G.

The color filter layer CFL may further include a black matrix BM. The black matrix BM may be disposed to correspond to the non-pixel region NPA. The black matrix BM may be disposed to overlap with the first and second conductive layers ICL1 and ICL2 in the non-pixel region NPA. In some embodiments of the present disclosure, the black matrix BM may overlap with the non-pixel region NPA and the first to third non-emissive regions NPXA-G, NPXA-B, and NPXA-R. The black matrix BM may not overlap with the first to third emissive regions PXA-R, PXA-G, and PXA-B.

The color filter layer CFL may further include an over-coating layer OCL. The over-coating layer OCL may include an organic insulating material. The over-coating layer OCL may have a thickness sufficient to remove steps between the first to third color filters CF_R, CF_G, and CF_B. Without any specific limitation, the over-coating layer OCL may include any material that has a preset thickness and is capable of flattening the upper surface of the color filter layer CFL. For example, the over-coating layer OCL may include an acrylate-based organic material.

Referring to FIG. 12B, when the display device DD (e.g., refer to FIG. 1) operates, the red, green, and blue light emitting elements ED_R, ED_G, and ED_B may output light, according to some embodiments of the present disclosure. The red light emitting elements ED_R output red light in a red wavelength band, the green light emitting elements ED_G output green light in a green wavelength band, and the blue light emitting elements ED_B output blue light in a blue wavelength band.

In some embodiments of the present disclosure, the light receiving element OPD may receive light from specific light emitting elements (e.g., the green light emitting elements ED_G) among the red, green, and blue light emitting elements ED_R, ED_G, and ED_B. That is, second light Lg1 may be output from the green light emitting elements ED_G, and the light receiving element OPD may receive second reflected light Lg2 obtained by reflection of the second light Lg1 by the user's fingerprint. The second light Lg1 and the second reflected light Lg2 may be green light in the green wavelength band. The dummy color filter DCF may be disposed over the light receiving element OPD. The dummy color filter DCF may be green in color. Accordingly, the second reflected light Lg2 may pass through the dummy color filter DCF and may be incident to the light receiving element OPD.

Red light and blue light output from the red and blue light emitting elements ED_R and ED_B may also be reflected by the user's hand US_F. For example, when light obtained by reflection of red light Lr1 output from the red light emitting elements ED_R by the user's hand US_F is defined as first reflected light Lr2, the first reflected light Lr2 may fail to pass through the dummy color filter DCF and may be absorbed by the dummy color filer DCF. Accordingly, the first reflected light Lr2 is not able to pass through the dummy color filter DCF and is not able to be emitted to the light receiving element OPD. Likewise, even though blue light is reflected by the user's hand US_F, the blue light may be absorbed by the dummy color filter DCF. Thus, only the second reflected light Lg2 may be provided to the light receiving element OPD.

As described above, the pixel connecting electrodes may be disposed at (e.g., in or on) the same layer as the shielding electrode and may connect the pixel anode electrodes to the corresponding pixel drive circuits. Thus, even though the resolution of the display device is increased, the degree of freedom in the arrangement of the pixel anode electrodes may be improved (e.g., increased). In addition, even though at least one of the pixel connecting electrodes may cross the readout wiring, coupling capacitance may be decreased by adjusting the number of intermediate insulating layers disposed therebetween and the gap thereof, and thus the sensing accuracy of the sensor may be improved (e.g., increased).

When the design is made such that the sum of the area of the first sensor anode electrode and the area of the dummy connecting electrode is substantially the same as the sum of the area of the second sensor anode electrode and the area of the sensor connecting electrode, deviations in detection signals for the respective rows may be decreased, and thus sensing uniformity and sensing accuracy may be improved.

The foregoing is illustrative of some embodiments of the present disclosure, and is not to be construed as limiting thereof. Although some embodiments have been described, those skilled in the art will readily appreciate that various suitable modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
    a base layer having a display region and a non-display region defined therein;
    a circuit layer on the base layer; and an element layer on the circuit layer, the element layer comprising light emitting elements and light receiving elements corresponding in position to the display region, wherein the circuit layer comprises:
    pixel drive circuits connected to the light emitting elements;
    sensor drive circuits connected to the light receiving elements;
    data lines connected to the pixel drive circuits;
    readout wirings connected to the sensor drive circuits;
    a shielding electrode overlapping with the readout wirings and the sensor drive circuits in a plan view, the shielding electrode being on the data lines; and
    pixel connecting electrodes connecting the pixel drive circuits to the light emitting elements,
    wherein one light emitting element among the light emitting elements does not overlap with a corresponding pixel drive circuit among the pixel drive circuits in a plan view,
    wherein the pixel connecting electrodes are directly connected to the light emitting elements, respectively, and
    wherein the pixel connecting electrodes and the shielding electrode are disposed on a same insulating layer over the data lines and the readout wirings.

2. The display device of claim 1, wherein each of the light emitting elements comprises a pixel anode electrode,
    wherein the pixel anode electrode is connected to a corresponding pixel drive circuit among the pixel drive circuits through a corresponding pixel connecting electrode among the pixel connecting electrodes, and
    wherein the pixel anode electrode and the corresponding pixel connecting electrode are at different layers.

3. The display device of claim 2, wherein a first pixel anode electrode of a first light emitting element among the light emitting elements is on a first side of a first readout wiring adjacent to the first pixel anode electrode, and a first pixel drive circuit corresponding to the first light emitting element among the pixel drive circuits is on a second side of the first readout wiring, and
    wherein a first pixel connecting electrode of the pixel connecting electrodes connects the first pixel anode electrode and the first pixel drive circuit, and overlaps with the first readout wiring in a plan view.

4. The display device of claim 3, wherein two or more sequentially stacked insulating layers are between the first readout wiring and the first pixel connecting electrode.

5. The display device of claim 4, wherein the first readout wiring comprises:
   a first readout line portion on a first intermediate insulating layer; and
   a second readout line portion on a second intermediate insulating layer and covering the first readout line portion, the second readout line portion being connected with the first readout line portion, and
   wherein the first pixel connecting electrode is on a third intermediate insulating layer that covers the second readout line portion, and crosses the first readout line portion in a plan view.

6. The display device of claim 3, wherein the first readout wiring comprises:
   a first readout line portion on a first intermediate insulating layer; and
   a second readout line portion on a second intermediate insulating layer that covers the first readout line portion, the second readout line portion being connected with the first readout line portion, and
   wherein the first pixel connecting electrode is on a third intermediate insulating layer that covers the second readout line portion, and crosses the second readout line portion in a plan view.

7. The display device of claim 3, wherein the light receiving elements comprise:
   first light receiving elements in a first row; and
   second light receiving elements in a second row,
   wherein each of the first light receiving elements overlaps with a corresponding first sensor drive circuit among the sensor drive circuits in a plan view, and
   wherein each of the second light receiving elements does not overlap a second sensor drive circuit among the sensor drive circuits in a plan view.

8. The display device of claim 7, wherein each of the second light receiving elements comprises:
   a second sensor anode electrode; and
   a sensor connecting electrode extending from the second sensor anode electrode and overlapping with the second sensor drive circuit, and
   wherein the second sensor anode electrode and the sensor connecting electrode are at the same layer.

9. The display device of claim 8, wherein each of the first light receiving elements comprises:
   a first sensor anode electrode; and
   a dummy connecting electrode extending from the first sensor anode electrode, and
   wherein the first sensor anode electrode overlaps with the first sensor drive circuit and is connected with the second sensor drive circuit.

10. The display device of claim 9, wherein a sum of an area of the dummy connecting electrode and an area of the first sensor anode electrode is equal to a sum of an area of the sensor connecting electrode and an area of the second sensor anode electrode.

11. The display device of claim 9, wherein the shielding electrode comprises:
    a plurality of main shielding electrodes overlapping with the sensor drive circuits and the readout wirings in a plan view;
    a first branch shielding electrode extending from at least one of the main shielding electrodes and partially overlap with the dummy connecting electrode in a plan view; and
    a second branch shielding electrode extending from at least one of the main shielding electrodes and partially overlap with the sensor connecting electrode in a plan view.

12. The display device of claim 11, wherein the main shielding electrodes are spaced apart from each other in an extension direction of each of the readout wirings, and
    wherein the first pixel connecting electrode passes through a separation space between the main shielding electrodes in a direction crossing the extension direction.

13. The display device of claim 11, wherein the data lines comprise:
    first data lines connected to a first group of the pixel drive circuits among the pixel drive circuits; and
    second data lines spaced apart from the first data lines in a first direction and connected to a second group of the pixel drive circuits among the pixel drive circuits, and
    wherein the circuit layer further comprises data connecting lines electrically connected with the second data lines, respectively, in the display region.

14. The display device of claim 13, wherein the data connecting lines comprise:
    a plurality of vertical data connecting lines extending along the first data lines; and
    a plurality of horizontal data connecting lines extending in the first direction, and
    wherein the plurality of horizontal data connecting lines electrically connect the plurality of vertical data connecting lines to the second data lines.

15. The display device of claim 14, wherein portions of the readout wirings are on a first intermediate insulating layer,
    wherein the first and second data lines and the vertical data connecting lines are on a second intermediate insulating layer covering the first intermediate insulating layer and the portions of the readout wirings, and
    wherein the shielding electrode and the pixel connecting electrode are on a third intermediate insulating layer covering the first and second data lines, the vertical data connecting lines, and the second intermediate insulating layer.

16. The display device of claim 15,
    wherein the pixel anode electrode is on a fourth intermediate insulating layer covering the shielding electrode and the pixel connecting electrode.

17. The display device of claim 1, wherein the circuit layer further comprises:
    a first drive voltage line connected to the pixel drive circuits;
    a second drive voltage line connected to the light emitting elements and the light receiving elements; and
    a reset voltage line connected to the sensor drive circuits.

18. The display device of claim 17, wherein the shielding electrode is electrically connected with the reset voltage line.

19. The display device of claim 17, wherein each of the sensor drive circuits comprises:
    a reset transistor comprising a first electrode receiving a reset voltage, a second electrode connected with a first sensing node, and a third electrode receiving a reset control signal;
    an amplifying transistor comprising a first electrode receiving a sensor drive voltage, a second electrode connected with the first sensing node, and a third electrode connected with a second sensing node; and an output transistor comprising a first electrode connected with the second sensing node, a second electrode connected with a corresponding readout wiring, and a third electrode receiving an output control signal.

20. The display device of claim 19, wherein the reset voltage line is electrically connected to the first electrode of the reset transistor and the shielding electrode and supplies the reset voltage to the first electrode of the reset transistor and the shielding electrode.

21. An electronic device comprising:
a base layer having a display region and a non-display region defined therein;
a circuit layer on the base layer; and an element layer on the circuit layer, the element layer comprising light emitting elements and light receiving elements corresponding to the display region,
wherein the light receiving elements comprise a first light receiving element in a first row and a second light receiving element in a second row,
wherein the circuit layer comprises: pixel drive circuits connected to the light emitting elements, respectively;
a first sensor drive circuit overlapping with the first light receiving element when viewed from above a plane, the first sensor drive circuit being connected to the first light receiving element; and
a second sensor drive circuit connected to the second light receiving element, the second sensor drive circuit being configured so as not to overlap the second light receiving element in a plan view,
wherein the second light receiving element comprises a sensor connecting electrode extending from a second sensor anode electrode toward the second sensor drive circuit and connect the second sensor anode electrode and the second sensor drive circuit, and
wherein the first light receiving element comprises a dummy connecting electrode extending from a first sensor anode electrode in a direction opposite to the sensor connecting electrode.

22. The electronic device of claim 21, wherein the circuit layer further comprises:

a readout wiring connected to the first and second sensor drive circuits; and
a shielding electrode overlapping with the readout wiring in a plan view, and
wherein the sensor connecting electrode and the dummy connecting electrode are on an intermediate insulating layer covering the shielding electrode.

23. The electronic device of claim 22, wherein the shielding electrode comprises:
a plurality of main shielding electrodes overlapping with the first and second sensor drive circuits in a plan view;
a first branch shielding electrode extending from one of the main shielding electrodes and partially overlap with the dummy connecting electrode in a plan view; and
a second branch shielding electrode extending from one of the main shielding electrodes and partially overlap with the sensor connecting electrode in a plan view.

24. The electronic device of claim 22, wherein the circuit layer further comprises pixel connecting electrodes connecting the pixel drive circuits with the light emitting elements, respectively, and
wherein the pixel connecting electrodes and the shielding electrode are at the same layer.

25. The electronic device of claim 24, wherein the circuit layer further comprises:
a first drive voltage line connected to the pixel drive circuits;
a second drive voltage line connected to the light emitting elements and the light receiving elements; and
a reset voltage line connected to the first and second sensor drive circuits.

26. The electronic device of claim 25, wherein the shielding electrode is electrically connected with the reset voltage line.

27. The electronic device of claim 21, wherein a sum of an area of the dummy connecting electrode and an area of the first sensor anode electrode is equal to a sum of an area of the sensor connecting electrode and an area of the second sensor anode electrode.

* * * * *